(12) United States Patent
Kang et al.

(10) Patent No.: US 11,954,270 B2
(45) Date of Patent: Apr. 9, 2024

(54) ELECTRONIC DEVICE FOR CONTROLLING COMMUNICATION CONNECTION WITH INPUT DEVICE AND METHOD OF CONTROLLING SAME

(71) Applicant: Samsung Electronics Co., Ltd., Suwon-si (KR)

(72) Inventors: Byunghoon Kang, Suwon-si (KR); Joohoon Lee, Suwon-si (KR); Changbyung Park, Suwon-si (KR); Jongwu Baek, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/750,948

(22) Filed: May 23, 2022

(65) Prior Publication Data

US 2022/0285989 A1 Sep. 8, 2022

Related U.S. Application Data

(63) Continuation of application No. 16/534,496, filed on Aug. 7, 2019, now Pat. No. 11,342,778.

(30) Foreign Application Priority Data

Aug. 8, 2018 (KR) .......................... 10-2018-0092721

(51) Int. Cl.
*G06F 3/0354* (2013.01)
*H02J 7/00* (2006.01)
(Continued)

(52) U.S. Cl.
CPC ............ *G06F 3/03545* (2013.01); *H02J 7/00* (2013.01); *H02J 7/0044* (2013.01); *H02J 50/10* (2016.02);
(Continued)

(58) Field of Classification Search
CPC ......... G06F 3/03545; H02J 7/00; H02J 50/10; H02J 50/12
See application file for complete search history.

(56) References Cited

U.S. PATENT DOCUMENTS 9,507,381 B1 11/2016 Vanderet et al.
9,787,103 B1 10/2017 Leabman et al.
(Continued)

FOREIGN PATENT DOCUMENTS

| CN | 103777786 A | 5/2014 |
|---|---|---|
| CN | 104750288 A | 7/2015 |

(Continued)

OTHER PUBLICATIONS

European Search Report dated Jan. 16, 2020; European Appln. No. 19190747.6-1216.
(Continued)

*Primary Examiner* — Richard V Muralidar
(74) *Attorney, Agent, or Firm* — Jefferson IP Law, LLP

(57) ABSTRACT

An electronic device is provided. The electronic device includes a housing including an inner space, a hole formed through the housing to the internal space, a stylus pen insertable into the internal space through the hole, wherein the stylus pen includes a first wireless communication circuit and a wireless charging receiver circuit, a wireless charging transmitter circuit positioned inside the housing and configured to provide charging to the wireless charging receiver circuit when the stylus pen is inserted into the inner space, a second wireless communication circuit positioned inside the housing, at processor operatively connected to the wireless charging transmitter circuit and the second wireless communication circuit, and at least one memory operatively connected to the processor, wherein when executed, cause the processor to detect whether the stylus pen is inserted into (Continued)

the inner space, and start to provide charging for a first duration.

16 Claims, 27 Drawing Sheets

(51) Int. Cl.
*H02J 50/10* (2016.01)
*H02J 50/12* (2016.01)
*H02J 50/80* (2016.01)
*H02J 50/90* (2016.01)

(52) U.S. Cl.
CPC ............. *H02J 50/12* (2016.02); *H02J 50/80* (2016.02); *H02J 50/90* (2016.02); *H02J 2207/20* (2020.01); *H02J 2310/22* (2020.01)

(56) References Cited

U.S. PATENT DOCUMENTS

| | | | |
|---|---|---|---|
| 10,236,710 B1* | 3/2019 | de la Fuente | G06F 3/03545 |
| 10,642,385 B1 | 5/2020 | Song et al. | |
| 10,809,829 B2 | 10/2020 | Lee et al. | |
| 11,016,581 B2 | 5/2021 | Jacobs et al. | |
| 11,038,366 B2* | 6/2021 | Kang | G06F 3/03545 |
| 11,231,806 B2 | 1/2022 | Choi et al. | |
| 11,342,778 B2* | 5/2022 | Kang | G06F 3/0383 |
| 2006/0036119 A1 | 2/2006 | Campbell et al. | |
| 2006/0256097 A1 | 11/2006 | Oliver | |
| 2011/0286615 A1 | 11/2011 | Olodort et al. | |
| 2014/0055098 A1 | 2/2014 | Lee | |
| 2014/0113689 A1 | 4/2014 | Lee | |
| 2014/0118308 A1 | 5/2014 | Rhee | |
| 2014/0256250 A1 | 9/2014 | Cueto et al. | |
| 2015/0015492 A1 | 1/2015 | Lee | |
| 2015/0050886 A1 | 2/2015 | Donaldson | |
| 2015/0205382 A1 | 7/2015 | Lin et al. | |
| 2015/0277592 A1* | 10/2015 | Nishigaki | G06F 3/03545 345/173 |
| 2015/0331501 A1 | 11/2015 | Nicholson et al. | |
| 2016/0247138 A1 | 8/2016 | Wallner | |
| 2016/0253039 A1 | 9/2016 | Heo et al. | |
| 2016/0274726 A1 | 9/2016 | Chung et al. | |
| 2016/0337496 A1 | 11/2016 | Jeganathan et al. | |
| 2016/0360350 A1 | 12/2016 | Watson et al. | |
| 2017/0013342 A1 | 1/2017 | Watson et al. | |
| 2017/0115755 A1 | 4/2017 | Jung et al. | |
| 2017/0259673 A1 | 9/2017 | Rutyna et al. | |
| 2017/0322642 A1 | 11/2017 | Zhang et al. | |
| 2018/0032160 A1 | 2/2018 | Park et al. | |
| 2018/0062422 A1 | 3/2018 | Kim et al. | |
| 2020/0209992 A1 | 7/2020 | Kwak et al. | |
| 2021/0288526 A1 | 9/2021 | Lee et al. | |

FOREIGN PATENT DOCUMENTS

| | | | |
|---|---|---|---|
| CN | 105094383 A | 11/2015 | |
| CN | 105958565 A | 9/2016 | |
| CN | 105988588 A | 10/2016 | |
| CN | 107182035 A | 9/2017 | |
| CN | 107438935 A | 12/2017 | |
| IN | 103633687 A | 3/2014 | |
| KR | 10-2009-0015470 A | 2/2009 | |
| KR | 10-2014-0050518 A | 4/2014 | |
| KR | 10-2016-0047385 A | 5/2016 | |
| KR | 10-2016-0068099 A | 6/2016 | |
| KR | 10-2016-0143572 A | 12/2016 | |
| KR | 10-1732511 B1 | 5/2017 | |
| KR | 10-1941624 B1 | 1/2019 | |

OTHER PUBLICATIONS

U.S. Non-final Office Action dated Jul. 22, 2020, issued in U.S. Appl. No. 16/872,828.
Indian Office Action dated Jan. 29, 2021, issued in Indian Application No. 201924032113.
Korean Office Action dated Dec. 11, 2020, issued in Korean Application No. 10-2018-0092721.
Extended European Search Report dated Feb. 11, 2022, issued in European Patent Application No. 21206027.1-1216.
Chinese Office Action dated Mar. 30, 2023, issued in Chinese Patent Application No. 201910728605.5.
Chinese Decision to Grant with English translation dated Nov. 20, 2023; Chinese Appln. No. 201910728605.5.
European Search Report dated Sep. 26, 2023; European Appln. No. 21 206 027.1-1224.

* cited by examiner

| Case Num | First short-range communication controller | Second short-range communication controller |
|---|---|---|
| 1 | Connected | Connected |
| 2 | Disconnected | Sleep |
| 3 | Disconnected | IC Freeze (Down) |
| 4 | Disconnected | Connected to other device |
| 5 | Disconnected | Low battery |
| 6 | Connected to other Stylus | Sleep |
| 7 | Connected to other Stylus | IC Freeze |
| 8 | Connected to other Stylus | Connected to other device |
| 9 | Connected to other Stylus | Battery low |

FIG.17

ELECTRONIC DEVICE FOR CONTROLLING COMMUNICATION CONNECTION WITH INPUT DEVICE AND METHOD OF CONTROLLING SAME

CROSS-REFERENCE TO RELATED APPLICATION(S)

This application is a continuation application of prior application Ser. No. 16/534,496, filed on Aug. 7, 2019, which is based on and claims priority under 35 U.S.C § 119(a) of a Korean patent application number 10-2018-0092721, filed on Aug. 8, 2018, in the Korean Intellectual Property Office, the disclosure of which is incorporated by reference herein in its entirety.

BACKGROUND

1. Field

The disclosure relates to electronic devices to control communication connection with an input device and methods of controlling the same.

2. Description of Related Art

Various services and additional functions provided through electronic devices, e.g., smartphones, or other portable electronic devices have gradually increased. To meet the various needs of users and raise use efficiency of electronic devices, communication service carriers or electronic device manufacturers provide various functions and have competitively developed electronic devices in order to differentiate them from other companies. Accordingly, various functions that are provided through electronic devices have also gradually become more advanced.

Electronic devices are developed to establish communication connection with input devices to be able to receive various inputs from users. Pen input devices (e.g., stylus pens or electronic pens) are among such input devices. Electronic devices may receive inputs through the touchscreen from a pen input device.

Pen input devices (also referred to herein as stylus pens) adopt electromagnetic resonance (EMR) as one input scheme. With the EMR scheme, an electronic device may identify the position of a stylus pen. The electronic device may transmit and receive signals containing various pieces of information to/from the input device based on the EMR scheme and perform various operations.

A pen input device may be connected with an electronic device (e.g., a stylus pen-equippable smartphone) via short-range communication (e.g., Bluetooth low energy (BLE)). The user of the electronic device may use various functions (e.g., running an application) using the stylus pen connected with the electronic device via short-range communication. The trend of making stylus pens more compact demands technology to minimize power consumption while forming or establishing a short-range communication connection with an electronic device.

The electronic device may perform scanning to obtain an advertising message (or advertising signal) broadcast from the stylus pen to establish short-range communication connection with the stylus pen. In this case, the electronic device may be unaware of the time that the stylus pen broadcasts the advertising message and thus needs continuous scanning (i.e., without pause). Such continuous scanning may cause the electronic device to consume more power.

The electronic device may supply power to the stylus pen to charge the stylus pen. If the stylus pen has a defect (e.g., software defect), the stylus pen may be charged but may not broadcast advertising messages, resulting in failure to establish a wireless communication connection.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of saving the battery power of the electronic device by performing scanning to receive an advertising message broadcast from a stylus pen at a predesignated period.

Another aspect of the disclosure is to provide an electronic device capable of switching the state of a stylus pen which has a defect into a state in which the stylus pen may be normally operated (e.g., a state in which the stylus pen is able to broadcast advertising messages) by resetting the stylus pen using a charging signal.

Additional aspects will be set forth in part in the description which follows and, in part, will be apparent from the description, or may be learned by practice of the presented embodiments.

In accordance with an aspect of the disclosure, an electronic device is provided. The electronic device includes a housing including an inner space, a hole formed through the housing to the internal space, a stylus pen insertable into the internal space through the hole, wherein the stylus pen includes a first wireless communication circuit and a wireless charging receiver circuit, a wireless charging transmitter circuit positioned inside the housing and configured to provide charging to the wireless charging receiver circuit when the stylus pen is inserted into the inner space, a second wireless communication circuit positioned inside the housing, at least one processor operatively connected to the wireless charging transmitter circuit and the second wireless communication circuit, and at least one memory operatively connected to the at least one processor, wherein the at least one memory stores instructions that, when executed, cause the at least one processor to detect whether the stylus pen is inserted into the inner space, start to provide charging for a first duration to the wireless charging receiver circuit using the wireless charging transmitter circuit after detecting that the stylus pen is inserted into the inner space, scan for a wireless signal from the first wireless communication circuit using the second wireless communication circuit after the starting to provide charging, receive the wireless signal from the first wireless communication circuit using the second wireless communication circuit, stop providing charging for the first duration to the wireless charging receiver circuit after receiving the wireless signal, and transmit a connection request using the second wireless communication circuit to the first wireless communication circuit.

In accordance with another aspect of the disclosure, a method of controlling an electronic device is provided. The method includes detecting whether a stylus pen is inserted into an inner space of the electronic device, starting to provide charging for a first duration to the stylus pen after detecting insertion of the stylus pen into the inner space, scanning for a wireless signal from the stylus pen after the starting to provide charging, receiving the wireless signal from the stylus pen, after receiving the wireless signal, stopping providing charging for the first duration to the stylus pen, and transmitting a connection request to the stylus pen.

In accordance with another aspect of the disclosure, a stylus pen is provided. The stylus pen includes a printed circuit board (PCB) electrically connected with a wireless charging coil positioned in a pen tip inside a cylindrical housing. The printed circuit board may include a resonance circuit configured to, together with the wireless charging coil, receive a charging resonance frequency signal, a charging circuit configured to convert the charging resonance frequency signal into a direct current (DC) charging signal corresponding to the charging resonance frequency signal, a charging control circuit configured to control a charge-on switch to electrically connect to the charging circuit with an electric double layered capacitor (EDLC) battery corresponding to the charging signal exceeding a reference charging voltage and electrically disconnect the charging circuit and the EDLC battery from each other corresponding to the charging signal not more than the reference charging voltage, a power-on control circuit configured to control a power switch in a first connection state when a voltage of the EDLC battery is not more than a power-off voltage and in a second connection state when the voltage of the EDLC battery is not less than a power-on voltage, corresponding to an output of the charging control circuit, and to maintain the second connection state regardless of the voltage of the EDLC battery corresponding to non-output from the charging control circuit, and a processor configured to perform a power-on sequence of the processor corresponding to an output of the power-on control circuit and connect an external device with a wireless communication network.

In accordance with another aspect of the disclosure, a stylus pen is provided. The stylus pen included a housing, a coil positioned in the housing and configured to receive a first signal when the stylus pen is inserted into an electronic device, a voltage detector positioned in the housing and operatively connected to the coil, and a wireless communication circuit positioned in the housing and operatively connected to the voltage detector, wherein the voltage detector may be configured to detect a strength of the received first signal, and when the detected strength of the first signal is not less than a predesignated strength, transmit a second signal to the wireless communication circuit, and wherein the wireless communication circuit is configured to transmit a wireless signal to the electronic device based on the transmitted second signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 is a view illustrating an example operation of wireless communication connection according to the state of an electronic device and a stylus pen according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
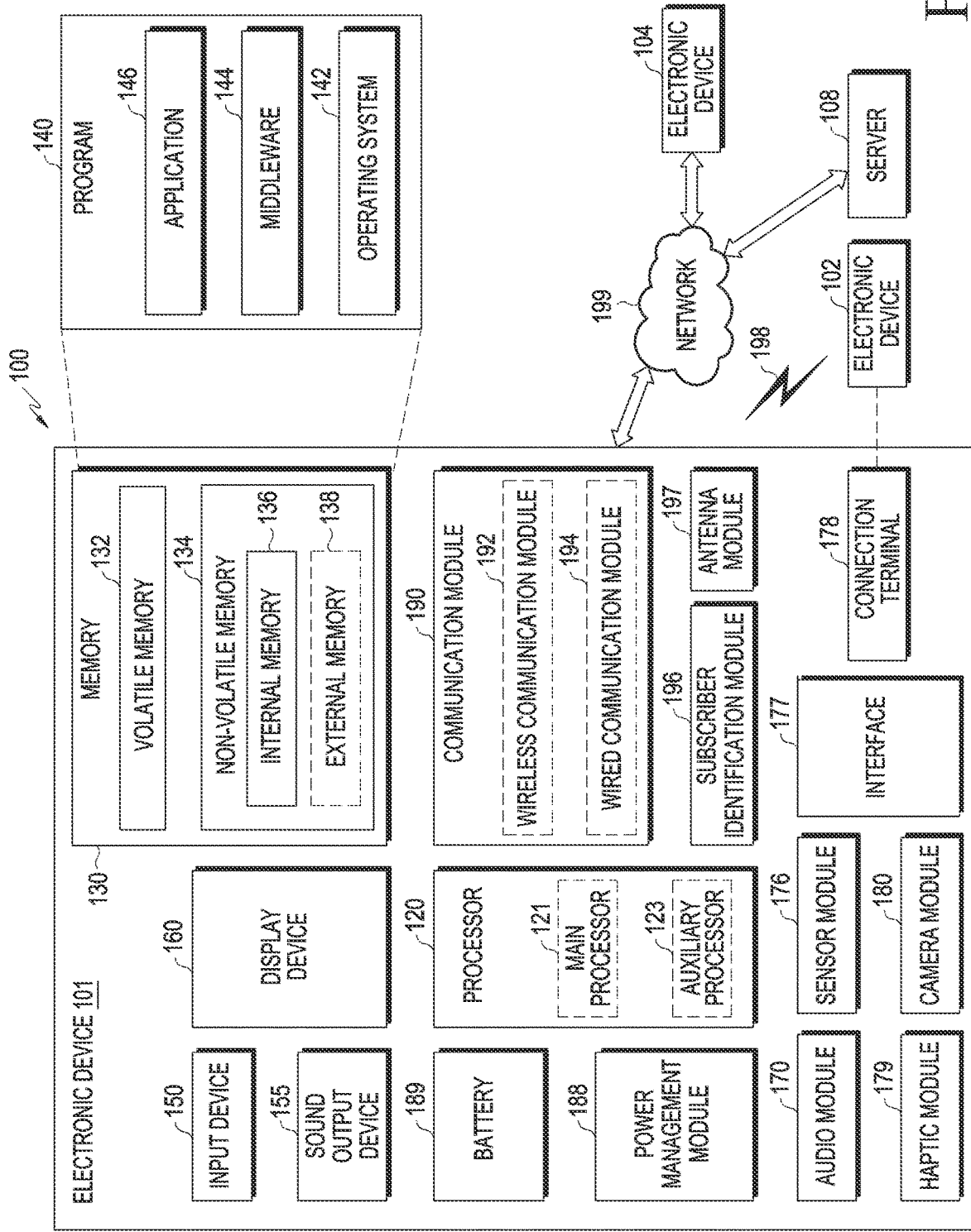
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101 from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
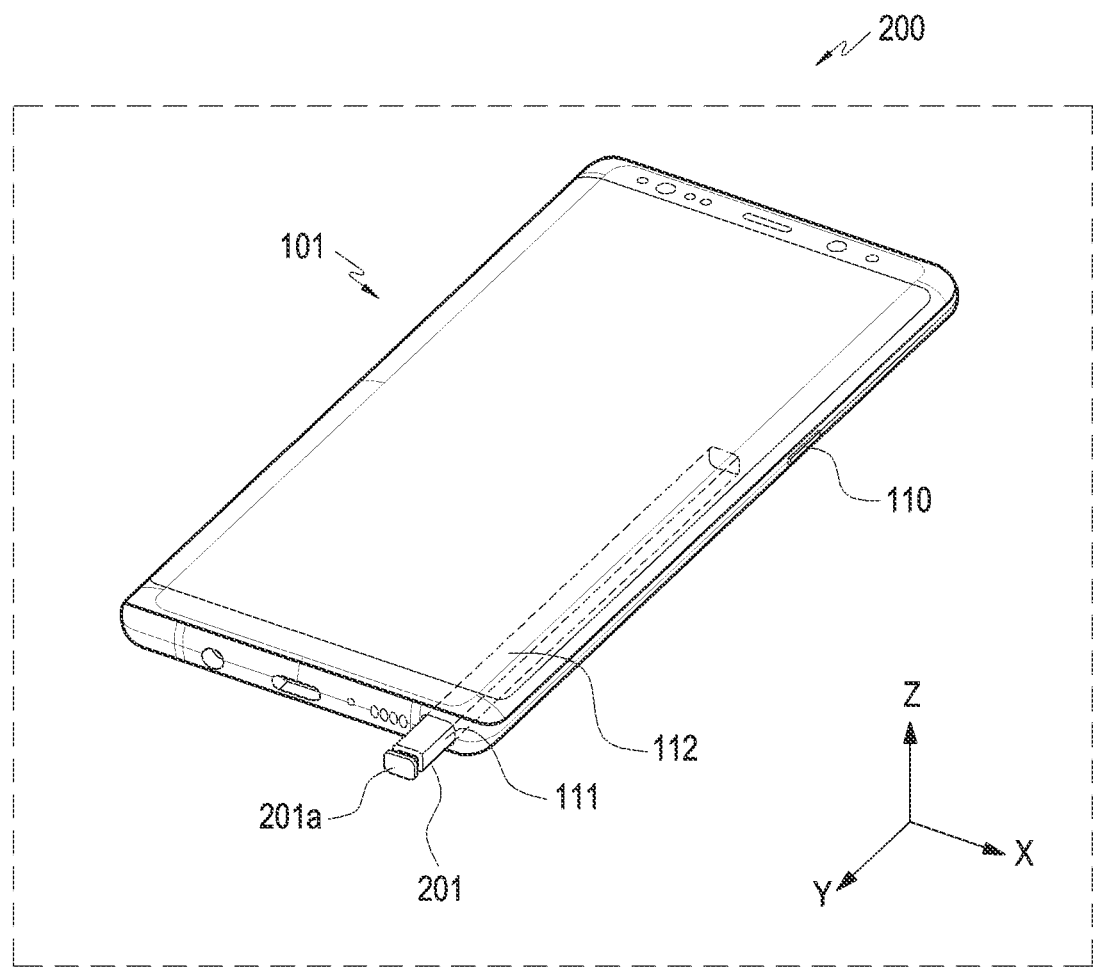
FIG. 2 is a perspective view illustrating an electronic device including a stylus pen according to an embodiment of the disclosure.

FIG. 2 is a perspective view illustrating an electronic device including a stylus pen (e.g., a digital pen) according to an embodiment of the disclosure.

Referring to FIG. 2, according to an embodiment, in a perspective view 200, the electronic device 101 may include the components shown in FIG. 1 and may have a structure for inserting a digital pen 201 (e.g., a stylus pen). The electronic device 101 may include a housing 110 and have a hole 111 in a portion, e.g., a side portion, of the housing. The electronic device 101 may include a receiving space 112 connected with the hole 111, and the digital pen 201 may be inserted in the receiving space 112. In the embodiment shown, the digital pen 201 may have a pressable button 201*a* at an end to be easily pulled out of the receiving space 112 of the electronic device 101. When the button 201*a* is pressed, a repulsive mechanism (e.g., at least one spring) configured in association with the button 201*a* may be operated to allow the digital pen 201 to be removed from the receiving space 112.

Figure 3:
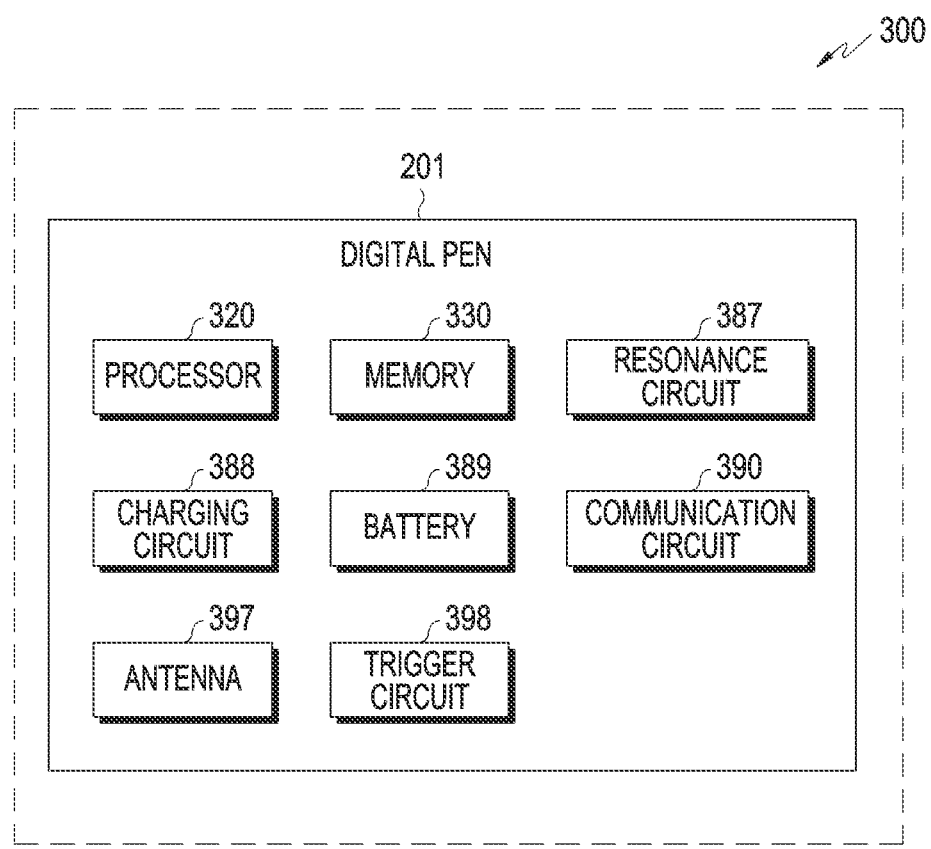
FIG. 3 is a block diagram illustrating a stylus pen according to an embodiment of the disclosure.

FIG. 3 is a block diagram illustrating a stylus pen (e.g., a digital pen) according to an embodiment of the disclosure.

Referring to FIG. 3, according to an embodiment, in a block diagram 300, the digital pen 201 may include a processor 320, a memory 330, a resonance circuit 387, a charging circuit 388, a battery 389, a communication circuit 390, an antenna 397, and/or a trigger circuit 398. According to an embodiment, the processor 320, at least part of the resonance circuit 387, and/or at least part of the communication circuit 390 of the digital pen 201 may be configured in the form of a chip or on a printed circuit board. The processor 320, the resonance circuit 387, and/or the communication circuit 390 may be electrically connected with the memory 330, the charging circuit 388, the battery 389, the antenna 397, or the trigger circuit 398. According to an embodiment, the digital pen 201 may be configured only of a resonance circuit and a button.

The processor 320 may include a customized hardware module or a generic processor configured to execute software (e.g., an application program). The processor may include a hardware component (function) or software element (program) including at least one of a communication module or a module to manage the state or environment of the digital pen 201, an input/output interface, a data measuring module, and various sensors provided in the digital pen 201. The processor 320 may include one of, e.g., hardware, software, or firmware, or a combination of two or more thereof. According to an embodiment, the processor 320 may receive a proximate signal corresponding to an electromagnetic signal generated from a digitizer (e.g., the electromagnetic induction panel 490) of the electronic device 101 through the resonance circuit 387. When the proximate signal is identified, the processor 320 may control the resonance circuit 387 to transmit an electromagnetic resonance (EMR) input signal to the electronic device 101.

The memory 330 may store information related to the operation of the digital pen 201. For example, the information may include information for communicating with the electronic device 101 and frequency information related to the input operation of the digital pen 201.

The resonance circuit 387 may include at least one of a coil, an inductor, or a capacitor. The resonance circuit 387 of the digital pen 201 may generate a signal having a resonance frequency. For example, to generate the signal, the digital pen 201 may use at least one of an EMR scheme, an active electrostatic (AES) scheme, or an electrically coupled resonance (ECR) scheme. When the digital pen 201 transmits signals via the EMR scheme, the digital pen 201 may generate a signal having a resonance frequency based on an electromagnetic field generated from the inductive panel of the electronic device 101. When the digital pen 201 transmits signals via the AES scheme, the digital pen 201 may generate a signal using a capacitive coupling with the electronic device 101. When the digital pen 201 transmits signals via the ECR scheme, the digital pen 201 may generate a signal having a resonance frequency based on an electric field generated from a capacitive device of the electronic device. According to an embodiment, the resonance circuit 387 may be used to vary the frequency or strength of electromagnetic field according to the user's manipulation state. For example, the resonance circuit 387 may provide a frequency to recognize a hovering input, drawing input, button input, or erasing input.

When connected with the resonance circuit 387 based on a switching circuit, the charging circuit 388 may rectify a resonance signal generated from the resonance circuit 387 into a direct current (DC) signal and provide the DC signal to the battery 389. According to an embodiment, the digital pen 201 may identify whether the digital pen 201 is inserted in the electronic device 101 using a voltage level of a DC signal sensed by the charging circuit 388.

The battery 389 may be configured to store power required to operate the digital pen 201. The battery may include, e.g., a lithium-ion battery or a capacitor and may be recharged or replaced. According to an embodiment, the battery 389 may be charged with power (e.g., DC signal (DC power)) received from the charging circuit 388.

The communication circuit 390 may be configured to perform wireless communication between the digital pen 201 and the communication module 190 of the electronic device 101. According to an embodiment, the communication circuit 390 may transmit input information and state information about the digital pen 201 to the electronic device 101 using a short-range communication scheme. For example, the communication circuit 390 may transmit direction information (e.g., motion sensor data) about the digital pen 201 obtained through the trigger circuit 398, voice information entered through the microphone, or remaining power information about the battery 389 to the electronic device 101. As an example, the short-range communication scheme may include at least one of Bluetooth, Bluetooth low energy (BLE) or wireless local area network (WLAN).

The antenna 397 may be used to transmit signals or power to the outside (e.g., the electronic device 101) or receive signals or power from the outside. According to an embodiment, the digital pen 201 may include a plurality of antennas 397 and select at least one antenna 397 appropriate for the communication scheme from among the plurality of antennas. The communication circuit 390 may exchange signals or power with an external electronic device through the at least one selected antenna 397.

The trigger circuit 398 may include at least one button or sensor circuit. According to an embodiment, the processor 320 may identify the input scheme (e.g., touch or press) or kind (e.g., EMR button or BLE button) of the button of the digital pen 201. According to an embodiment, the sensor circuit may generate an electrical signal or data value corresponding to an internal operating state or external environmental state of the digital pen 201. For example, the sensor circuit may include at least one of a motion sensor, a remaining battery sensor, a pressure sensor, a light sensor, a temperature sensor, a geomagnetic sensor, or a biometric sensor. According to an embodiment, the trigger circuit 398 may transmit a trigger signal to the electronic device 101 using a signal through a sensor or a button input signal.

Figure 4:
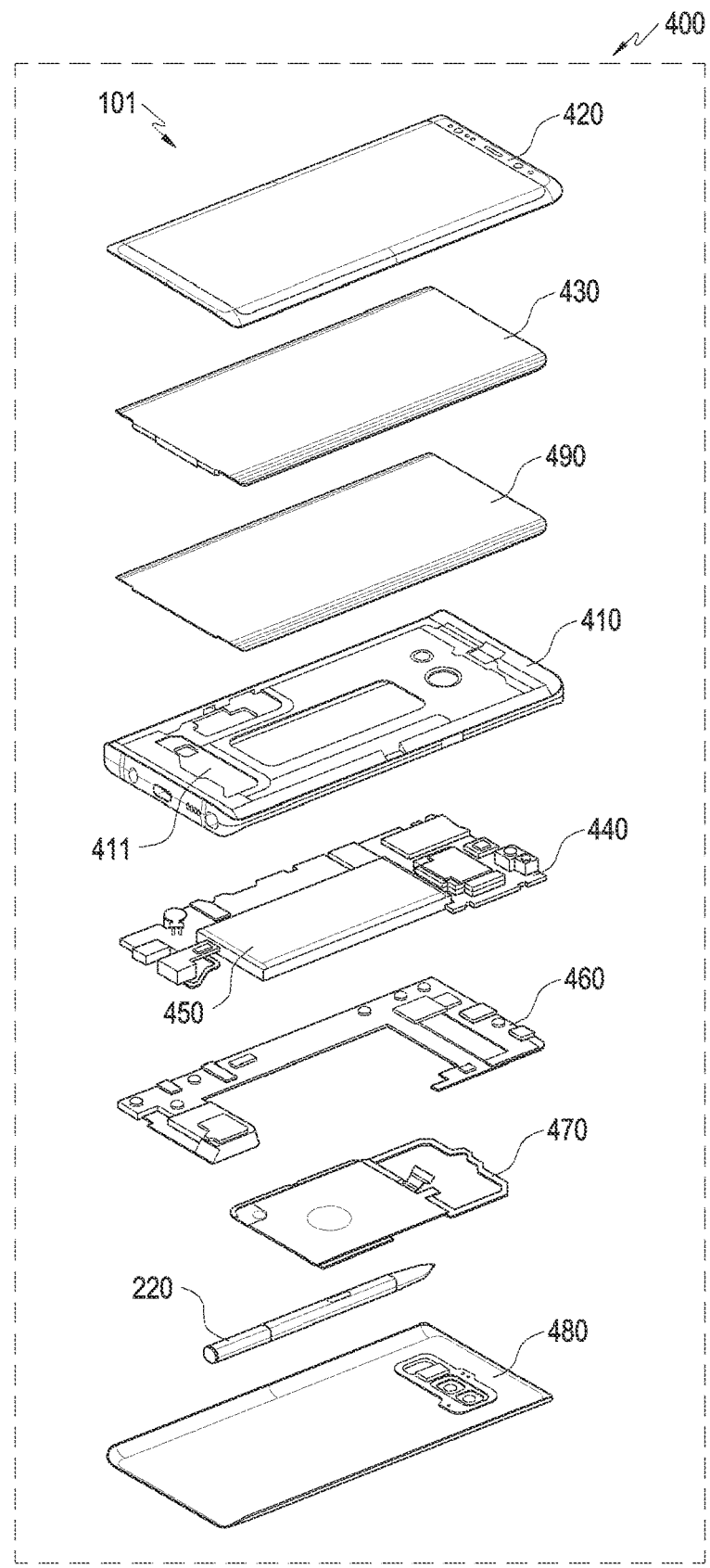
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, in a view 400, an electronic device 101 may include a side bezel structure 410, a first supporting member 411 (e.g., a bracket), a front plate 420, a display 430, an electromagnetic induction panel 490, a printed circuit board (PCB) 440, a battery 450 (e.g., the battery 189 of FIG. 1), a second supporting member 460 (e.g., a rear case), an antenna 470 (e.g., the antenna module 197 of FIG. 1), a stylus pen 220 (e.g., the digital pen 201 of FIG. 2), and a rear plate 480. According to an embodiment, the electronic device 101 may exclude at least one (e.g., the first supporting member 411 or the second supporting member 460) of the components or may add other components. At least one of the components of the electronic device 101 may be the same or similar to at least one of the components of the electronic device 101 of FIGS. 1 and 2 and no duplicate description is made below.

According to an embodiment, the electromagnetic induction panel 490 (e.g., a digitizer) may be a panel for detecting input by the stylus pen 220. For example, the electromagnetic induction panel 490 may include a flexible printed circuit board (FPCB) and a shielding sheet. The shielding sheet may prevent inter-component interference by an electromagnetic field produced from the components (e.g., the display module, PCB, or electromagnetic induction panel) included in the electronic device 101. The shielding sheet may shield off electromagnetic fields produced from the components, thereby allowing an input from the stylus pen 220 to be precisely delivered to the coil included in the electromagnetic induction panel 490. According to an embodiment, the electromagnetic induction panel 490 may include an opening formed in at least a portion corresponding to the biometric sensor embedded in the electronic device 101.

According to an embodiment, the first supporting member 411 may be disposed inside the electronic device 101 to be connected with the side bezel structure 410 or integrated with the side bezel structure 410. The first supporting member 411 may be formed of, e.g., a metal and/or non-metallic material (e.g., polymer). The display 430 may be joined onto one surface of the first supporting member 411, and the printed circuit board 440 may be joined onto the opposite surface of the first supporting member 311. A processor (e.g., the processor 120 of FIG. 1), a memory (e.g., the memory 130 of FIG. 1), and/or an interface may be mounted on the printed circuit board 440. The processor (e.g., the processor 120 of FIG. 1) may include one or more of, e.g., a central processing unit, an application processor, a graphic processing device, an image signal processing, a sensor hub processor, or a communication processor.

According to an embodiment, the memory (e.g., the memory 130 of FIG. 1) may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multi-media card (MMC) connector, or an audio connector.

According to an embodiment, the battery 450 (e.g., the battery 189 of FIG. 1) may be a device for supplying power to at least one component of the electronic device 101. The battery 189 may include, e.g., a primary cell which is not rechargeable, a secondary cell which is rechargeable, or a fuel cell. At least a portion of the battery 450 (e.g., the battery 189 of FIG. 1) may be disposed on substantially the same plane as the printed circuit board 440. The battery 450 (e.g., the battery 189 of FIG. 1) may be integrally or detachably disposed inside the electronic device 101.

According to an embodiment, the antenna 470 (e.g., the antenna module 197 of FIG. 1) may be disposed between the rear plate 480 and the battery 450 (e.g., the battery 189 of FIG. 1). The antenna 470 (e.g., the antenna module 197 of FIG. 1) may include, e.g., a near-field communication (NFC) antenna, a wireless charging antenna, and/or a magnetic secure transmission (MST) antenna. The antenna 470 may perform short-range communication with, e.g., an external device or may wirelessly transmit or receive power necessary for charging. According to an embodiment, an antenna structure may be formed by a portion or combination of the side bezel structure 410 and/or the first supporting member 411.

Figure 5:
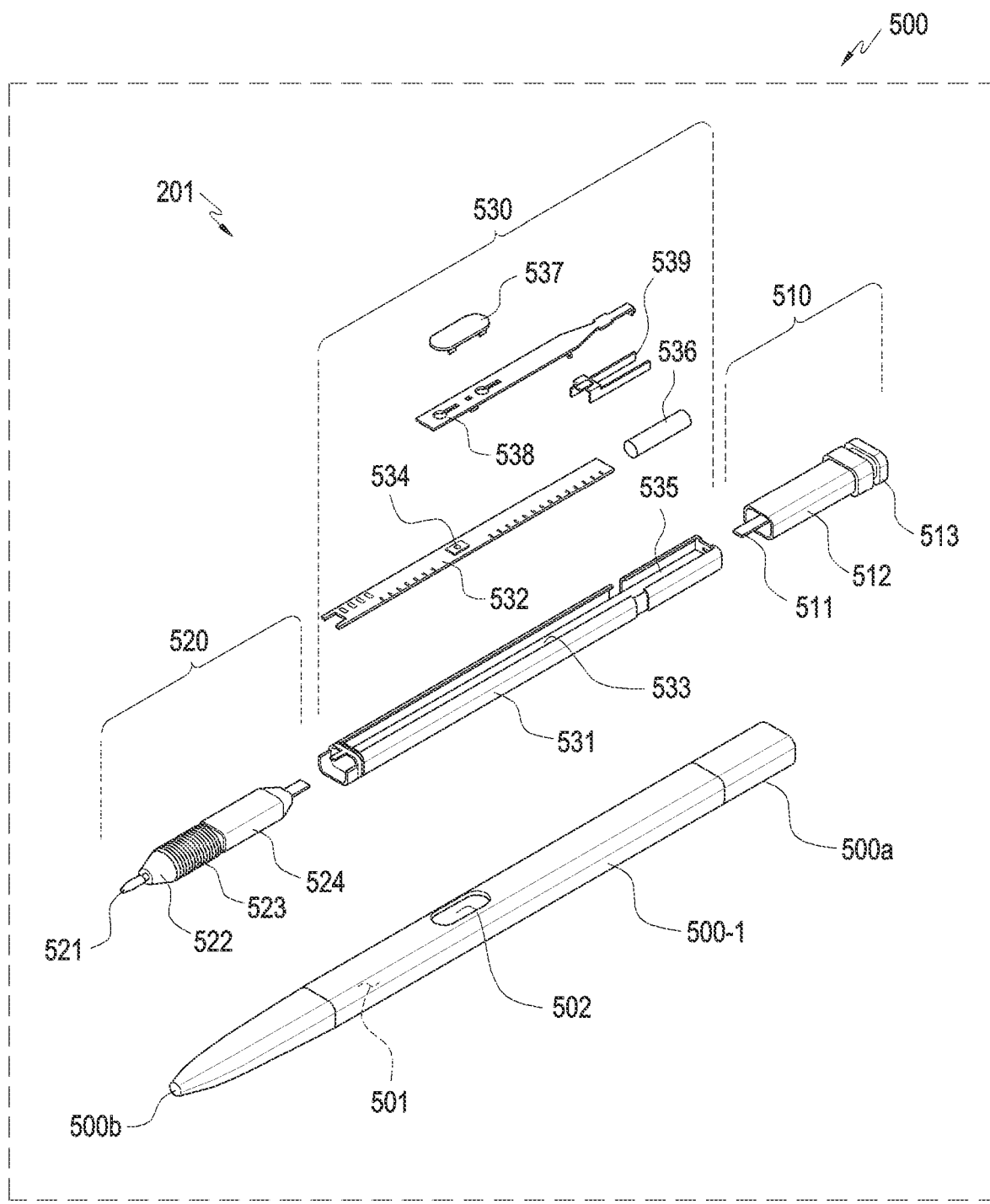
FIG. 5 is an exploded perspective view illustrating a stylus pen according to an embodiment of the disclosure.

FIG. 5 is an exploded perspective view of a stylus pen (e.g., the digital pen 201 of FIG. 2) according to an embodiment of the disclosure.

Referring to FIG. 5, in a view 500, the digital pen 201 may include a pen housing 500-1 forming the outer appearance of the digital pen 201 and an inner assembly inside the pen housing 500-1. In the embodiment shown, the inner assembly may include all of several parts mounted inside the pen and may be inserted into the pen housing 500-1 by a single assembly operation.

The pen housing 500-1 may include an elongated receiving space 501 between a first end 500a and a second end 500b thereinside. The cross section of the pen housing 500-1 may be shaped as an ellipse with a longer axis and a shorter axis and may overall be shaped as an elliptical cylinder. Corresponding to the shape of the pen housing 500-1, the receiving space 112 of the electronic device 101 may also have an elliptical cross section. The pen housing 500-1 may include a synthetic resin (e.g., plastic) and/or a metal (e.g., aluminum). According to an embodiment, the second end 500b of the pen housing 500-1 may be formed of a synthetic resin.

The inner assembly may be elongated corresponding to the shape of the pen housing 500-1. The inner assembly may largely be divided into three components along the lengthwise direction. For example, the inner assembly may include an ejection member 510 disposed in the position corresponding to the first end 500a of the pen housing 500-1, a coil part 520 disposed in the position corresponding to the second end 500b of the pen housing 500-1, and a circuit board part 530 disposed in the position corresponding to the body of the housing.

The ejection member 510 may include a configuration to pull the digital pen 201 out of the receiving space 112 of the electronic device 101. According to an embodiment, the ejection member 510 may include a shaft 511, an ejection body 512 disposed around the shaft 511 to form the overall outer appearance of the ejection member 510, and a button part 513. When the inner assembly is fully inserted into the pen housing 500-1, the portion including the shaft 511 and the ejection body 512 may be surrounded by the first end 500a of the pen housing 500-1, and the button part 513 (e.g., 201a of FIG. 2) may be exposed to the outside of the first end 500a. A plurality of parts (not shown), e.g., cam members or elastic members, may be disposed in the ejection body 512 to form a push-pull structure. According to an embodiment, the button part 513 may substantially be coupled with the shaft 511 to linearly move back and forth along the ejection body 512. According to an embodiment, the button part 513 may include a button with a jaw to allow the user to pull out the digital pen 201 with his or her fingernail. According to an embodiment, the digital pen 201 may include a sensor to detect the linear motion of the shaft 511 to thereby provide another input scheme.

The coil part 520 may include a pen tip 521, which is exposed to the outside of the second end 500b when the inner assembly is fully inserted into the pen housing 500-1, a packing ring 522, a coil 523 wound multiple times, and/or a pen pressure sensor 524 to obtain variations in pressure when the pen tip 521 is pressurized. The packing ring 522 may include epoxy, rubber, urethane, or silicone. The packing ring 522 may be provided for waterproof or dustproof purposes and protect the coil part 520 and the circuit board part 530 from water or dust. According to an embodiment, the coil 523 may form a resonance frequency within a preset frequency band (e.g., 500 kHz) and may be combined with at least one device (e.g., a capacitor) to adjust the resonance frequency produced by the coil 523 within a predetermined range.

The circuit board part 530 may include a printed circuit board 532, a base 531 surrounding at least one surface of the printed circuit board 532, and an antenna. According to an embodiment, a board seating part 533 may be formed on top of the base 531 to allow the printed circuit board 532 to rest, and the printed circuit board 532 may be seated and fastened onto the board seating part 533. According to an embodiment, the printed circuit board 532 may include a top surface and a bottom surface. A variable capacitor or a switch 534 may be disposed on the top surface of the printed circuit board 532, and a charging circuit, a battery 536 (e.g., the battery 389 of FIG. 3), or a communication circuit may be disposed on the bottom surface of the printed circuit board 532. The battery 536 may include an electric double layered capacitor (EDLC). The charging circuit may be positioned between the coil 523 and the battery (e.g., the battery 389 of FIG. 3) and may include a voltage detector circuit and a rectifier.

The antenna may include an antenna structure 539 as shown in FIG. 5 and/or an antenna embedded in the printed circuit board 532. According to an embodiment, a switch 534 may be provided on the printed circuit board 532. A side button 537 provided to the digital pen 201 may be used to press the switch 534 and may be exposed to the outside through a side opening 502 of the pen housing 500-1. The side button 537 may be supported by the supporting member 538 and, if no external force is applied to the side button 537, the supporting member 538 may provide an elastic restoration force to allow the side button 537 to remain or go back to a predetermined position.

The circuit board part 530 may include another packing ring such as an O-ring. For example, O-rings may be disposed at both ends of the base 531, thereby forming a sealing structure between the base 531 and the pen housing 500-1. According to an embodiment, the supporting member 538 may partially come in tight contact with the inner wall of the pen housing 500-1 around the side opening 502, thereby forming a sealing structure. For example, the circuit board part 530 may also form a waterproof, dustproof structure similar to the packing ring 522 of the coil part 520.

The digital pen 201 may include a battery seating part 535 on the top surface of the base 531 to allow the battery 536 (e.g., the battery 389 of FIG. 3) to sit thereon. The battery 536 mountable on the battery seating part 535 may include, e.g., a cylinder-type battery.

The digital pen 201 may include a microphone (not shown). The microphone may be connected directly to the printed circuit board 532 or to a separate flexible printed circuit board (FPCB) (not shown) connected with the printed circuit board 532. According to an embodiment, the microphone may be disposed in a position parallel with the side button 537 along the longer direction of the digital pen.

Figure 6:
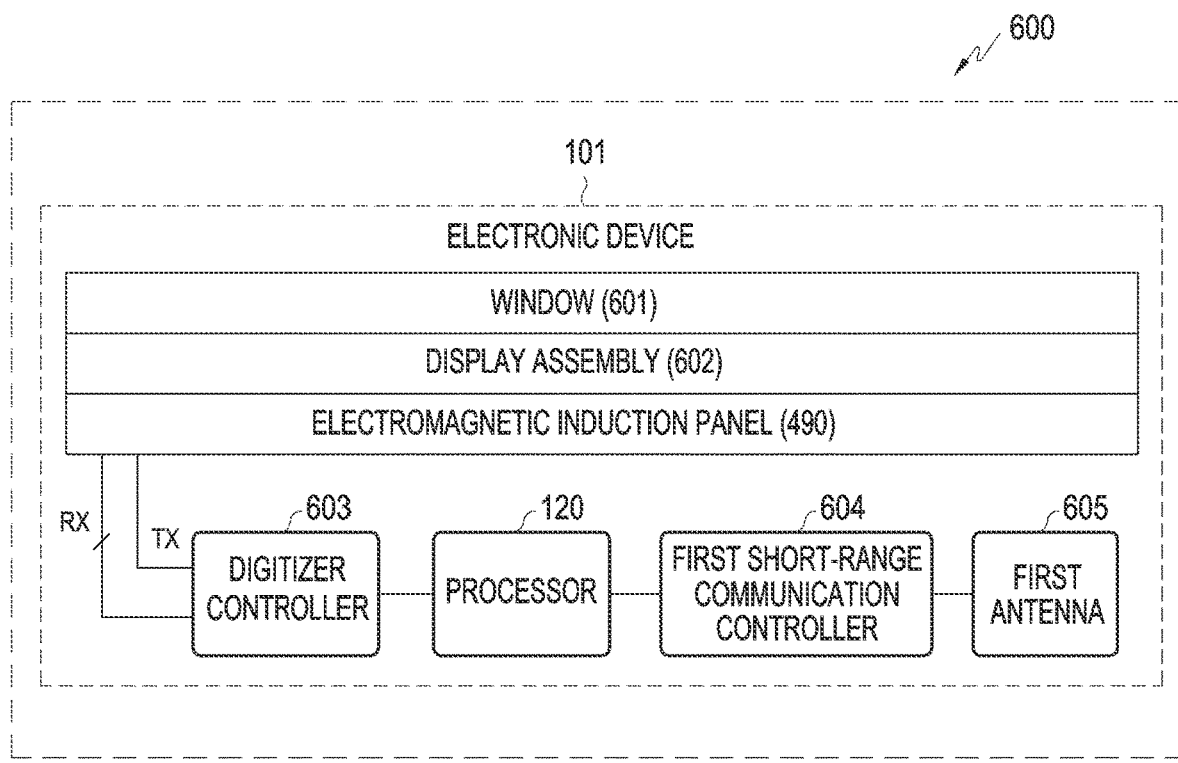
FIG. 6 is a view illustrating an example electronic device according to an embodiment of the disclosure.

FIG. 6 is a view illustrating an example electronic device according to an embodiment of the disclosure.

Referring to FIG. 6, in a view 600, the electronic device 101 may include a window 601, a display assembly 602, an electromagnetic induction panel 490 (e.g., a digitizer), a first short-range communication controller 604 (e.g., the wireless communication module 192), a first antenna 605 (e.g., the antenna module 197), a digitizer controller 603, a detecting coil (not shown), and a processor 120.

According to an embodiment, the window 601 may be formed of a material (e.g., glass) to protect the display assembly 602 from external impacts. According to an embodiment, the window 601 may be coupled (e.g., attached) with the display assembly 602 in the form of covering the whole area of the display assembly 602.

According to an embodiment, the display assembly 602 may visually provide information to the outside (e.g., the user) of the electronic device (e.g., the electronic device 101 of FIG. 1). According to an embodiment, the display assembly 602 may include, e.g., a display (e.g., the display device 160 of FIG. 1), a hologram device, or a projector, and a control circuit to control the device. According to an embodiment, the display assembly 602 may include touch circuitry adapted to detect a touch, or sensor circuitry (e.g., a pressure sensor) adapted to measure the intensity of force incurred by the touch.

According to an embodiment, the electromagnetic induction panel 490 may output a signal (e.g., an electromagnetic field) to identify the position of a stylus pen (e.g., the stylus pen 220 of FIG. 4). According to an embodiment, the same description as that of FIG. 4 may apply to the electromagnetic induction panel 490.

Figure 7:
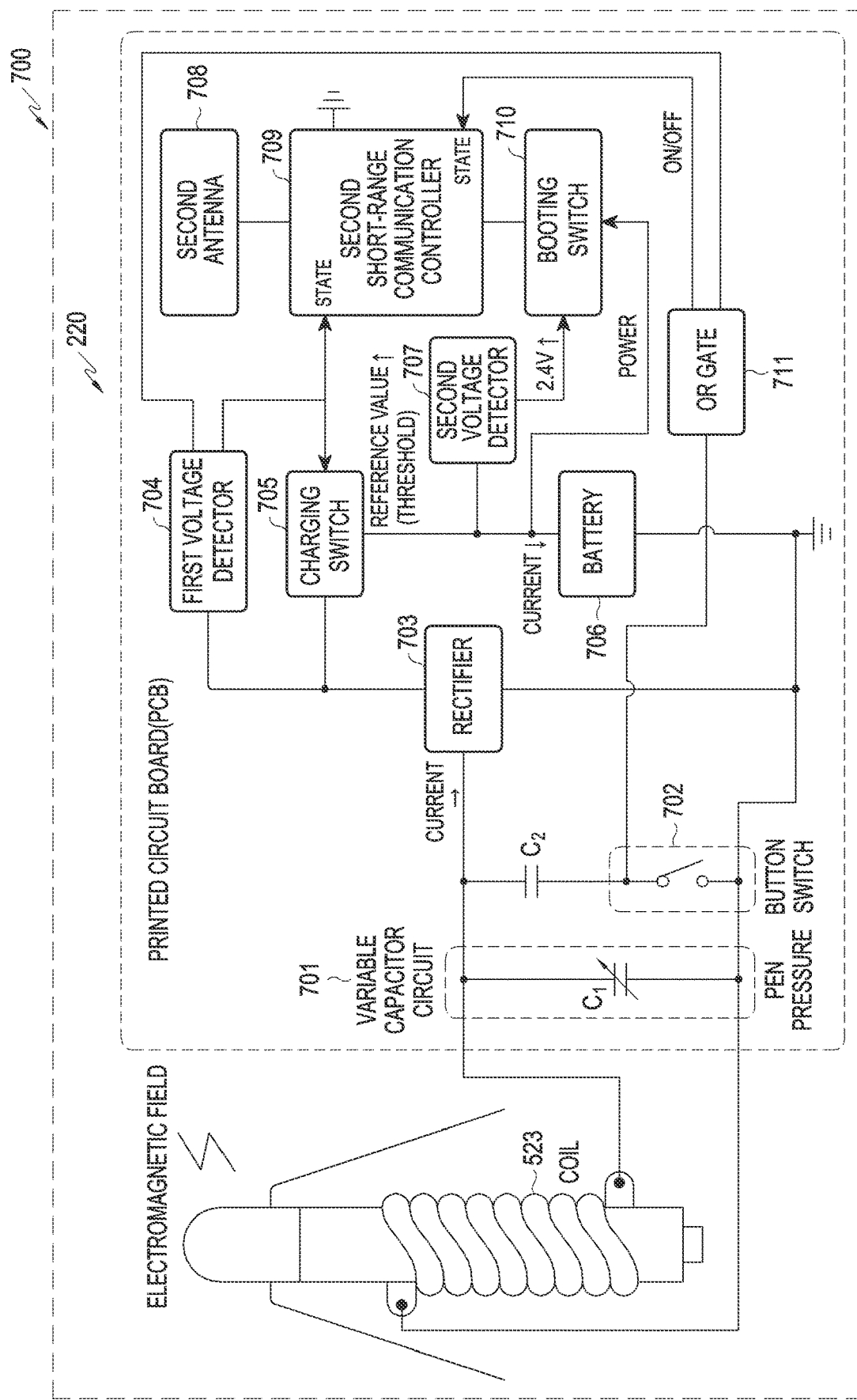
FIG. 7 is a view illustrating example stylus pens according to various embodiments of the disclosure.

According to an embodiment, the first short-range communication controller 604 (e.g., the wireless communication module 192) may transmit and receive signals to form a wireless communication connection with a wireless communication module (e.g., the second short-range communication controller 709 of FIG. 7) of an external electronic device (e.g., the stylus pen 220 of FIG. 4) with which it attempts to form a wireless communication (e.g., short-range communication) connection. According to an embodiment, the first short-range communication controller 604 may perform communication with the external electronic device (e.g., the stylus pen 220 of FIG. 4) using the wireless communication connection. According to an embodiment, the short-range communication may include, e.g., wireless fidelity (Wi-Fi), Wi-Fi direct, Bluetooth, Bluetooth low energy (BLE), or near-field communication (NFC).

According to an embodiment, the first antenna 605 (e.g., the antenna module 197) may be operatively connected to the first short-range communication controller 604. According to an embodiment, the first antenna 605 may transmit a signal received from the first short-range communication controller 604 to the external electronic device (e.g., the stylus pen 220 of FIG. 4). According to an embodiment, the first antenna 605 may receive signals from the external electronic device (e.g., the stylus pen 220 of FIG. 4).

According to an embodiment, the digitizer controller 603 may be connected to be able to operate with the electromagnetic induction panel 490, the detecting coil (e.g., the detecting coil 1101 of FIG. 11), or the processor 120. According to an embodiment, the digitizer controller 603 may transmit a detection signal to a coil (e.g., the coil 523 of FIG. 5) of the external electronic device (e.g., the stylus pen 220 of FIG. 4) using the detecting coil (e.g., the detecting coil 1101 of FIG. 11). According to an embodiment, the digitizer controller 603 may transmit the detection signal by generating a magnetic field which varies over time using the detecting coil (e.g., the detecting coil 1101 of FIG. 11) to generate (or induce) an electromagnetic force (or induced current) at the coil (e.g., the coil 523 of FIG. 5) of the external electronic device (e.g., the stylus pen 220 of FIG. 4). According to an embodiment, the detection signal may be an electromagnetic field signal with a particular frequency to identify whether the external electronic device (e.g., the stylus pen 220 of FIG. 4) is positioned on the touchscreen (e.g., the display device 160 of FIG. 1) or received inside the inner space (e.g., the receiving space 122 of FIG. 2) of the electronic device 101. According to an embodiment, the digitizer controller 603 may receive a response signal from the coil (e.g., the coil 523 of FIG. 5) of the external electronic device (e.g., the stylus pen 220 of FIG. 4) using the detecting coil (e.g., the detecting coil 1101 of FIG. 11). According to an embodiment, an induced current may be generated (or induced) at the detecting coil (e.g., the detecting coil 1101 of FIG. 11) by a variation in magnetic field from the external electronic device (e.g., the stylus pen 220 of FIG. 4) and, thus, the digitizer controller 603 may receive the response signal. According to an embodiment, the electronic device (e.g., the processor 120 or the digitizer controller 603) may identify the position of the external electronic device (e.g., the stylus pen 220 of FIG. 4) with respect to the electronic device based on the response signal. For example, the electronic device (e.g., the electronic device 101 of FIG. 1) may include a detecting coil in each of the inside of the electromagnetic induction panel 490 and the inner space (e.g., the receiving space 112 of FIG. 2) of the electronic device 101. According to an embodiment, the electronic device (e.g., the processor 120 or the digitizer controller 603) may identify the position of the stylus pen based on whether an induced current occurs from, at least, one of the detecting coil included in the inside of the electromagnetic induction panel 490 or the detecting coil (e.g., the detecting coil 1101 of FIG. 11) included in the inner space (e.g., the receiving space 112 of FIG. 2). For example, the electronic device 101 may identify whether the stylus pen is positioned on the display (e.g., the display device 160 of FIG. 1) (i.e., whether the stylus pen is being used) or inserted in the inner space (e.g., the receiving space 112 of FIG. 2) (i.e., whether the stylus pen is being charged) based on the position of the detecting coil where an induced current is generated (or induced) by the magnetic field from the stylus pen (e.g., the coil 523 of FIG. 5) of the detecting coils (e.g., the detecting coil (not shown) included in the inside of the electromagnetic induction panel 490 or the detecting coil (e.g., the detecting coil 1101 of FIG. 11) included in the inner space (e.g., the receiving space 112 of FIG. 2)) of the electronic device. According to an embodiment, when no induced current is generated or an induced current whose strength is smaller than a preset strength is generated from the detecting coil included in in the electromagnetic induction panel 490 and the detecting coil (e.g., the detecting coil 1101 of FIG. 11) included in the inner space (e.g., the receiving space 112 of FIG. 2), the electronic device (e.g., the processor 120 or the digitizer controller 603) may identify that the stylus pen (e.g., the stylus pen 220 of FIG. 4) is in the state of having been removed from the electronic device (e.g., the electronic device 101 of FIG. 1). According to an embodiment, the state of having been removed from the electronic device (e.g., the electronic device 101 of FIG. 1) may mean a state in which the stylus pen (e.g., the stylus pen 220 of FIG. 4) is not inserted in the electronic device (e.g., the receiving space 112 of FIG. 2) and is not positioned on the display (e.g., the display device 160 of FIG. 1) (including, e.g., a state in which the stylus pen is spaced a predetermined distance apart from the display of the electronic device).

Figure 11:
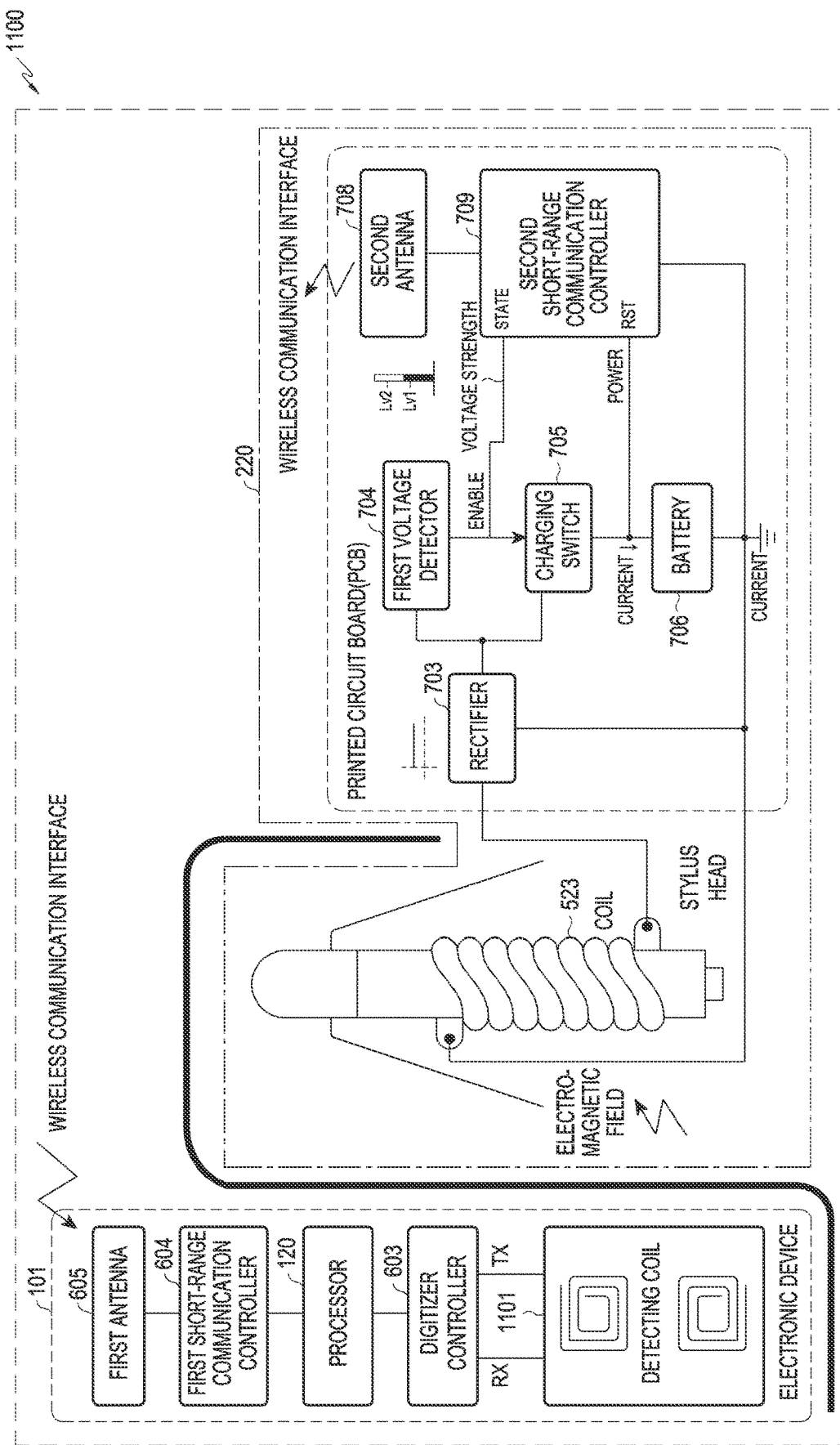
FIG. 11 is a view illustrating example operations between an electronic device and a stylus pen according to an embodiment of the disclosure.

According to an embodiment, the digitizer controller 603 may wirelessly transmit power to the external electronic device (e.g., the stylus pen 220 of FIG. 4) using the detecting coil (e.g., the detecting coil 1101 of FIG. 11). According to an embodiment, the digitizer controller 603 may wirelessly transmit power to the external electronic device (e.g., the stylus pen 220 of FIG. 4) by generating (or inducing) an induced current at the coil (e.g., the coil 523 of FIG. 5) of the external electronic device (e.g., the stylus pen 220 of FIG. 4) using the detecting coil (e.g., the detecting coil 1101 of FIG. 11).

According to an embodiment, the detecting coil (e.g., the detecting coil 1101 of FIG. 11) may be operatively connected with the digitizer controller 603 or the electromagnetic induction panel 490. According to an embodiment, the detecting coil (e.g., the detecting coil 1101 of FIG. 11) may generate a current (e.g., a detecting signal or a current to charge an external electronic device (e.g., the battery 706 of FIG. 7) at the coil (e.g., the coil 523 of FIG. 5) of the external electronic device (e.g., the stylus pen 220 of FIG. 4) based on mutual induction by the digitizer controller 603. According to an embodiment, the detecting coil (e.g., the detecting coil 1101 of FIG. 11) may transfer, to the digitizer controller 603, a current (e.g., a response signal) induced and generated by the magnetic field generated from the coil (e.g., the coil 523 of FIG. 5) of the external electronic device (e.g., the stylus pen 220 of FIG. 4).

According to an embodiment, the processor 120 may be operatively connected with the digitizer controller 603 or the first short-range communication controller 604. According to an embodiment, the processor 120 may control the components included in the electronic device 101 or monitor the state of the components. According to an embodiment, the processor 120 may control the electromagnetic induction panel 490 which is provided adjacent the display (e.g., the display device 160 of FIG. 1) through the digitizer controller 603 and obtain a signal received from an external electronic device (e.g., the stylus pen 220 of FIG. 4 or the electronic device 102 of FIG. 1). According to an embodiment, the digitizer controller 603 may include an independent control circuit to control the processing time of electrical signals input to or output from the electromagnetic induction panel 490 without control by the processor 120. According to an embodiment, the processor 120 may transmit electrical or magnetic signals to the external electronic device (e.g., the stylus pen 220 of FIG. 4) or receive electrical or magnetic signals from the external electronic device (e.g., the stylus pen 220 of FIG. 4) using the detecting coil (e.g., the detecting coil 523 of FIG. 5). According to an embodiment, the processor 120 may determine position information about the stylus pen (e.g., the stylus pen 220 of FIG. 4) (e.g., the state in which the stylus pen is inserted in the inner space or is being used over the display (e.g., the display device 160 of FIG. 1)) or state information (e.g., the remaining battery information or connection state information about the stylus pen) based on a signal received from the stylus pen (e.g., the stylus pen 220 of FIG. 4). According to an embodiment, the processor 120 may control the digitizer controller 603 to provide power to the stylus pen (e.g., the stylus pen 220 of FIG. 4) based on the determined position information about the stylus pen (e.g., the stylus pen 220 of FIG. 4) using a detecting coil (e.g., the detecting coil 1101 of FIG. 11). According to an embodiment, the processor 120 may control the display (e.g., the display device 160 of FIG. 1) to display the battery information or connection state information about the stylus pen (e.g., the stylus pen 220 of FIG. 4) based on the determined state information about the stylus pen (e.g., the stylus pen 220 of FIG. 4). According to an embodiment, the processor 120 may control the first short-range communication controller 604 to form a wireless communication connection with the stylus pen (e.g., the second short-range communication controller 709 of FIG. 7). According to an embodiment, when the stylus pen (e.g., the stylus pen 220 of FIG. 4) is inserted into the inner space (e.g., the receiving space 112 of FIG. 2), the processor 120 may repeat to provide power to the stylus pen (e.g., the stylus pen 220 of FIG. 4) during a first designated time (e.g., 9 seconds) using the digitizer controller 603 and to stop providing power during a second designated time (e.g., 1 second).

FIG. 7 is a view illustrating an example stylus pen according to an embodiment of the disclosure.

Referring to FIG. 7, in a view 700, a stylus pen 220 may include at least one of a coil 523, a variable capacitor circuit 701, a button switch 702, a rectifier 703, a first voltage detector 704, a charging switch 705, a battery 706 (e.g., the battery 389 of FIG. 3), a second voltage detector 707, a second antenna 708 (e.g., the antenna 397 of FIG. 3), a second short-range communication controller 709 (e.g., the communication circuit 390 of FIG. 3), a booting switch 710, or an OR gate 711.

According to an embodiment, the coil 523 may be operatively connected with the variable capacitor circuit 701. According to an embodiment, the coil 523 may transfer a current (e.g., a detection signal or a current to charge the external electronic device (e.g., the stylus pen 220 of FIG. 4)) generated from the electronic device (e.g., the electronic device 101 of FIG. 1) based on mutual induction to the variable capacitor circuit 701.

According to an embodiment, the variable capacitor circuit 701 may be a circuit which may have a variable capacitance and may include at least one of, e.g., one or more capacitors, one or more transistors, one or more input/output ports, or logic circuits.

According to an embodiment, the button switch 702 may be connected to be able to operate with at least one of the rectifier 703 or the OR gate 711. According to an embodiment, the button switch 702 may be shorted or open as the button (e.g., the switch 534 of FIG. 5) provided in the stylus pen 220 is pressed or touched. When the button switch 702 is shorted as the button (e.g., the switch 534 of FIG. 5) is pressed, the node of OR gate connecting with the capacitor C2 may be grounded and, when the button switch 702 is open as the pressing of the button (e.g., the switch 534 of FIG. 5) is released, the capacitor C2 may be connected in series with the OR gate. This may lead to a difference in the resonance frequency of the resonance circuit (e.g., the resonance circuit 387 of FIG. 3) formed by the coil 523 and the connected capacitors between when the button (e.g., the switch 534 of FIG. 5) is pressed and when the button (e.g., the switch 534 of FIG. 5) is not pressed. According to an embodiment, the electronic device 101 may identify whether the button (e.g., the switch 534 of FIG. 5) of the stylus pen 220 is pressed or not by identifying the frequency of the signal generated from the resonance circuit (e.g., the resonance circuit 387 of FIG. 3) of the stylus pen 220.

According to an embodiment, the rectifier 703 may be connected to be able to operate with at least one of the button switch 702, the first voltage detector 704, or the charging switch 705. According to an embodiment, the rectifier 703 may rectify alternating current (AC) power received from the electronic device (e.g., the electronic device 101 of FIG. 1) and output from the coil 523 into DC power and transfer the DC power to at least one of the first voltage detector 704 or the charging switch 705.

According to an embodiment, the first voltage detector 704 may be operatively connected with at least one of the rectifier 703, the charging switch 705, the second short-range communication controller 709, or the OR gate 711. According to an embodiment, the first voltage detector 704 may detect a voltage value on the path connecting the rectifier 703 and the second short-range communication controller 709. According to an embodiment, the first voltage detector 704 may detect whether the magnitude of the detected voltage belongs to a designated range based on the magnitude of the detected voltage value. According to an embodiment, the designated range may be divided into a range, e.g., from 1.5V to 3.5V (level 1 range) or a range not less than 3.5V (level 2 range) but this is merely an example. For example, when the magnitude of the detected voltage belongs to level 2 range, the stylus pen 220 may be in the state of having been inserted in the inner space (e.g., the receiving space 112 of FIG. 2) of the electronic device (e.g., the electronic device 101 of FIG. 1) and, when the magnitude of the detected voltage belongs to level 1 range, the stylus pen 220 may be in the state of being used over (touching) the display (e.g., the display device 160 of FIG. 1) of the electronic device (e.g., the electronic device 101 of FIG. 1) by the user. According to an embodiment, when the magnitude of the detected voltage belongs to level 2 range, the first voltage detector 704 may apply an enable signal to the charging switch 705 to turn on the charging switch 705 to allow the charging signal transmitted from the rectifier 703 to be applied to the battery 706. According to an embodiment, when the magnitude of the detected voltage belongs to level 1 range, the first voltage detector 704 may control the charging switch 705 to turn, or remain, off According to an embodiment, the first voltage detector 704 may transfer the DC power from the rectifier 703 to the charging switch 705.

According to an embodiment, when the magnitude of the detected voltage belongs to level 2 range, the first voltage detector 704 may apply an enable signal to the second short-range communication controller 709. In this case, the second short-range communication controller 709 may transmit a wireless signal (e.g., an advertising signal or message) to the first short-range communication controller 604 of the electronic device (e.g., the electronic device 101 of FIG. 1). According to an embodiment, when the magnitude of the detected voltage belongs to level 1 range, the first voltage detector 704 may not apply an enable signal to the second short-range communication controller 709. The enable signal may be, or may not necessarily be, of the same type as the enable signal that the first voltage detector 704 applies to the charging switch 705.

According to an embodiment, the first voltage detector 704 may include a conducting line between the first voltage detector 704 and the second short-range communication controller 709 to transmit, to the second short-range communication controller 709, a signal related to the above-described state of the stylus pen (e.g., the state in which the stylus pen is inserted in the inner space (e.g., the receiving space 112 of FIG. 2) of the electronic device 101 of FIG. 1 or touches the display (e.g., the display device 160 of FIG. 1) of the electronic device (e.g., the electronic device 101 of FIG. 1) by the user). According to an embodiment, the charging switch 705 may be connected via the conducting line with the second short-range communication controller 709 and, when the charging switch 705 turns on, transfer the enable signal from the first voltage detector 704 to the second short-range communication controller 709.

According to an embodiment, the charging switch 705 may be connected to be able to operate with the rectifier 703, the first voltage detector 704, the battery 706, the second voltage detector 707, and the second short-range communication controller 709. According to an embodiment, the charging switch 705 may be turned on (e.g., shorted) or off (e.g., open) based on the strength of the voltage detected by the first voltage detector 704. According to an embodiment, when the charging switch 705 is turned on, the DC power transferred from the rectifier 703 or the first voltage detector 704 may be applied to the battery 706 or the second voltage detector 707. In this case, according to an embodiment, the second short-range communication controller 709 may identify that the stylus pen 220 is in the state of being charged by the electronic device (e.g., the electronic device 101 of FIG. 1). According to an embodiment, when the charging switch 705 is turned off, the DC power transferred from the rectifier 703 or the first voltage detector 704 may not be applied to the battery 706 or the second voltage detector 707. In this case, according to an embodiment, the second short-range communication controller 709 may identify that the stylus pen 220 is in the state of being not charged by the electronic device (e.g., the electronic device 101 of FIG. 1). The stylus pen 220 is in the state of being not charged may mean a state in which the stylus pen 220 is not inserted in the inner space (e.g., the receiving space 112 of FIG. 2) of the electronic device (e.g., the electronic device 101 of FIG. 1) and thus does not receive AC power from the electronic device (e.g., the coil 523).

According to an embodiment, the second voltage detector 707 may be connected to be able to operate with at least one of the charging switch 705, the battery 706, or the booting switch 710. According to an embodiment, the second voltage detector 707 may detect a voltage value output from the battery 706. According to an embodiment, the booting switch 710 may be shorted based on the magnitude of the voltage value detected by the second voltage detector 707. In this case, the second short-range communication controller 709 may be booted. As used herein, "booting" may mean cold booting which is performed when the voltage value detected by the second voltage detector 707 is not less than a designated value (e.g., 2.4V).

According to an embodiment, the second short-range communication controller 709 may establish a short-range communication (e.g., Bluetooth low energy) connection with the electronic device 101. According to an embodiment, the second short-range communication controller 709 may perform pairing with the electronic device (e.g., the electronic device 101 of FIG. 1) using a short-range wireless communication scheme, e.g., BLE. According to an embodiment, the second short-range communication controller 709 may send state information about the battery 706 to the paired electronic device (e.g., the electronic device 101 of FIG. 1). According to an embodiment, the second short-range communication controller 709 may exchange, with the paired electronic device (e.g., the electronic device 101 of FIG. 1), signals to control at least one component included in the stylus pen 220 or the electronic device (e.g., the electronic device 101 of FIG. 1).

According to an embodiment, the OR gate 711 may generate a signal to disregard the button input made by the user or a signal (e.g., a signal to execute an application on the electronic device) to short-range communication based on the voltage value detected by the first voltage detector 704 and transmit the signal to the second short-range communication controller 709.

Figure 8:
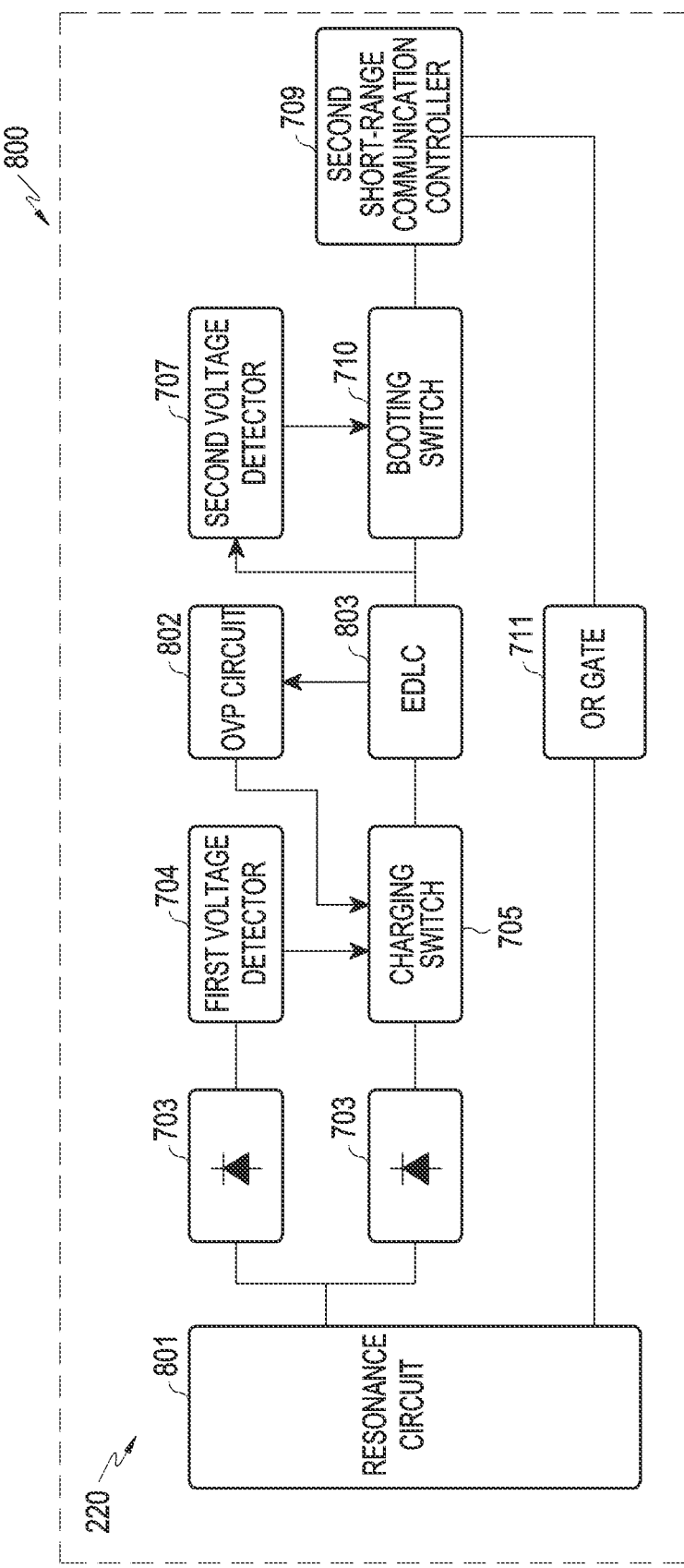
FIG. 8 is a view illustrating example stylus pens according to various embodiments of the disclosure.

FIG. 8 is a view illustrating an example stylus pen according to an embodiment of the disclosure.

Elements of FIG. 8 which were previously described in the description of FIG. 7 are not described or are briefly described below.

Referring to FIG. 8, according to an embodiment, in a view 800, the stylus pen 220 may include a resonance circuit 801 (e.g., the resonance circuit 387 of FIG. 3), a rectifier 703, a first voltage detector 704, a charging switch 705, an overvoltage protection (OVP) circuit 802, an electric double layer capacitor (EDLC) 803, a second voltage detector 707, a booting switch 710, a second short-range communication controller 709, and an OR gate 711.

According to an embodiment, the resonance circuit 801 may be connected to be able to operate with the rectifier 703. According to an embodiment, the resonance circuit 801 may include a coil (e.g., the coil 523 of FIG. 5), a variable capacitor circuit (e.g., the variable capacitor circuit 701 of FIG. 7), and a button switch (e.g., the button switch 702 of FIG. 7).

According to an embodiment, the OVP circuit 802 may detect the strength (e.g., 2.6V) of the voltage applied to the EDLC 803 and limit application of a voltage not less than a predesignated strength to the EDLC 803.

According to an embodiment, the resonance circuit 801, the first voltage detector 704, the charging switch 705, the OVP circuit 802, the second voltage detector 707, the booting switch 710, and the OR gate 711 may together form a single integrated circuit or may, together with the EDLC 803 and the second short-range communication controller 709, form a single integrated circuit.

Figure 9:
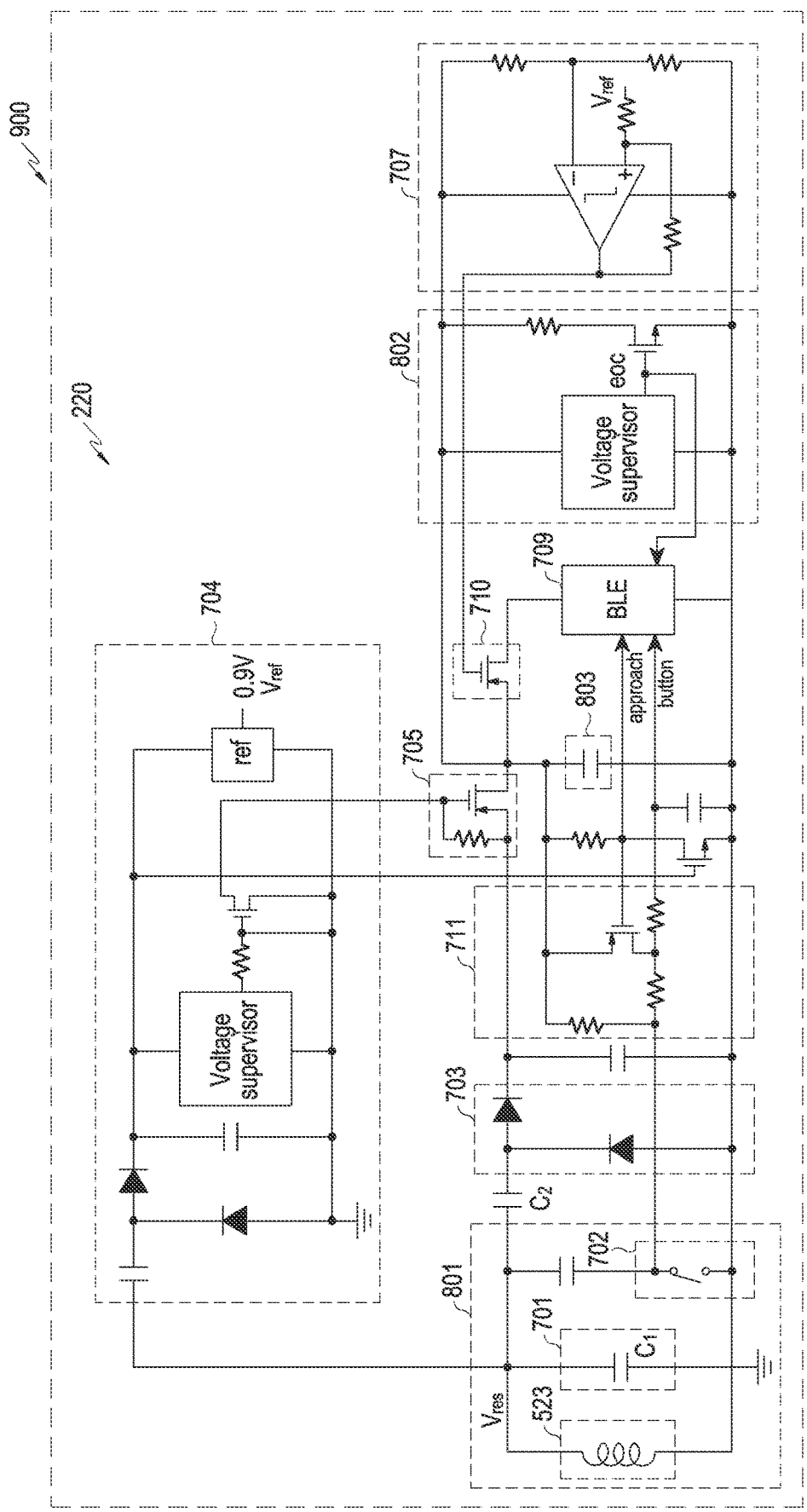
FIG. 9 is a circuit diagram illustrating example stylus pens according to various embodiments of the disclosure.

FIG. 9 is a circuit diagram illustrating an example stylus pen according to an embodiment of the disclosure.

The circuit diagram of FIG. 9 may correspond to the example view of FIG. 8, and what overlaps the description of FIG. 7 or 8 is not described or is described briefly below.

Referring to FIG. 9, in a circuit diagram 900, the stylus pen 220 may include a resonance circuit 801 (e.g., the resonance circuit 387 of FIG. 3), a rectifier 703, a first voltage detector 704, a charging switch 705, an OVP circuit 802, an EDLC 803 (e.g., the battery 706 of FIG. 7), a second voltage detector 707, a booting switch 710, a second short-range communication controller 709, and an OR gate 711.

According to an embodiment, the resonance circuit 801 may include at least one of the coil 523, the variable capacitor circuit 701, or the button switch 702.

According to an embodiment, the rectifier 703 may include at least one diode.

According to an embodiment, the first voltage detector 704 may include at least one of a plurality of diodes, a plurality of capacitors, a voltage supervisor, at least one resistor, or at least one transistor.

According to an embodiment, the charging switch 705 may include at least one of a resistor or a transistor.

According to an embodiment, the OVP circuit 802 may include a voltage supervisor, a transistor, or a resistor.

According to an embodiment, the EDLC 803 may include at least one capacitor.

According to an embodiment, the second voltage detector 707 may include a plurality of resistors or at least one operational amplifier (OP-amp).

According to an embodiment, the booting switch 710 may include at least one transistor.

According to an embodiment, the second short-range communication controller 709 may control the BLE wireless communication.

According to an embodiment, the OR gate 711 may include a plurality of resistors or at least one transistor.

Figure 10:
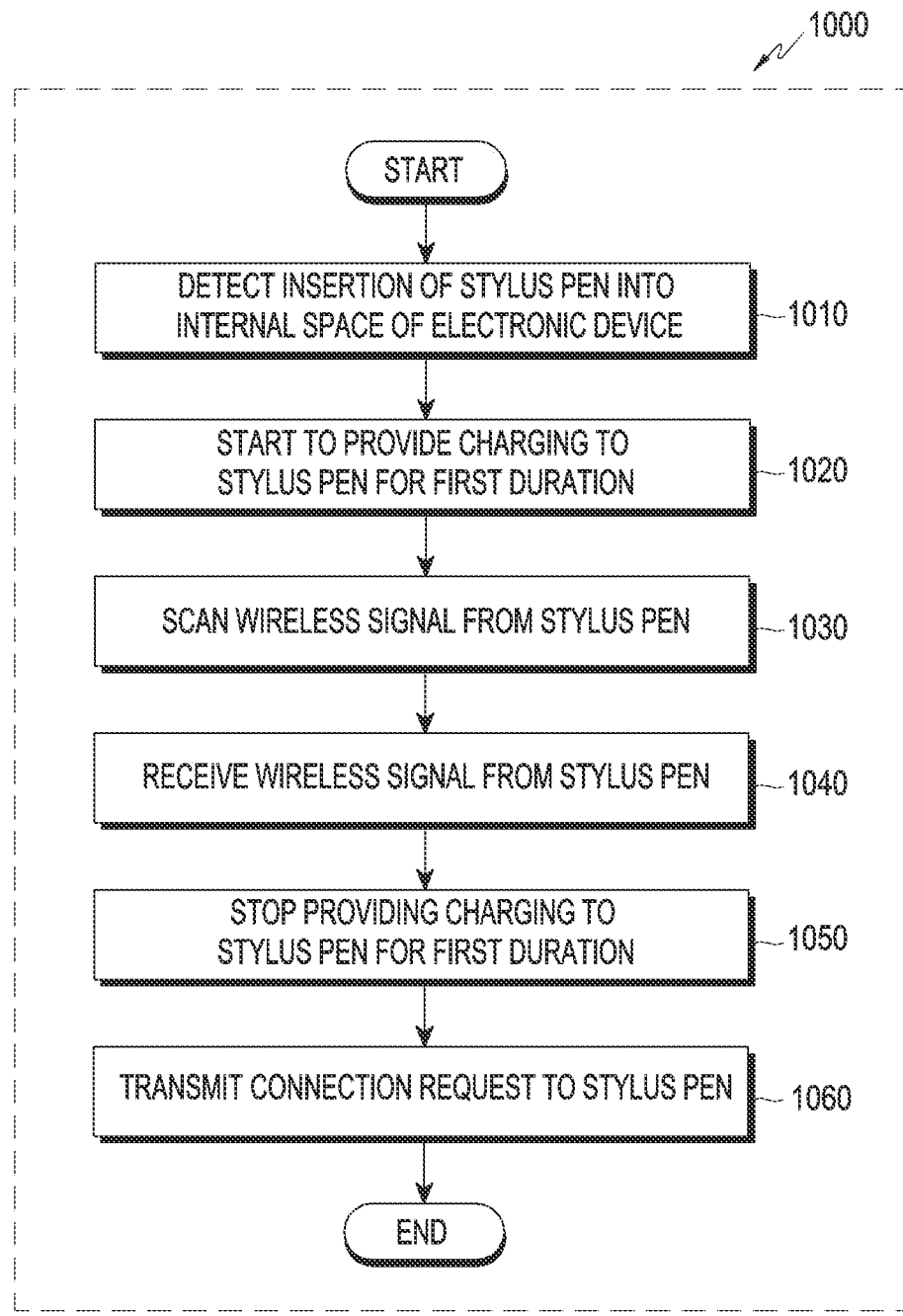
FIG. 10 is a flow diagram illustrating a method of operating an electronic device according to an embodiment of the disclosure.

FIG. 10 is a flow diagram illustrating an example method of operating an electronic device (e.g., the electronic device 101 of FIG. 1) according to an embodiment of the disclosure.

Referring to FIG. 10, in a view 1000, the electronic device (e.g., the processor 120 of FIG. 1) may detect insertion of a stylus pen (e.g., the stylus pen 220 of FIG. 4) into an inner space (e.g., the receiving space 112 of FIG. 2) of the electronic device (e.g., the electronic device 101 of FIG. 1) in operation 1010. According to an embodiment, the electronic device (e.g., the electronic device 101 of FIG. 1) may detect insertion of the stylus pen (e.g., the stylus pen 220 of FIG. 4) into the inner space (e.g., the receiving space 112 of FIG. 2) of the electronic device (e.g., the electronic device 101 of FIG. 1) by transmitting a detection signal to, and receiving a response signal from, the stylus pen (e.g., the stylus pen 220 of FIG. 4) using a detecting coil (e.g., the detecting coil 1101 of FIG. 11), and this operation is described below in greater detail with reference to FIG. 11.

According to an embodiment, the electronic device 101 may start to provide charging (power) for a first duration to the stylus pen 220 in operation 1020.

According to an embodiment, the electronic device (e.g., the digitizer controller 603 of FIG. 6) may provide charging (power) to the stylus pen (e.g., the stylus pen 220 of FIG. 4) using the detecting coil (e.g., the detecting coil 1101 of FIG. 11). According to an embodiment, the digitizer controller (e.g., the digitizer controller 603 of FIG. 6) may provide charging (power) to the stylus pen (e.g., the stylus pen 220 of FIG. 4) by generating (or inducing) an induced current at the coil (e.g., the coil 523 of FIG. 5) of the stylus pen (e.g., the stylus pen 220 of FIG. 4) using the detecting coil (e.g., the detecting coil 1101 of FIG. 11). According to an embodiment, the electronic device (e.g., the digitizer controller 603 of FIG. 6) may provide charging to the stylus pen (e.g., the coil 523 of FIG. 5) through the detecting coil (e.g., the detecting coil 1101 of FIG. 11) for the first duration, allowing the stylus pen (e.g., the second short-range communication controller 709 of FIG. 7) to be reset. According to an embodiment, the first duration may be duration or a period of time during which the electronic device (e.g., the electronic device 101 of FIG. 1) receives an advertising message (wireless signal) broadcast from the stylus pen (e.g., the second short-range communication controller 709 of FIG. 7) and detects the stylus pen (e.g., the stylus pen 220 of FIG. 4) and the first duration may be a preset duration. According to an embodiment, the first duration may be longer than a second duration during which the processor 120 or the digitizer controller 603 provides normal charging to the stylus pen (e.g., the coil 523 of FIG. 5). According to an embodiment, the advertising message may be a signal for transmitting information related to the account (e.g., pairing) or connection to an unspecified, ambient electronic device (e.g., the electronic device 101 of FIG. 1) and used to form a short-range communication connection between the electronic device (e.g., the first short-range communication controller 604 of FIG. 6) and the stylus pen (e.g., the second short-range communication controller 709 of FIG. 7). For example, the advertising message may include at least one of identification information about the stylus pen (e.g., the stylus pen 220 of FIG. 4) (hereinafter, "device identification information), color information about the stylus pen 220 (hereinafter, "device color information"), information about the user account (hereinafter, "user account information"), information regarding whether pairing with another device currently exists (hereinafter, "current pairing information"), a list of devices paired before (hereinafter, "pairing list"), information about devices simultaneously pairable (hereinafter, "simultaneous pairing information"), transmission (tx) power, a detection area, information regarding the remaining battery (hereinafter, "battery state information"), or button input information.

According to an embodiment, the electronic device (e.g., the electronic device 101 of FIG. 1) may scan a wireless signal from the stylus pen 220 in operation 1030.

According to an embodiment, the scanning operation may be performed in a broadcasting manner According to an embodiment, the electronic device (e.g., the processor 120 of FIG. 1 or the digitizer controller 603 of FIG. 6) may control the first short-range communication controller (e.g., the first short-range communication controller 604 of FIG. 1) to determine the operation state (e.g., an active state, discharged state or low power (battery low) state, sleep state, or down state) of the stylus pen 220 to perform the scanning operation at a preset time or during a preset period.

According to an embodiment, the electronic device (e.g., the electronic device 101 of FIG. 1) may receive the wireless signal from the stylus pen (e.g., the second short-range communication controller 709 of FIG. 7) in operation 1040.

According to an embodiment, the electronic device (e.g., the processor 120 of FIG. 1 or the digitizer controller 603 of FIG. 6) may receive the wireless signal transmitted in the form of an electromagnetic wave from the second short-range communication controller (e.g., the second short-range communication controller 709 of FIG. 7) of the stylus pen 220 using the first short-range communication controller (e.g., the first short-range communication controller 604 of FIG. 6). According to an embodiment, the electronic device (e.g., the processor 120 of FIG. 1 or the digitizer controller 603 of FIG. 6) may receive the wireless signal using the first short-range communication controller (e.g., the first short-range communication controller 604 of FIG. 6) after the stylus pen (e.g., the second short-range communication controller 709 of FIG. 7) varies from the sleep state to the active state or receives charging (power) for the first duration and resets. According to an embodiment, when the first short-range communication controller (e.g., the first short-range communication controller 604 of FIG. 6) fails to receive the wireless signal within a predesignated time (e.g., the second time of FIG. 13A) after performing the above-described scanning operation, the electronic device (e.g., the processor 120 of FIG. 1 or the digitizer controller 603 of FIG. 6) may determine that the stylus pen 220 is in the discharged state.

According to an embodiment, the electronic device (e.g., the electronic device 101 of FIG. 1) may stop providing charging (power) for the first duration to the stylus pen (e.g., the stylus pen 220 of FIG. 4) in operation 1050. According to an embodiment, upon receiving the wireless signal from the stylus pen (e.g., the second short-range communication controller 709 of FIG. 7) using the first short-range communication controller (e.g., the first short-range communication controller 604 of FIG. 6), the electronic device (e.g., the processor 120 of FIG. 1 or the digitizer controller 603 of FIG. 6) may determine that the stylus pen (e.g., the second short-range communication controller 709 of FIG. 7) has been varied from the sleep state to the active state or have been charged for the first duration to reset (i.e., determines that it has switched to the state in which it may receive the wireless signal from the stylus pen (e.g., the second short-range communication controller 709 of FIG. 7)) and stop providing charging (power) to the stylus pen (e.g., the stylus pen 220 of FIG. 4) for the first duration. According to an embodiment, after stopping providing charging (power) for the first duration, the electronic device (e.g., the processor 120 of FIG. 1 or the digitizer controller 603 of FIG. 6) may start to provide charging for the second duration. The providing of charging for the second duration may be normal charging (in other words, charging to charge the battery (e.g., the battery 706 of FIG. 7) of the stylus pen 220).

According to an embodiment, the electronic device (e.g., the electronic device 101 of FIG. 1) may transmit a connection request to the stylus pen (e.g., the stylus pen 220 of FIG. 4) in operation 1060. According to an embodiment, after starting to provide charging for the second duration, the electronic device (e.g., the processor 120 of FIG. 1 or the digitizer controller 603 of FIG. 6) may transmit the connection request to the stylus pen (e.g., the stylus pen 220 of FIG. 4). According to an embodiment, the connection request may be one following the Bluetooth communication standard to perform wireless communication (e.g., short-range wireless communication) between the electronic device (e.g., the first short-range communication controller 604 of FIG. 6) and the stylus pen (e.g., the second short-range communication controller 709 of FIG. 7). According to an embodiment, the connection request may include an operation in which the first short-range communication controller (e.g., the first short-range communication controller 604 of FIG. 6) sends a request for a passkey to the second short-range communication controller (e.g., the second short-range communication controller 709 of FIG. 7) or to exchange security keys. According to an embodiment, the electronic device (e.g., the processor 120 of FIG. 1 or the digitizer controller 603 of FIG. 6) may stop providing charging for the second duration when a wireless communication connection with the stylus pen (e.g., the stylus pen 220 of FIG. 4) is formed. According to an embodiment, the electronic device (e.g., the processor 120 of FIG. 1 or the digitizer controller 603 of FIG. 6) may provide charging for the second duration and, upon identifying that the battery (e.g., the battery 706 of FIG. 7) is fully charged, provide supplemental charging to the stylus pen (e.g., the stylus pen 220 of FIG. 4). For example, according to an embodiment, the providing of supplemental charging may be repeatedly providing four-second charging at every two minutes after the battery (e.g., the battery 706 of FIG. 7) of the stylus pen is fully charged.

FIG. 11 is a view illustrating example operations between an electronic device and a stylus pen according to an embodiment of the disclosure.

Figure 12:
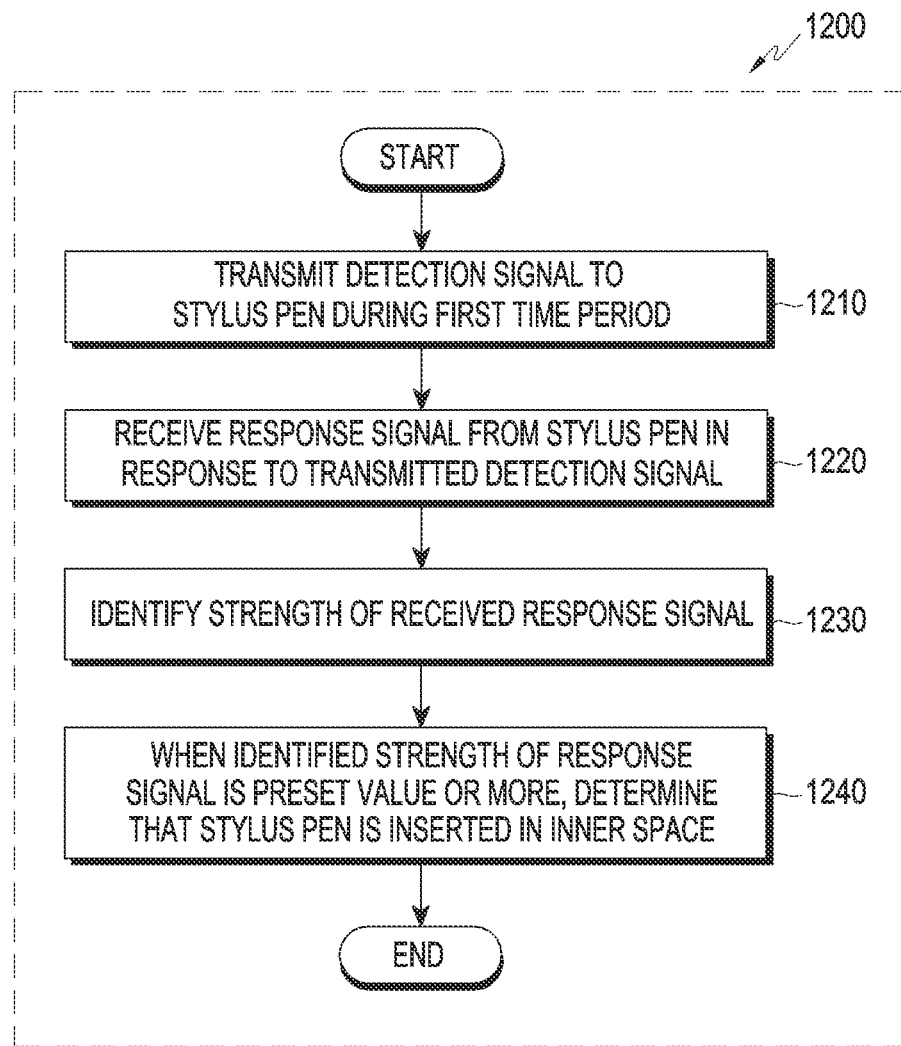
FIG. 12 is a flow diagram illustrating an example of operation 1010 of FIG. 10 according to an embodiment of the disclosure.

FIG. 12 is a flow diagram illustrating an example of operation (e.g., operation 1010 of FIG. 10) according to an embodiment of the disclosure. FIGS. 11 and 12 are described below.

Referring to FIGS. 11 and 12, in views 1100 and 1200, the electronic device 101 may transmit a detection signal to the stylus pen 220 during a first time period in operation 1210. According to an embodiment, the electronic device (e.g., the processor 120 or the digitizer controller 603) may transmit the detection signal to the detecting coil 1101 of the electronic device 101 during a preset time period (e.g., a first time period). The preset time period may be varied by the digitizer controller 603 or the processor 120. This is merely an example, and the detection signal may be transmitted according to various preset states (e.g., a preset cycle, a preset length, or a preset time point of transmission) as well as the preset time period.

According to an embodiment, the electronic device (e.g., the processor 120 or the digitizer controller 603) may determine the preset state based on information obtained from a sensor if the electronic device 101 comprises the sensor. According to an embodiment, the electronic device (e.g., the processor 120 or the digitizer controller 603) may induce an induced current at the stylus pen (e.g., the coil 523) using the detecting coil 1101. According to an embodiment, the stylus pen 220 may include a resonance tank (not shown) to store energy by the current induced by the detecting coil 1101.

According to an embodiment, the electronic device (e.g., the electronic device 101 of FIG. 1) may receive a response signal from the stylus pen 220 in response to the transmitted detection signal in operation 1220. According to an embodiment, the electronic device (e.g., the processor 120 or the digitizer controller 603) may generate (or induce) an induced current at the detecting coil (e.g., the detecting coil 1101 of FIG. 11) from the stylus pen (e.g., the coil 523). According to an embodiment, after transmitting a detection signal to the stylus pen 220 (e.g., the coil 523) for the first time period and then stopping the transmission of the detection signal in the electronic device (e.g., the processor 120 or the digitizer controller 603), the energy stored in the resonance tank (not shown) of the stylus pen 220 may be transferred to the coil 523 of the stylus pen 220. An electromagnetic field may be generated between the coil 523 and the detecting coil 1101 by the transferred energy, inducing an induced current at the detecting coil 1101. According to an embodiment, the electronic device (e.g., the processor 120 or the digitizer controller 603) may receive the induced current induced at the detecting coil 1101 as a response signal. According to an embodiment, the digitizer controller 603 may receive the response signal in a time division scheme.

According to an embodiment, the electronic device 101 may identify the strength of the received response signal in operation 1230. According to an embodiment, the electronic device (e.g., the processor 120 or the digitizer controller 603) may identify the strength of current of the received response signal.

According to an embodiment, when the identified strength of the response signal is a preset value or more, the electronic device (e.g., the electronic device 101 of FIG. 1) may detect that the stylus pen 220 is inserted in the inner space (e.g., the receiving space 112 of FIG. 2) in operation 1240. The preset value may mean a particular reference value (threshold).

Figure 13A:
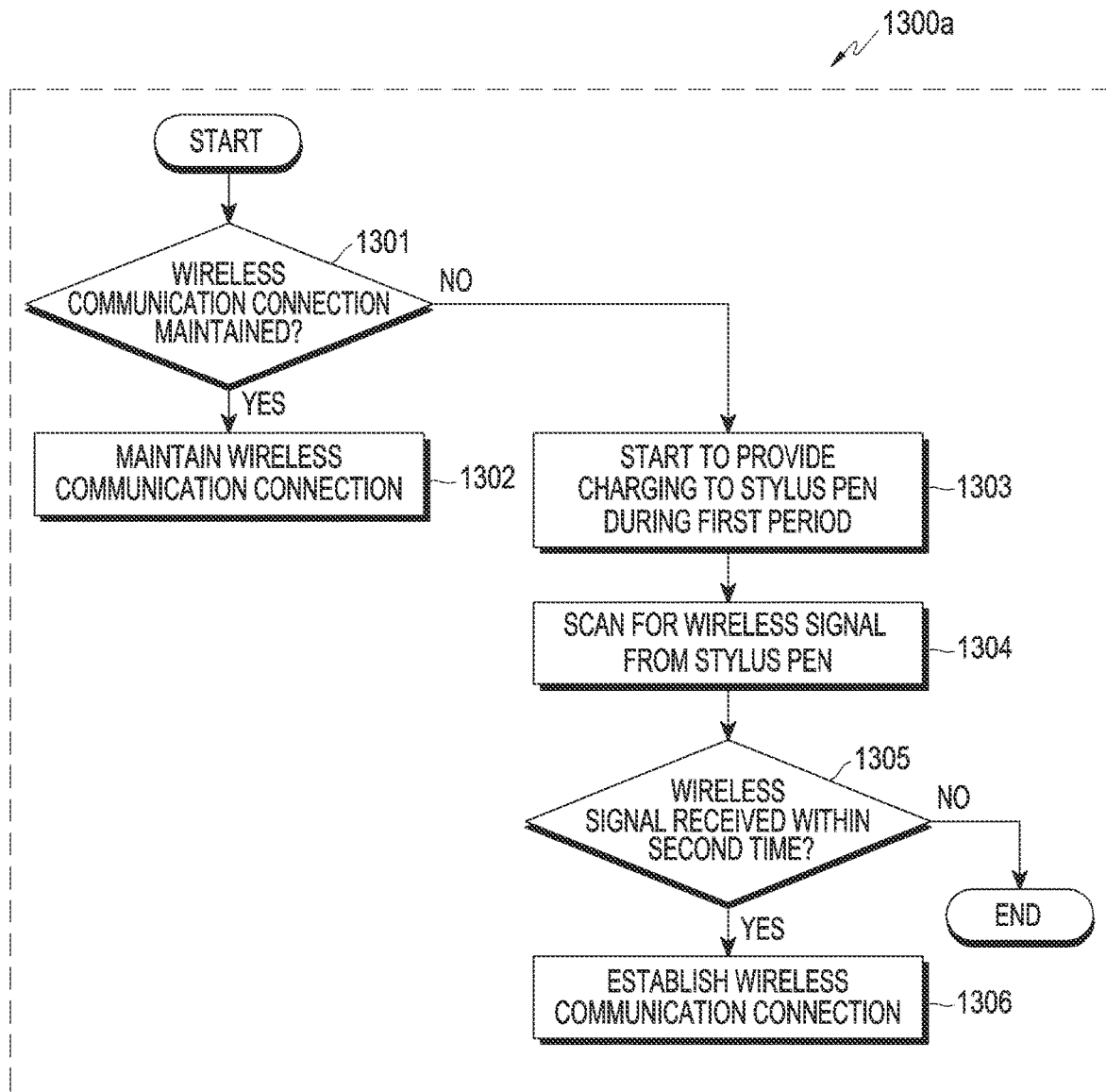
FIG. 13A is a flow diagram illustrating an operation of an electronic device to identify whether a wireless communication connection with a stylus pen is maintained according to an embodiment of the disclosure.

FIG. 13A is a flow diagram illustrating an operation of an electronic device to identify whether a wireless communication connection with a stylus pen inserted in an inner space (e.g., the receiving space 112 of FIG. 2) is maintained according to an embodiment of the disclosure.

Figure 13B:
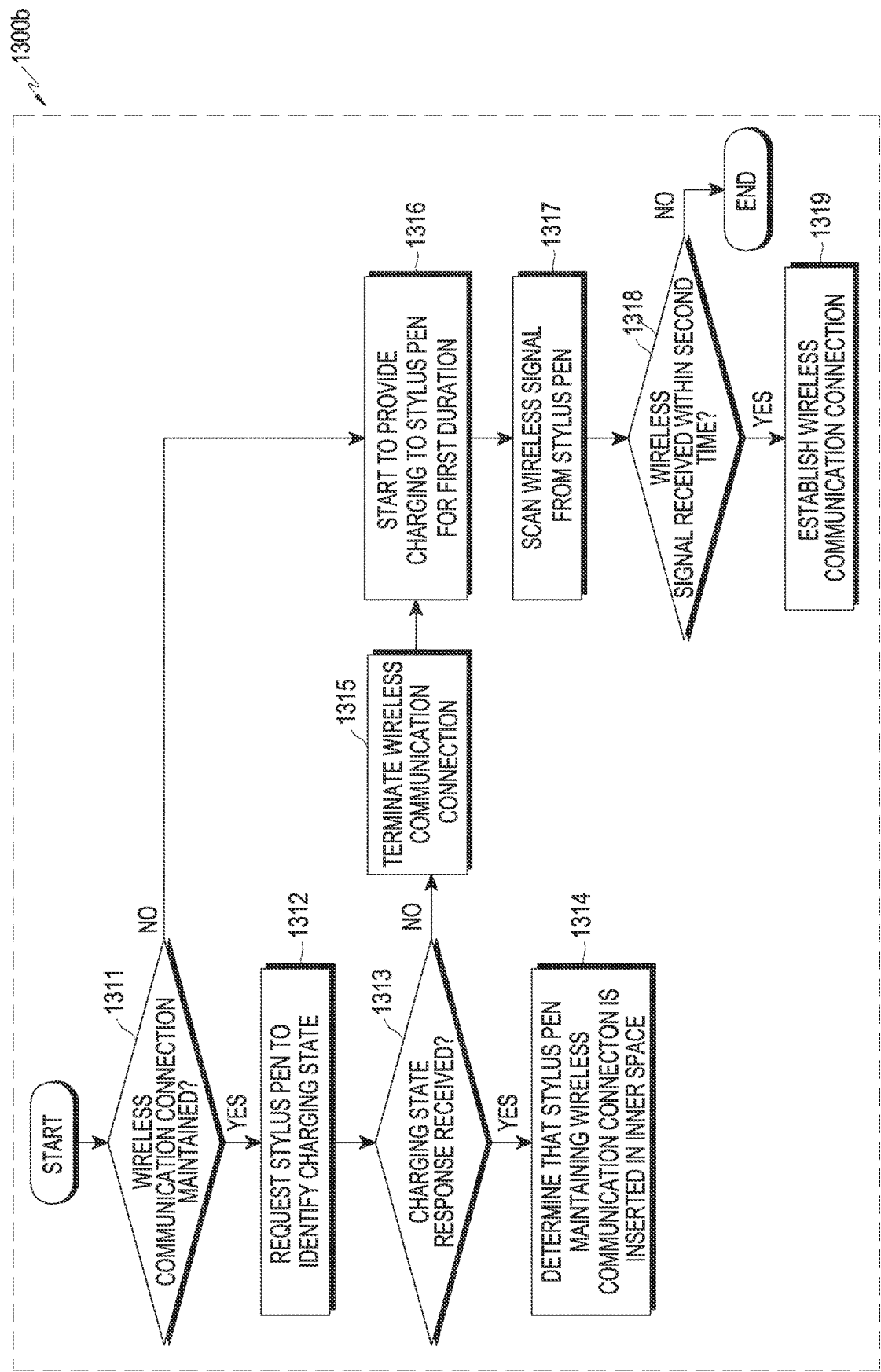
FIG. 13B is a flow diagram illustrating an operation of an electronic device to identify whether a wireless communication connection with a stylus pen is maintained according to an embodiment of the disclosure.

FIG. 13B is a flow diagram illustrating an operation of an electronic device to identify whether a wireless communication connection with a stylus pen inserted in an inner space (e.g., the receiving space 112 of FIG. 2) is maintained according to an embodiment of the disclosure.

Referring to FIG. 13A, in a view 1300A, according to an embodiment, the electronic device (e.g., the electronic device 101 of FIG. 1) may identify whether the wireless communication connection with the stylus pen (e.g., the stylus pen 220 of FIG. 4) is maintained in operation 1301. According to an embodiment, the operation of identifying whether the connection is maintained may be the operation of the electronic device 101 to periodically identify whether there is a stylus pen 220 currently in wireless communication connection. According to an embodiment, the operation of identifying whether the wireless communication connection is maintained may be performed regardless of whether the stylus pen 220 is inserted in the electronic device 101. For illustration purposes, such an example is, however, described with reference to FIG. 13A in which it is identified whether the wireless communication connection with the stylus pen 220 inserted in the inner space (e.g., the receiving space 112 of FIG. 2) of the electronic device 101 is maintained.

According to an embodiment, upon identifying that the wireless communication connection is maintained, the electronic device (e.g., the electronic device 101 of FIG. 1) may determine that wireless communication connection with the stylus pen (e.g., the second short-range communication controller 709 of FIG. 7) is maintained and may maintain the wireless communication connection in operation 1302. The state of the wireless communication connection being maintained may indicate a state in which the wireless communication connection the electronic device (e.g., the electronic device 101 of FIG. 1) forms with the second short-range communication controller (e.g., the second short-range communication controller 709 of FIG. 7) of the stylus pen 220 using the first short-range communication controller (e.g., the first short-range communication controller 604 of FIG. 6) is maintained.

According to an embodiment, upon determining that the wireless communication connection is not maintained, the electronic device (e.g., the electronic device 101 of FIG. 1) may start to provide charging (power) for a first duration to the stylus pen (e.g., the stylus pen 220 of FIG. 4) in operation 1303. According to an embodiment, the electronic device (e.g., the processor 120 of FIG. 1 or the digitizer controller 603 of FIG. 6) may be determined to be in the state of not maintaining a wireless communication connection with the stylus pen (e.g., the stylus pen 220 of FIG. 4) (e.g., a state in which wireless communication connection is not established for the first time or a wireless communication connection is established but not maintained). In this case, the stylus pen (e.g., the stylus pen 220 of FIG. 4) may be in at least one state of a sleep state, a down state, a discharged state, or a low power (battery low) state. The operation of starting to provide charging to the stylus pen (e.g., the stylus pen 220 of FIG. 4) for the first duration may be the operation of resetting the second short-range communication controller (e.g., the second short-range communication controller 709 of FIG. 7) of the stylus pen (e.g., the stylus pen 220 of FIG. 4) when the stylus pen (e.g., the stylus pen 220 of FIG. 4) is in the sleep state or down state. The resetting operation is described below in greater detail with reference to FIG. 14.

According to an embodiment, the electronic device (e.g., the electronic device 101 of FIG. 1) may scan a wireless signal from the stylus pen (e.g., the stylus pen 220 of FIG. 4) in operation 1304. According to an embodiment, the electronic device (e.g., the electronic device 101 of FIG. 1) may scan the wireless signal using the first short-range communication controller (e.g., the first short-range communication controller 604 of FIG. 6). The scanning operation may be performed in a broadcasting scheme.

According to an embodiment, the electronic device (e.g., the electronic device 101 of FIG. 1) may receive the wireless signal within a second time period in operation 1305. According to an embodiment, the electronic device (e.g., the electronic device 101 of FIG. 1) may receive the wireless signal broadcast from the second short-range communication controller (e.g., the second short-range communication controller 709 of FIG. 7) using the first short-range communication controller (e.g., the first short-range communication controller 604 of FIG. 6). The second time period may be a time period preset by a processor (e.g., the processor 120 of FIG. 1) or a digitizer controller (e.g., the digitizer controller 603 of FIG. 6).

According to an embodiment, upon receiving the wireless signal from the stylus pen (e.g., the stylus pen 220 of FIG. 4) within the second time period, the electronic device (e.g., the electronic device 101 of FIG. 1) may establish a wireless communication connection in operation 1306. According to an embodiment, the electronic device (e.g., the first short-range communication controller 604 of FIG. 6) may establish the wireless communication connection with the second short-range communication controller (e.g., the second short-range communication controller 709 of FIG. 7) based on information (e.g., device identification information, device color information, user account information, pairing information, pairing list, simultaneous pairing information, transmission (tx) power, detection area, battery state information, or button input information) contained in the received wireless signal.

Referring to FIG. 13B, in a view 1300B, the operations 1311, 1316, 1317, 1318, and 1319 of FIG. 13B may correspond to the operations 1301, 1303, 1304, 1305, and 1306, respectively, of FIG. 13A and are thus briefly described below.

According to an embodiment, the electronic device (e.g., the electronic device 101 of FIG. 1) may identify whether it maintains a connection with the stylus pen (e.g., the stylus pen 220 of FIG. 4) in operation 1311.

According to an embodiment, upon identifying that the wireless communication connection with the stylus pen (e.g., the stylus pen 220 of FIG. 4) is maintained, the electronic device (e.g., the electronic device 101 of FIG. 1)

may request the stylus pen 220 to identify the charging state in operation 1312. In this case, the electronic device 101 may transmit a signal to request to identify the charging state to the stylus pen (e.g., the second short-range communication controller 709 of FIG. 7) to identify whether the stylus pen 220 with which the electronic device 101 maintains the connection is currently inserted in the inner space (e.g., the receiving space 112 of FIG. 2). For example, the signal to request the charging state may include a signal to request battery state information (e.g., information about the remaining battery or information indicating that the battery is being charged).

According to an embodiment, the electronic device (e.g., the electronic device 101 of FIG. 1) may receive a charging state response from the stylus pen (e.g., the second short-range communication controller 709 of FIG. 7) in operation 1313. For example, the charging state response may include battery state information periodically transmitted in response to the charging state identification request transmitted to the inserted stylus pen 220 (e.g., information about the remaining battery which is varied as charging is provided to the inserted stylus pen 220 or information indicating that the battery is being charged).

According to an embodiment, upon receiving the charging state response from the stylus pen (e.g., the stylus pen 220 of FIG. 4), the electronic device (e.g., the electronic device 101 of FIG. 1) may determine that the stylus pen maintaining the wireless communication connection is inserted in the inner space (e.g., the receiving space 112 of FIG. 2) in operation 1314. For example, according to an embodiment, the electronic device 101 may identify the battery state information (e.g., remaining battery) contained in the received charging state response and, upon determining that the identified remaining battery steadily increases, determine that the stylus pen 220 which has sent the charging state response signal is inserted in the inner space (e.g., the receiving space 112 of FIG. 2) and charged. Or, as an example, according to an embodiment, the electronic device 101 may identify the information indicating charging as contained in the received charging state response and determine that the stylus pen 220 which has sent the charging state response signal is inserted in the inner space (e.g., the receiving space 112 of FIG. 2) and charged.

According to an embodiment, upon failing to receive the charging state response in operation 1313, the electronic device (e.g., the electronic device 101 of FIG. 1) may terminate the wireless communication connection being currently maintained in operation 1315 and perform operations 1316 to 1319. For example, according to an embodiment, the electronic device 101 may determine that the stylus pen being currently connected is not inserted in the inner space (e.g., the receiving space 112 of FIG. 2) and perform operations 1316 to 1319 to establish a wireless communication connection with the inserted stylus pen. As set forth above, the description of operations 1303 to 1306 of FIG. 13A may apply to operations 1316 to 1319 and, thus, no description of operations 1316 to 1319 are given below.

Figure 14:
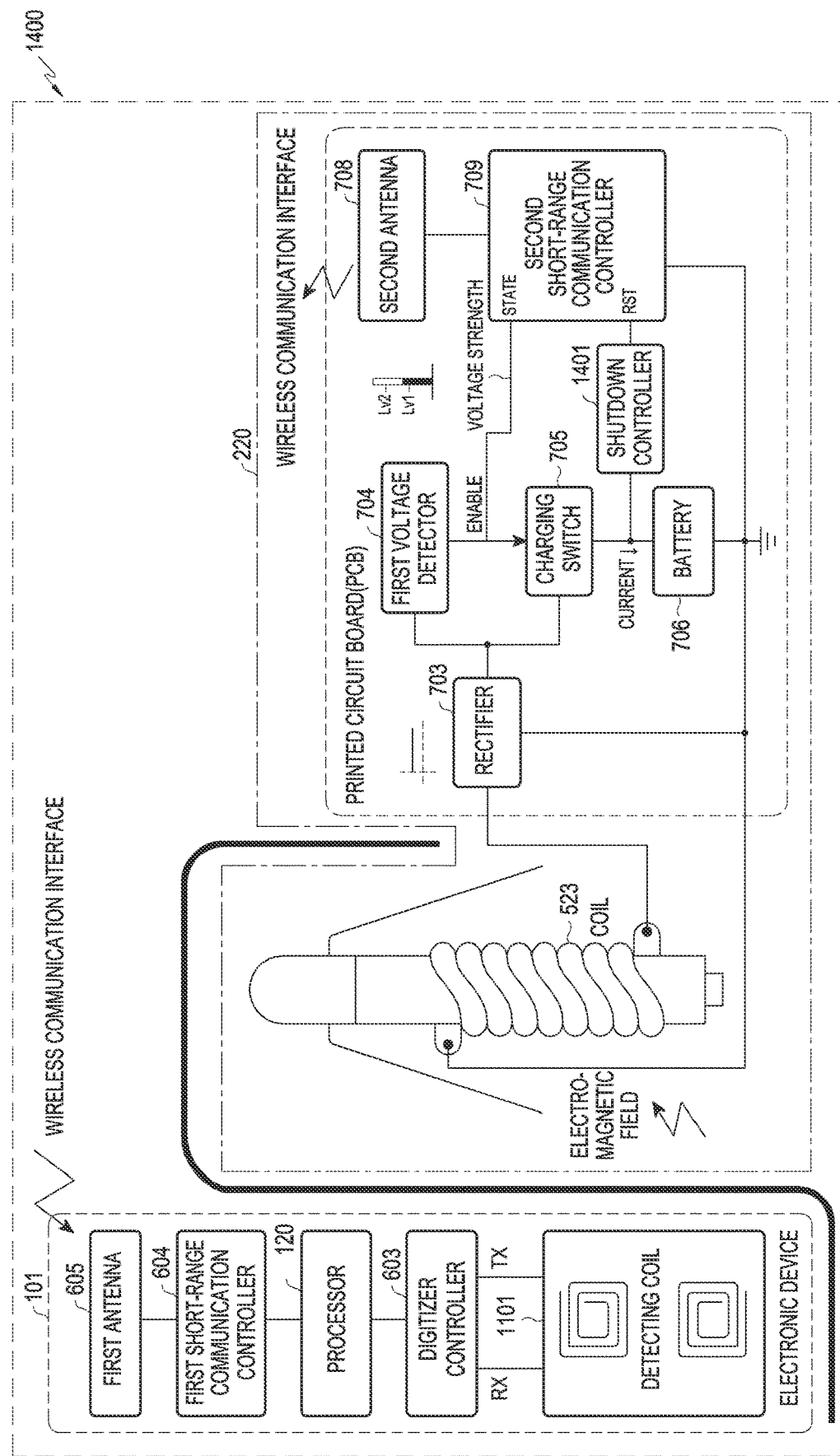
FIG. 14 is a view illustrating an example operation of an electronic device to reset a stylus pen according to an embodiment of the disclosure.

FIG. 14 is a view illustrating an example operation of an electronic device to reset a stylus pen according to an embodiment of the disclosure.

Referring to FIG. 14, in a view 1400, the electronic device (e.g., the processor 120 of FIG. 1) may detect insertion of a stylus pen (e.g., the stylus pen 220 of FIG. 4) into an inner space (e.g., the receiving space 112 of FIG. 2) of the electronic device (e.g., the electronic device 101 of FIG. 1) as described above in connection with FIG. 10 and start to provide charging (power) to the coil 523 of the stylus pen 220 for a first duration using the detecting coil 1101.

According to an embodiment, the coil 523 may output a current produced based on mutual induction to the rectifier 703.

According to an embodiment, the rectifier 703 may rectify AC power output from the coil 523 into DC power and transfer the DC power to at least one of the first voltage detector 704 or the charging switch 705.

According to an embodiment, the first voltage detector 704 may detect a voltage value on the path connecting the rectifier 703 and the second short-range communication controller 709. According to an embodiment, when the magnitude of the detected voltage value belongs to level 2 range (e.g., 3.5V or more), the first voltage detector 704 may control the state of the charging switch 705 (e.g., turn on the charging switch 705) to allow the transferred DC power to be applied to the battery 706.

According to an embodiment, a shutdown controller 1401 may detect the amount of energy accrued to the battery 706. According to an embodiment, when the energy applied and accrued to the battery 706 after the charging switch 705 turns on is not less than a threshold or the time period that the energy is applied to the battery 706 is longer than a threshold, the shutdown controller 1401 may transfer a reset request signal to the second short-range communication controller 709.

According to an embodiment, the second short-range communication controller 709 may be reset upon receiving the reset request signal from the shutdown controller 1401. According to an embodiment, after reset, the second short-range communication controller 709 may perform the operation of broadcasting a wireless signal (e.g., an advertising message) using the second antenna 708.

Figure 15:
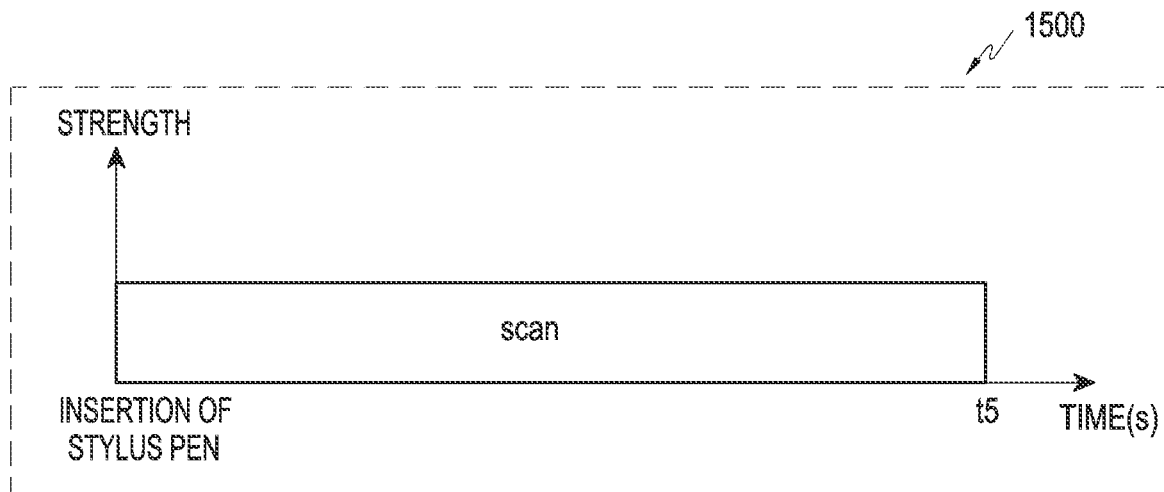
FIG. 15 is a view illustrating an example continuous scanning operation of an electronic device according to an embodiment of the disclosure.

FIG. 15 is a view illustrating an example continuous scanning operation of an electronic device (e.g., the electronic device of FIG. 1) according to an embodiment of the disclosure.

Figure 16:
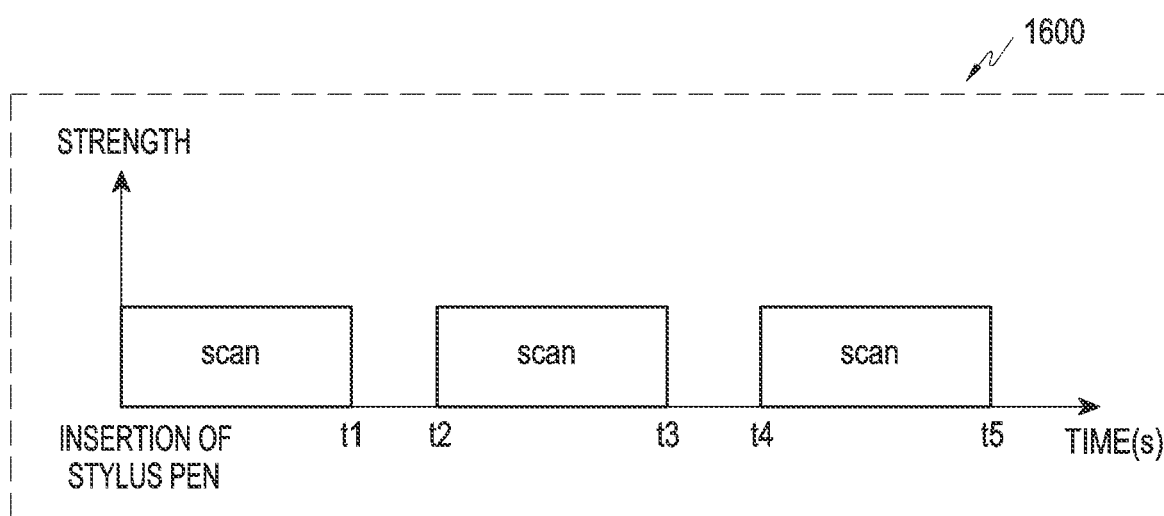
FIG. 16 is a view illustrating an example sequential scanning operation of an electronic device according to an embodiment of the disclosure.

FIG. 16 is a view illustrating an example sequential scanning operation of an electronic device according to an embodiment of the disclosure.

The embodiments of FIGS. 15 and 16 are compared and described below.

Referring to FIG. 15, according to an embodiment, in a view 1500, the electronic device (e.g., the processor 120 of FIG. 1 or the digitizer controller 603 of FIG. 6) may continuously (or steadily) perform a scanning operation regardless of the state of the stylus pen (e.g., the stylus pen 220 of FIG. 4).

Referring to FIG. 16, according to an embodiment, in a view 1600, when the stylus pen (e.g., the stylus pen 220 of FIG. 4) is inserted into the inner space (e.g., the receiving space 112 of FIG. 2) of the electronic device, the electronic device (e.g., the processor 120 of FIG. 1 or the digitizer controller 603 of FIG. 6) may determine the state (e.g., sleep state, down state, discharged state, or low power state) of the stylus pen (e.g., the stylus pen 220 of FIG. 4) as described above in connection with FIG. 13A. According to an embodiment, the electronic device (e.g., the processor 120 of FIG. 1 or the digitizer controller 603 of FIG. 6) may control the first short-range communication controller (e.g., the first short-range communication controller 604 of FIG. 6) to sequentially scan wireless signals based on the determined state of the stylus pen (e.g., the stylus pen 220 of FIG. 4).

According to an embodiment, when the stylus pen (e.g., the stylus pen 220 of FIG. 4) is in the sleep state, the electronic device (e.g., the processor 120 of FIG. 1 or the digitizer controller 603 of FIG. 6) may scan the wireless signal up to t1 (e.g., 1 second) using the first short-range communication controller (e.g., the first short-range communication controller 604 of FIG. 6) after detecting insertion of the stylus pen (e.g., the stylus pen 220 of FIG. 4). t1 may be a time during which the stylus pen (e.g., the stylus pen 220 of FIG. 4) receives charging from the electronic device and the second short-range communication controller (e.g., the second short-range communication controller 709 of FIG. 7) changes from the sleep state to the active state so that the first short-range communication controller (e.g., the first short-range communication controller 604 of FIG. 6) receives the wireless signal from the second short-range communication controller (e.g., the second short-range communication controller 709 of FIG. 7) and may be a predesignated time.

According to an embodiment, the electronic device (e.g., the processor 120 of FIG. 1 or the digitizer controller 603 of FIG. 6) may control the second short-range communication controller (e.g., the second short-range communication controller 709 of FIG. 7) to reset when the stylus pen 220 is in the down state. The operation of resetting the second short-range communication controller (e.g., the second short-range communication controller 709 of FIG. 7) may be performed anytime between t1 and t2 as shown in FIG. 16 (e.g., 10 seconds after insertion of the stylus pen 220 is detected). According to an embodiment, the electronic device (e.g., the processor 120 of FIG. 1 or the digitizer controller 603 of FIG. 6) may perform the scanning operation during the time between t2 (e.g., a predesignated time) and t3 using the first short-range communication controller (e.g., the first short-range communication controller 604 of FIG. 6). t3 may be a time during which the second short-range communication controller (e.g., the second short-range communication controller 709) of the stylus pen 220 is reset so that the first short-range communication controller (e.g., the first short-range communication controller 604 of FIG. 6) receives the wireless signal from the second short-range communication controller (e.g., the second short-range communication controller 709 of FIG. 7) and may be a predesignated time.

According to an embodiment, when the stylus pen (e.g., the stylus pen 220 of FIG. 4) is in the discharged state or low power state, the electronic device (e.g., the processor 120 of FIG. 1) may perform control to provide charging for the first duration to boot the stylus pen (e.g., the stylus pen 220 of FIG. 4) using the digital controller (e.g., the digitizer controller 603 of FIG. 6) as described below in connection with FIG. 22 or 23. The operation of booting the stylus pen (e.g., the stylus pen 220 of FIG. 4) may be complete anytime between t2 and t3 as shown in FIG. 16 (e.g., 20 seconds after insertion of the stylus pen 220 is detected). In this case, according to an embodiment, the electronic device (e.g., the processor 120 of FIG. 1) may perform the scanning operation during the time between t4 (e.g., a predesignated time) and t5 using the first short-range communication controller (e.g., the first short-range communication controller 604 of FIG. 6). t5 may be a time during which the stylus pen (e.g., the stylus pen 220 of FIG. 4) is booted so that the first short-range communication controller (e.g., the first short-range communication controller 604 of FIG. 6) receives the wireless signal from the second short-range communication controller (e.g., the second short-range communication controller 709 of FIG. 7) and may be a predesignated time.

The above-described scanning operation according to FIG. 16 may be performed by the electronic device (e.g., the electronic device 101 of FIG. 1) at a smaller power than the continuous scanning operation shown in FIG. 15.

FIG. 17 is a view illustrating an example operation of wireless communication connection according to the state of an electronic device (e.g., the first short-range communication controller 604 of FIG. 6) and the stylus pen (e.g., the second short-range communication controller 709 of FIG. 7) according to an embodiment of the disclosure.

Referring to FIG. 17, in a view 1700, Case num 1 may mean a state in which a wireless communication connection is established and maintained between the first short-range communication controller (e.g., the first short-range communication controller 604 of FIG. 6) and the second short-range communication controller (e.g., the second short-range communication controller 709 of FIG. 7).

According to an embodiment, Case num 2 to Case num 5 may mean states in which wireless communication between the first short-range communication controller (e.g., the first short-range communication controller 604 of FIG. 6) and the second short-range communication controller (e.g., the second short-range communication controller 709 of FIG. 7) is disconnected. In this case, the state of the second short-range communication controller (e.g., the second short-range communication controller 709 of FIG. 7) may be, e.g., an active state, a sleep state, a down state, a state of being connected with another electronic device, a low power state or a discharged state. According to an embodiment, in this case, the electronic device (e.g., the electronic device 101 of FIG. 1) may perform the operation of establishing a wireless communication connection by performing control to charge, reset, or boot the stylus pen (e.g., the stylus pen 220 of FIG. 4).

According to an embodiment, Case num 6 to Case num 9 may mean states in which the first short-range communication controller (e.g., the first short-range communication controller 604 of FIG. 6) has already established a wireless communication connection with another stylus pen (not shown). According to an embodiment, the electronic device (e.g., the first short-range communication controller 604 of FIG. 6) may terminate the existing wireless communication connection with the other stylus pen (not shown) and may establish a new wireless communication connection with the stylus pen (e.g., the stylus pen 220 of FIG. 4) inserted in the inner space (e.g., the receiving space 112 of FIG. 2) of the electronic device (e.g., the electronic device 101 of FIG. 1). According to an embodiment, the electronic device (e.g., the first short-range communication controller 604 of FIG. 6) may maintain the wireless communication with the other stylus pen (not shown).

Figure 18:
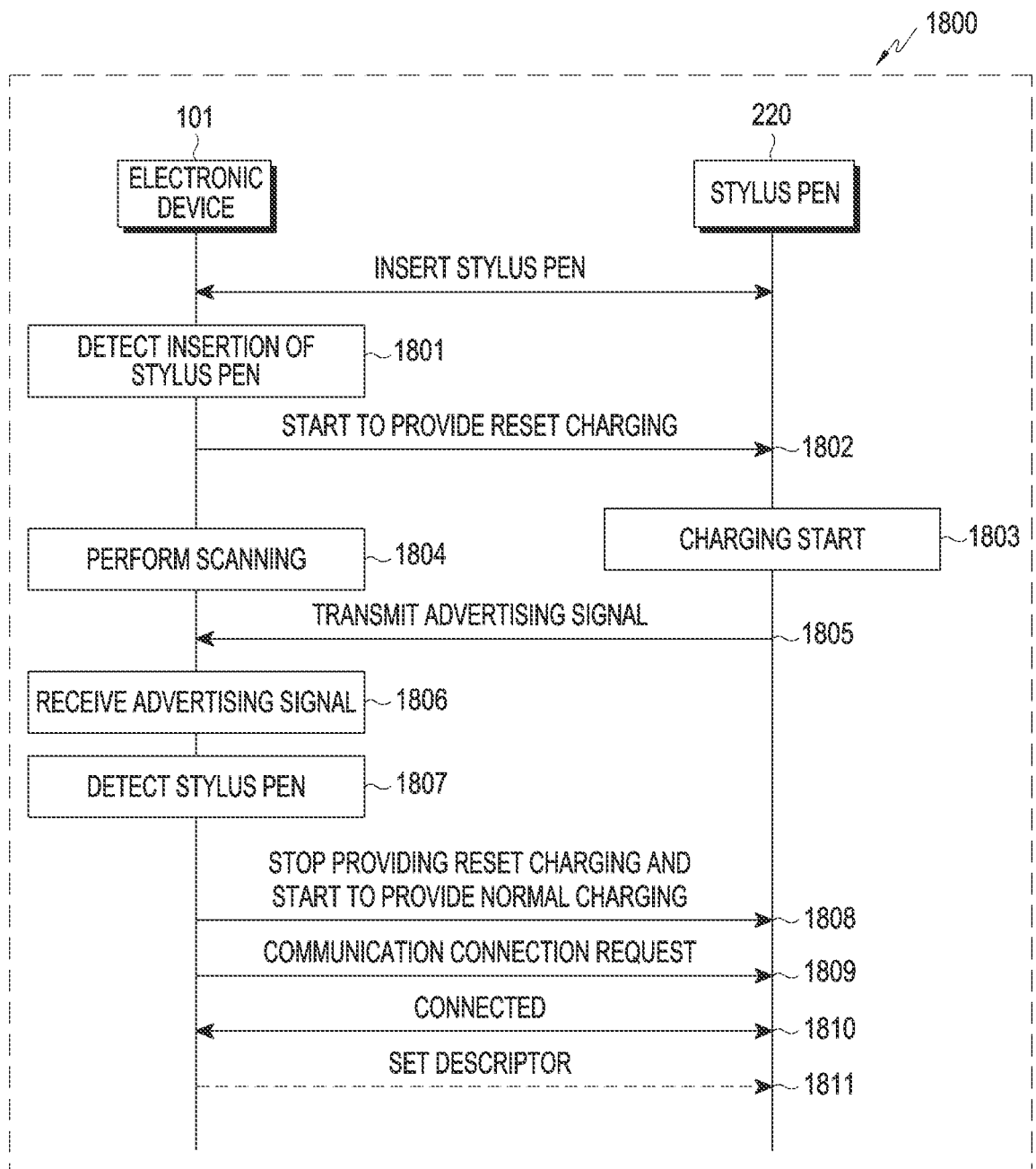
FIG. 18 is a flow diagram illustrating an example operation of establishing a communication connection between an electronic device and a stylus pen when the stylus pen is in a sleep state according to an embodiment of the disclosure.

FIG. 18 is a flow diagram illustrating an example operation of establishing a communication connection between an electronic device and a stylus pen when the stylus pen is in a sleep state according to an embodiment of the disclosure.

Referring to FIG. 18, in a view 1800, the electronic device (e.g., the processor 120 of FIG. 1 or the digitizer controller 603 of FIG. 6) may detect insertion of the stylus pen 220 into the inner space (e.g., the receiving space 112 of FIG. 2) in operation 1801.

According to an embodiment, the electronic device (e.g., the processor 120 of FIG. 1 or the digitizer controller 603 of FIG. 6) may start to provide reset charging (i.e., provide charging for resetting the stylus pen) to the stylus pen (e.g., the coil 523 of FIG. 5) using the detecting coil (e.g., the detecting coil 1101 of FIG. 11) in operation 1802. According to an embodiment, reset charging may be charging that the electronic device (e.g., the processor 120 of FIG. 1 or the digitizer controller 603 of FIG. 6) provides to the stylus pen (e.g., the coil 523 of FIG. 5) for a first duration using the detecting coil (e.g., the detecting coil 1101 of FIG. 11) as described above in connection with FIG. 14. Thus, the stylus pen (e.g., the stylus pen 220 of FIG. 4) may start to charge the battery (e.g., the battery 706 of FIG. 7) in operation 1803. By reset charging, the stylus pen 220 may switch from the sleep state to the active state.

According to an embodiment, the electronic device (e.g., the processor 120 of FIG. 1 or the digitizer controller 603 of FIG. 6) may scan an advertising signal from the stylus pen (e.g., the second short-range communication controller 709 of FIG. 7) using the first short-range communication controller (e.g., the first short-range communication controller 604 of FIG. 6) in operation 1804. The scanning operation may be performed in a broadcasting scheme.

According to an embodiment, the stylus pen 220 may transmit the advertising signal to the electronic device 101 in operation 1805. According to an embodiment, the stylus pen 220 may transmit the advertising signal to the electronic device 101 in a broadcasting manner using the second short-range communication controller (e.g., the second short-range communication controller 709 of FIG. 7). The advertising signal may contain unique information (e.g., Bluetooth address or device information) of the stylus pen 220.

According to an embodiment, the electronic device 101 may receive the advertising signal from the stylus pen 220 in operation 1806. According to an embodiment, the electronic device (e.g., the processor 120 of FIG. 1 or the digitizer controller 603 of FIG. 6) may receive the wireless signal broadcast by the stylus pen (e.g., the second short-range communication controller 709 of FIG. 7) using the first short-range communication controller (e.g., the first short-range communication controller 604 of FIG. 6).

According to an embodiment, upon receiving the advertising signal, the electronic device (e.g., the processor 120 of FIG. 1 or the digitizer controller 603 of FIG. 6) may detect the stylus pen 220 in operation 1807. According to an embodiment, the electronic device (e.g., the processor 120 of FIG. 1) may compare the unique information contained in the advertising signal with reference unique information stored in the memory (e.g., the memory 130 of FIG. 1). The reference unique information may contain unique information corresponding to at least one stylus pen which has established previous pairing with the electronic device. According to an embodiment, when the comparison reveals that the unique information matches the reference unique information, the electronic device (e.g., the processor 120 of FIG. 1) may determine that the stylus pen 220 which has transmitted the advertising signal is one of the at least one stylus pen which has established the existing wireless communication connection (e.g., pairing).

According to an embodiment, upon detecting the stylus pen 220, the electronic device (e.g., the processor 120 of FIG. 1 or the digitizer controller 603 of FIG. 6) may, in operation 1808, stop providing reset charging and start to provide normal charging (in other words, provide charging for charging the battery (e.g., the battery 706 of FIG. 7) of the stylus pen 220). According to an embodiment, the normal charging may be charging repeatedly provided according to a second duration shorter than the first duration. According to an embodiment, the second duration may be 9 seconds which is merely an example.

According to an embodiment, the electronic device (e.g., the processor 120 of FIG. 1 or the digitizer controller 603 of FIG. 6) may send a request for communication connection to the stylus pen (e.g., the second short-range communication controller 709 of FIG. 7) using the first short-range communication controller (e.g., the first short-range communication controller 604 of FIG. 6) in operation 1809. For example, according to an embodiment, the electronic device 101 may send a request for wireless communication connection to the stylus pen 220 while providing charging for the second duration.

According to an embodiment, the electronic device (e.g., the processor 120 of FIG. 1 or the digitizer controller 603 of FIG. 6) may establish a communication connection with the stylus pen (e.g., the second short-range communication controller 709 of FIG. 7) using the first short-range communication controller (e.g., the first short-range communication controller 604 of FIG. 6) in operation 1810. According to an embodiment, upon establishing a wireless communication connection with the stylus pen (e.g., the second short-range communication controller 709 of FIG. 7) for the first time, the electronic device (e.g., the processor 120 of FIG. 1 or the digitizer controller 603 of FIG. 6) may identify at least one of identification information about the stylus pen (e.g., the stylus pen 220 of FIG. 4) (hereinafter, "device identification information), color information about the stylus pen 220 (hereinafter, "device color information"), information about the user account (hereinafter, "user account information"), information regarding whether pairing with another device currently exists (hereinafter, "current pairing information"), a list of devices paired before (hereinafter, "pairing list"), information about devices simultaneously pairable (hereinafter, "simultaneous pairing information"), transmission (tx) power, a detection area, information regarding the remaining battery (hereinafter, "battery state information"), button input information, or connection state information.

According to an embodiment, the electronic device (e.g., the processor 120 of FIG. 1 or the digitizer controller 603 of FIG. 6) may set a descriptor for the stylus pen (e.g., the second short-range communication controller 709 of FIG. 7) according to the Bluetooth communication standard in operation 1811. According to an embodiment, the descriptor may be set by the first short-range communication controller 604 as well. According to an embodiment, the stylus pen 220 may activate (or enable) the notification property of the second short-range communication controller (e.g., the second short-range communication controller 709 of FIG. 7) based on the set descriptor. The notification property may mean the notification property of the function of transmitting an event about at least one of the battery state information or button input information about the stylus pen 220 to the electronic device 101. The activating (or enabling) operation may be performed after a communication connection is established in operation 1810, but embodiments of the disclosure are not limited thereto.

Figure 19:
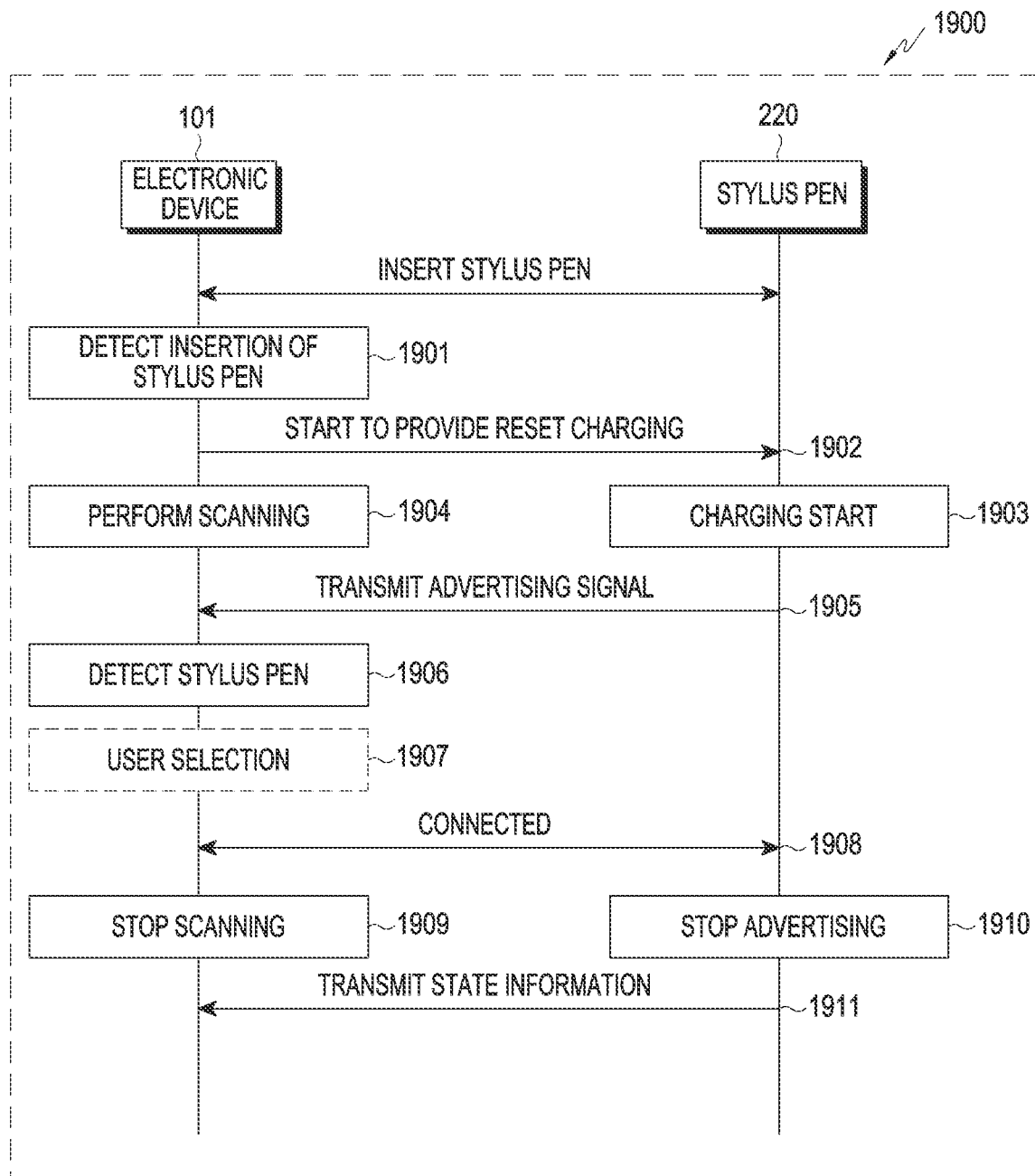
FIG. 19 is a flow diagram illustrating an example operation of establishing a communication connection between an electronic device and a stylus pen when the stylus pen is in a sleep state according to an embodiment of the disclosure.

FIG. 19 is a flow diagram illustrating an example operation of establishing a communication connection between an electronic device and a stylus pen when the stylus pen is in a sleep state according to an embodiment of the disclosure. What has been described above in connection with FIG. 18 is not repeated below.

Referring to FIG. 19, in a view 1900, the electronic device (e.g., the processor 120 of FIG. 1 or the digitizer controller 603 of FIG. 6) may detect insertion of the stylus pen 220 into the inner space (e.g., the receiving space 112 of FIG. 2) in operation 1901.

According to an embodiment, the electronic device (e.g., the processor 120 of FIG. 1 or the digitizer controller 603 of FIG. 6) may provide charging to the stylus pen (e.g., the coil 523 of FIG. 5) in operation 1902. According to an embodiment, the operation of providing charging may be the operation of providing charging for resetting the stylus pen (e.g., the second short-range communication controller 709 of FIG. 7). According to an embodiment, the operation of providing charging may be the operation of providing normal charging described above in connection with FIG. 18.

According to an embodiment, the stylus pen 220 may perform charging in operation 1903.

According to an embodiment, the electronic device (e.g., the processor 120 of FIG. 1 or the digitizer controller 603 of FIG. 6) may scan an advertising signal from the stylus pen 220 in operation 1904. The scanning operation may be performed in a broadcasting scheme.

According to an embodiment, the stylus pen (e.g., the second short-range communication controller 709 of FIG. 7) may transmit the advertising signal in operation 1905. The advertising signal may contain unique information (e.g., Bluetooth address or device information) about the stylus pen 220.

According to an embodiment, the electronic device (e.g., the processor 120 of FIG. 1 or the digitizer controller 603 of FIG. 6) may receive the advertising signal from the stylus pen (e.g., the second short-range communication controller 709 of FIG. 7) and detect the stylus pen 220 in operation 1906. According to an embodiment, the electronic device (e.g., the processor 120 of FIG. 1) may compare the unique information contained in the advertising signal with reference unique information stored in the memory (e.g., the memory 130 of FIG. 1). The reference unique information may contain unique information corresponding to at least one stylus pen which has established the previous pairing. According to an embodiment, when the comparison reveals that the unique information matches the reference unique information, the electronic device (e.g., the processor 120 of FIG. 1) may detect that the stylus pen 220 which has transmitted the advertising signal is one of the at least one stylus pen which has established the previous pairing.

According to an embodiment, the electronic device (e.g., the processor 120 of FIG. 1 or the digitizer controller 603 of FIG. 6) may receive a selection for establishing a wireless communication connection with the detected stylus pen (e.g., the second short-range communication controller 709 of FIG. 7) from the user in operation 1907. According to an embodiment, the electronic device (e.g., the processor 120 of FIG. 1 or the digitizer controller 603 of FIG. 6) may perform the operation of automatically establishing a wireless communication connection with the detected stylus pen even without a user input in which case operation 1907 may be omitted.

According to an embodiment, the electronic device (e.g., the processor 120 of FIG. 1 or the digitizer controller 603 of FIG. 6) may establish a wireless communication connection with the stylus pen (e.g., the second short-range communication controller 709 of FIG. 7) using the first short-range communication controller (e.g., the first short-range communication controller 604 of FIG. 6) in operation 1908. For example, according to an embodiment, the operation of the electronic device 101 to establish a wireless communication connection may be performed while charging is provided to the stylus pen 220.

According to an embodiment, the electronic device (e.g., the processor 120 of FIG. 1 or the digitizer controller 603 of FIG. 6) may stop the scanning operation in operation 1909.

According to an embodiment, the stylus pen 220 may stop the advertising operation in operation 1910.

According to an embodiment, the stylus pen (e.g., the second short-range communication controller 709 of FIG. 7) may transmit state information to the electronic device (e.g., the first short-range communication controller 604 of FIG. 6) in operation 1911. For example, the state information may include at least one of connection state information, button input information, or battery state information about the stylus pen 220.

Figure 20:
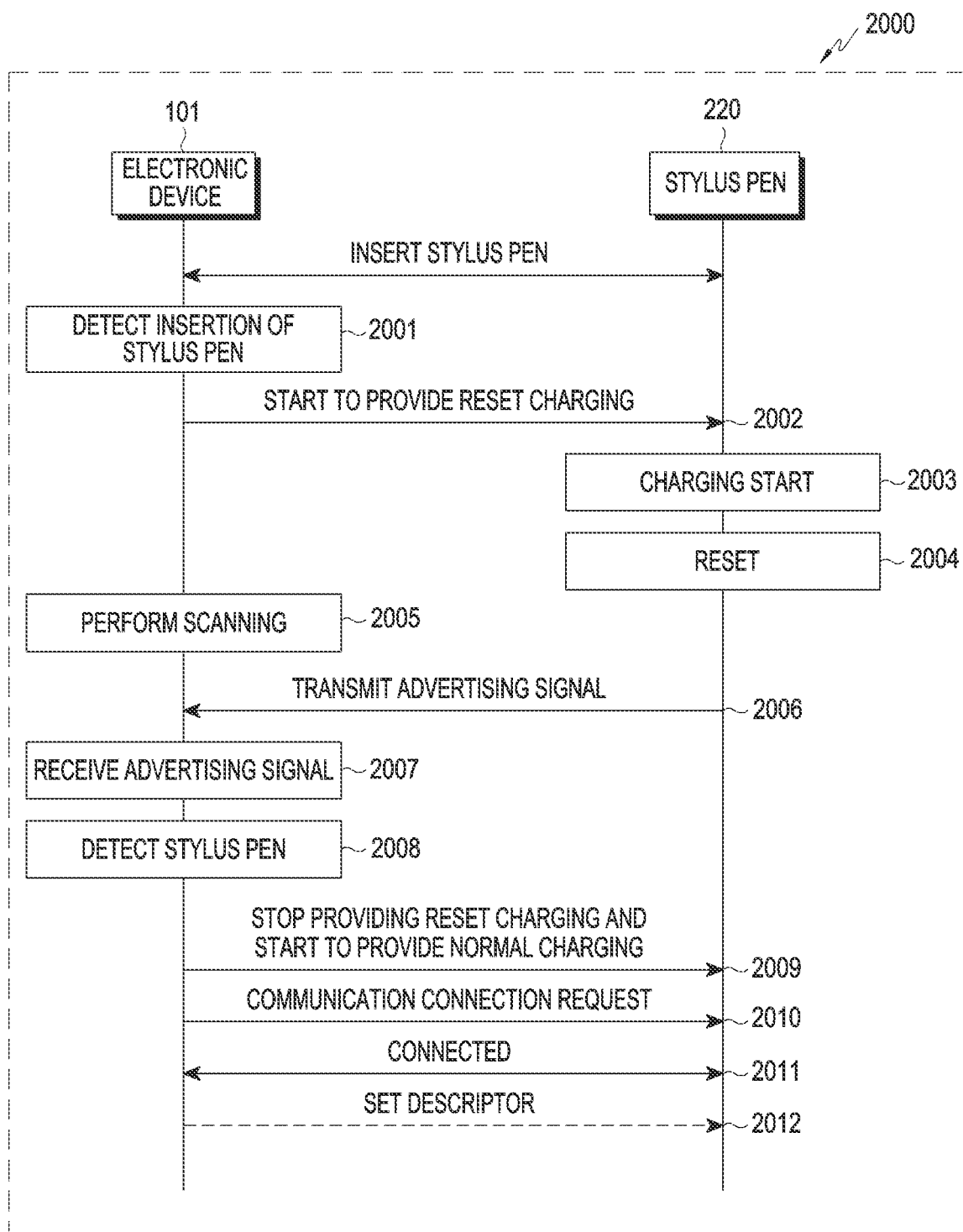
FIG. 20 is a flow diagram illustrating an example operation of establishing a communication connection between an electronic device and a stylus pen when the stylus pen is in a down state according to an embodiment of the disclosure.

FIG. 20 is a flow diagram illustrating an example operation of establishing a communication connection between an electronic device and a stylus pen when the stylus pen is in a down state according to an embodiment of the disclosure.

Referring to FIG. 20, in a view 2000, the electronic device (e.g., the processor 120 of FIG. 1 or the digitizer controller 603 of FIG. 6) may detect insertion of the stylus pen 220 into the inner space (e.g., the receiving space 112 of FIG. 2) using the detecting coil (e.g., the detecting coil 1101 of FIG. 11) in operation 2001.

According to an embodiment, the electronic device (e.g., the processor 120 of FIG. 1 or the digitizer controller 603 of FIG. 6) may start to provide reset charging to the stylus pen (e.g., the coil 523 of FIG. 5) using the detecting coil (e.g., the detecting coil 1101 of FIG. 11) in operation 2002. According to an embodiment, reset charging may be charging that the electronic device (e.g., the processor 120 of FIG. 1 or the digitizer controller 603 of FIG. 6) provides to the stylus pen (e.g., the coil 523 of FIG. 5) for a first duration using the detecting coil (e.g., the detecting coil 1101 of FIG. 11) as described above in connection with FIG. 14. The stylus pen 220 may start to charge the battery (e.g., the battery 706 of FIG. 7) based on the reset charging.

According to an embodiment, the stylus pen 220 may start charging in operation 2003.

According to an embodiment, the stylus pen (e.g., the second short-range communication controller 709 of FIG. 7) may be reset by the provided reset charging in operation 2004. When the battery (e.g., the battery 706 of FIG. 7) has received current for a predesignated time or more or the energy accrued to the battery (e.g., the battery 706 of FIG. 7) is not less than a predesignated value, the stylus pen (e.g., the second short-range communication controller 709 of FIG. 7) may be reset by a shutdown controller (e.g., the shutdown controller 1401 of FIG. 14) as described above in connection with FIG. 14.

According to an embodiment, the electronic device (e.g., the processor 120 of FIG. 1 or the digitizer controller 603 of FIG. 6) may scan an advertising signal from the stylus pen (e.g., the second short-range communication controller 709 of FIG. 7) using the first short-range communication controller (e.g., the first short-range communication controller 604 of FIG. 6) in operation 2005. The advertising signal may contain unique information (e.g., Bluetooth address or device information) about the stylus pen 220.

According to an embodiment, the stylus pen (e.g., the second short-range communication controller 709 of FIG. 7) may transmit the advertising signal in operation 2006.

According to an embodiment, the electronic device (e.g., the processor 120 of FIG. 1 or the digitizer controller 603 of FIG. 6) may receive the advertising signal from the stylus pen (e.g., the second short-range communication controller 709 of FIG. 7) using the first short-range communication controller (e.g., the first short-range communication controller 604 of FIG. 6) in operation 2007.

According to an embodiment, upon receiving the advertising signal from the stylus pen (e.g., the second short-range communication controller 709 of FIG. 7) using the first short-range communication controller (e.g., the first short-range communication controller 604 of FIG. 6), the electronic device (e.g., the processor 120 of FIG. 1 or the digitizer controller 603 of FIG. 6) may detect the stylus pen 220 in operation 2008. According to an embodiment, the electronic device (e.g., the processor 120 of FIG. 1) may compare the unique information contained in the advertising signal with reference unique information stored in the memory (e.g., the memory 130 of FIG. 1). The reference unique information may contain unique information corresponding to at least one stylus pen which has established the previous pairing. According to an embodiment, when the comparison reveals that the unique information matches the reference unique information, the electronic device (e.g., the processor 120 of FIG. 1) may determine (or detect) that the stylus pen 220 which has transmitted the advertising signal is one of the at least one stylus pen which has established the previous pairing.

According to an embodiment, upon detecting the stylus pen 220, the electronic device (e.g., the processor 120 of FIG. 1 or the digitizer controller 603 of FIG. 6) may stop reset charging and start to provide normal charging in operation 2009. The normal charging may be charging which is repeatedly provided for a duration shorter than that of the reset charging.

According to an embodiment, the electronic device (e.g., the processor 120 of FIG. 1 or the digitizer controller 603 of FIG. 6) may send a request for communication connection to the stylus pen (e.g., the second short-range communication controller 709 of FIG. 7) using the first short-range communication controller (e.g., the first short-range communication controller 604 of FIG. 6) in operation 2010. For example, according to an embodiment, the electronic device 101 may send a request for wireless communication connection to the stylus pen 220 while providing normal charging.

According to an embodiment, the electronic device (e.g., the processor 120 of FIG. 1 or the digitizer controller 603 of FIG. 6) may establish a communication connection with the stylus pen (e.g., the second short-range communication controller 709 of FIG. 7) using the first short-range communication controller (e.g., the first short-range communication controller 604 of FIG. 6) in operation 2011. According to an embodiment, upon establishing a wireless communication connection with the stylus pen (e.g., the second short-range communication controller 709 of FIG. 7) for the first time, the electronic device (e.g., the processor 120 of FIG. 1 or the digitizer controller 603 of FIG. 6) may identify at least one of identification information about the stylus pen (e.g., the stylus pen 220 of FIG. 4) (hereinafter, "device identification information), color information about the stylus pen 220 (hereinafter, "device color information"), information about the user account (hereinafter, "user account information"), information regarding whether pairing with another device currently exists (hereinafter, "current pairing information"), a list of devices paired before (hereinafter, "pairing list"), information about devices simultaneously pairable (hereinafter, "simultaneous pairing information"), transmission (tx) power, a detection area, information regarding the remaining battery (hereinafter, "battery state information"), button input information, or connection state information.

According to an embodiment, the electronic device 101 may set a descriptor for the stylus pen 220 in operation 2012. According to an embodiment, the stylus pen 220 may activate (or enable) the notification property of the second short-range communication controller (e.g., the second short-range communication controller 709 of FIG. 7) based on the set descriptor. The notification property may mean the notification property of the function of transmitting an event about at least one of the connection state information (e.g., the strength of wireless connection signal), battery state information, or button input information about the stylus pen 220 to the electronic device 101. The activating (or enabling) operation may be performed after a communication connection is established in operation 2010, but embodiments of the disclosure are not limited thereto.

Figure 21:
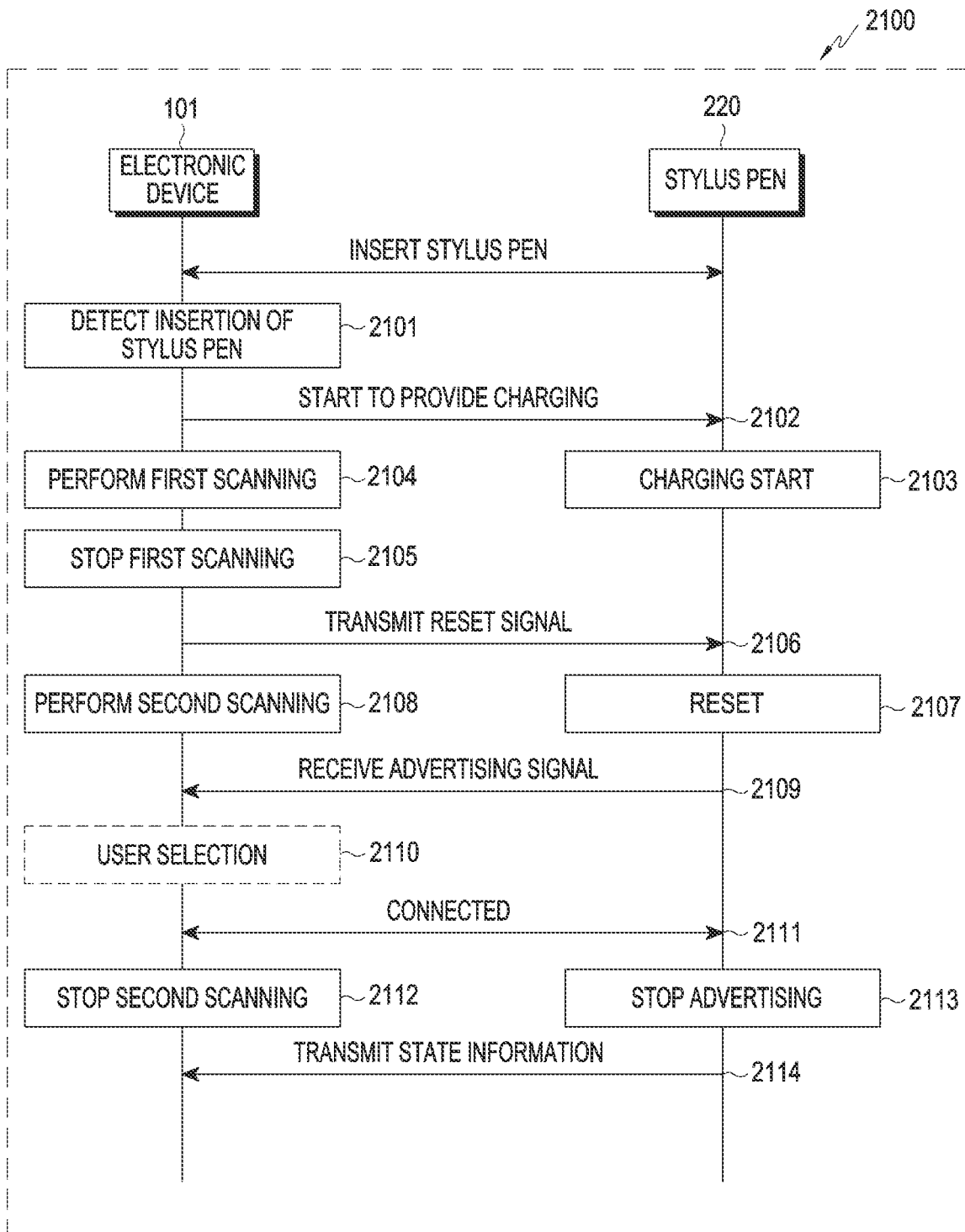
FIG. 21 is a flow diagram illustrating an example operation of establishing a communication connection between an electronic device and a stylus pen when the stylus pen is in a down state according to an embodiment of the disclosure.

FIG. 21 is a flow diagram illustrating an example operation of establishing a communication connection between an electronic device and a stylus pen when the stylus pen is in a down state according to an embodiment of the disclosure. What has been described above in connection with FIG. 20 is not repeated below.

Referring to FIG. 21, in a view 2100, the electronic device (e.g., the processor 120 of FIG. 1 or the digitizer controller 603 of FIG. 6) may detect insertion of the stylus pen 220 into the inner space (e.g., the receiving space 112 of FIG. 2) in operation 2101.

According to an embodiment, the electronic device (e.g., the processor 120 of FIG. 1 or the digitizer controller 603 of FIG. 6) may provide charging to the stylus pen (e.g., the coil 523 of FIG. 5) in operation 2102. According to an embodiment, the operation of providing charging may be the operation of providing normal charging described above in connection with FIG. 20.

According to an embodiment, the stylus pen 220 may perform charging in operation 2103.

According to an embodiment, the electronic device (e.g., the processor 120 of FIG. 1 or the digitizer controller 603 of FIG. 6) may perform first scanning on an advertising signal from the stylus pen (e.g., the second short-range communication controller 709 of FIG. 7) using the first short-range communication controller (e.g., the first short-range communication controller 604 of FIG. 6) in operation 2104.

According to an embodiment, upon failing to receive, with a preset time, the advertising signal from the stylus pen (e.g., the second short-range communication controller 709 of FIG. 7), the electronic device (e.g., the processor 120 of FIG. 1 or the digitizer controller 603 of FIG. 6) may stop the first scanning operation 2104 in operation 2105.

According to an embodiment, the electronic device (e.g., the processor 120 of FIG. 1 or the digitizer controller 603 of FIG. 6) may transmit a reset signal to the stylus pen 220 using the first short-range communication controller (e.g., the first short-range communication controller 604 of FIG. 6) in operation 2106. The reset signal may be a signal transmitted to provide reset charging described above in connection with FIG. 20.

According to an embodiment, the stylus pen (e.g., the second short-range communication controller 709 of FIG. 7) may be reset in operation 2107. According to an embodiment, the stylus pen (e.g., the second short-range communication controller 709 of FIG. 7) may become the state of being able to perform the advertising operation.

According to an embodiment, the electronic device (e.g., the processor 120 of FIG. 1 or the digitizer controller 603 of FIG. 6) may perform a second scanning operation using the first short-range communication controller (e.g., the first short-range communication controller 604 of FIG. 6) in operation 2108.

According to an embodiment, the stylus pen (e.g., the second short-range communication controller 709 of FIG. 7) may transmit the advertising signal to the electronic device (e.g., the first short-range communication controller 604 of FIG. 6) in operation 2109. According to an embodiment, the electronic device (e.g., the processor 120 of FIG. 1) may compare the unique information contained in the advertising signal with reference unique information stored in the memory (e.g., the memory 130 of FIG. 1). The reference unique information may contain unique information corresponding to at least one stylus pen which has established the previous pairing. According to an embodiment, when the comparison reveals that the unique information matches the reference unique information, the electronic device (e.g., the processor 120 of FIG. 1) may determine that the stylus pen 220 which has transmitted the advertising signal is one of the at least one stylus pen which has established the previous wireless communication connection (e.g., pairing).

According to an embodiment, the electronic device (e.g., the processor 120 of FIG. 1 or the digitizer controller 603 of FIG. 6) may receive a selection for establishing a wireless communication connection with the stylus pen (e.g., the second short-range communication controller 709 of FIG. 7) from the user in operation 2110. According to an embodiment, the electronic device (e.g., the first short-range communication controller 604 of FIG. 6) may perform the operation of automatically establishing a wireless communication connection with the detected stylus pen 220 even without a user input in which case operation 2110 may be omitted.

According to an embodiment, the electronic device (e.g., the processor 120 of FIG. 1 or the digitizer controller 603 of FIG. 6) may establish a wireless communication connection with the stylus pen (e.g., the second short-range communication controller 709 of FIG. 7) using the first short-range communication controller (e.g., the first short-range communication controller 604 of FIG. 6) in operation 2111. For example, according to an embodiment, the operation of the electronic device 101 to establish a wireless communication connection may be performed while charging is provided to the stylus pen 220.

According to an embodiment, the electronic device (e.g., the processor 120 of FIG. 1 or the digitizer controller 603 of FIG. 6) may stop the second scanning operation in operation 2112.

According to an embodiment, the stylus pen (e.g., the second short-range communication controller 709 of FIG. 7) may stop the advertising operation in operation 2113.

According to an embodiment, the stylus pen (e.g., the second short-range communication controller 709 of FIG. 7) may transmit state information to the electronic device (e.g., the first short-range communication controller 604 of FIG. 6) in operation 2114. For example, the state information may include at least one of connection state information, button input information, or battery state information about the stylus pen 220.

Figure 22:
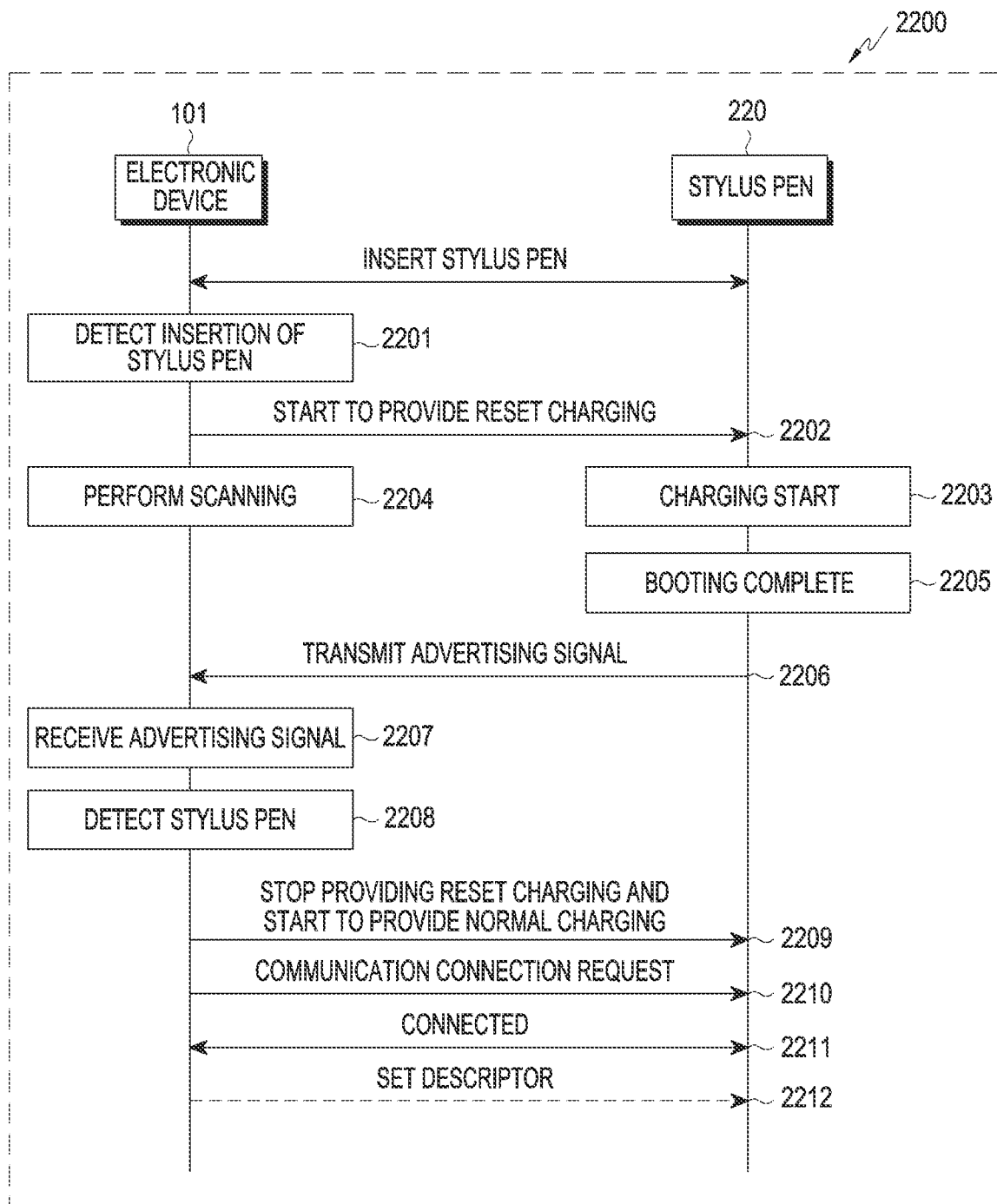
FIG. 22 is a flow diagram illustrating an example operation of establishing a communication connection between an electronic device and a stylus pen when the stylus pen is in a discharged state or low-power state according to an embodiment of the disclosure.

FIG. 22 is a flow diagram illustrating an example operation of establishing a communication connection between an electronic device and a stylus pen when the stylus pen is in a discharged state or low power state according to an embodiment of the disclosure.

Referring to FIG. 22, in a view 2200, the electronic device (e.g., the processor 120 of FIG. 1 or the digitizer controller 603 of FIG. 6) may detect insertion of the stylus pen 220 into the inner space (e.g., the receiving space 112 of FIG. 2) using the detecting coil (e.g., the detecting coil 1101 of FIG. 11) in operation 2201.

According to an embodiment, the electronic device (e.g., the processor 120 of FIG. 1 or the digitizer controller 603 of FIG. 6) may start to provide reset charging to the stylus pen (e.g., the coil 523 of FIG. 5) in operation 2202. According to an embodiment, reset charging may be charging that the electronic device (e.g., the processor 120 of FIG. 1 or the digitizer controller 603 of FIG. 6) provides to the stylus pen (e.g., the coil 523 of FIG. 5) for a first duration using the detecting coil (e.g., the detecting coil 1101 of FIG. 11) as described above in connection with FIG. 14.

According to an embodiment, the stylus pen 220 may start to charge the battery (e.g., the battery 706 of FIG. 7) based on power received through reset charging in operation 2203.

According to an embodiment, the electronic device (e.g., the processor 120 of FIG. 1 or the digitizer controller 603 of FIG. 6) may perform a scanning operation to receive the advertising signal from the stylus pen (e.g., the second short-range communication controller 709 of FIG. 7) using the first short-range communication controller (e.g., the first short-range communication controller 604 of FIG. 6) in operation 2204.

According to an embodiment, the stylus pen 220 may perform booting using power received from charging the battery (e.g., the battery 706 of FIG. 7) in the discharged state or low power state in operation 2205. Booting may include at least one of the operation of switching the stylus pen 220 from a power-off state to a power-on state or the operation of switching the stylus pen 220 from the low power state (e.g., a state in which the second short-range communication controller 709 of FIG. 7 is unable to supply energy necessary for performing the advertising operation) to a state in which the advertising operation may be performed.

According to an embodiment, the stylus pen (e.g., the second short-range communication controller 709 of FIG. 7) may transmit the advertising signal to the electronic device (e.g., the first short-range communication controller 604 of FIG. 6) in operation 2206.

According to an embodiment, the electronic device (e.g., the processor 120 of FIG. 1 or the digitizer controller 603 of FIG. 6) may receive the advertising signal from the stylus pen (e.g., the second short-range communication controller 709 of FIG. 7) using the first short-range communication controller (e.g., the first short-range communication controller 604 of FIG. 6) in operation 2207. The advertising signal may contain unique information (e.g., Bluetooth address or device information) about the stylus pen 220.

According to an embodiment, the electronic device (e.g., the processor 120 of FIG. 1 or the digitizer controller 603 of FIG. 6) may detect the stylus pen 220 based on the received advertising signal in operation 2208. According to an embodiment, the electronic device (e.g., the processor 120 of FIG. 1) may compare the unique information contained in the advertising signal with reference unique information stored in the memory (e.g., the memory 130 of FIG. 1). The reference unique information may contain unique information corresponding to at least one stylus pen which has established the previous pairing. According to an embodiment, when the comparison reveals that the unique information matches the reference unique information, the electronic device (e.g., the processor 120 of FIG. 1) may determine that the stylus pen 220 which has transmitted the advertising signal is one of the at least one stylus pen which has established the previous pairing.

According to an embodiment, upon detecting the stylus pen 220, the electronic device (e.g., the processor 120 of FIG. 1 or the digitizer controller 603 of FIG. 6) may stop reset charging and start to provide normal charging in operation 2209. The normal charging may be charging which is repeatedly provided for a duration shorter than the reset charging.

According to an embodiment, the electronic device (e.g., the processor 120 of FIG. 1 or the digitizer controller 603 of FIG. 6) may send a request for communication connection to the stylus pen (e.g., the second short-range communication controller 709 of FIG. 7) using the first short-range communication controller (e.g., the first short-range communication controller 604 of FIG. 6) in operation 2210. For example, according to an embodiment, the electronic device 101 may send a request for wireless communication connection to the stylus pen 220 while providing normal charging.

According to an embodiment, the electronic device (e.g., the processor 120 of FIG. 1 or the digitizer controller 603 of FIG. 6) may establish a communication connection with the stylus pen (e.g., the second short-range communication controller 709 of FIG. 7) using the first short-range communication controller (e.g., the first short-range communication controller 604 of FIG. 6) in operation 2211. According to an embodiment, upon establishing a wireless communication connection with the stylus pen (e.g., the second short-range communication controller 709 of FIG. 7) for the first time, the electronic device (e.g., the processor 120 of FIG. 1 or the digitizer controller 603 of FIG. 6) may identify at least one of identification information about the stylus pen (e.g., the stylus pen 220 of FIG. 4) (hereinafter, "device identification information"), color information about the stylus pen 220 (hereinafter, "device color information"), information about the user account (hereinafter, "user account information"), information regarding whether pairing with another device currently exists (hereinafter, "current pairing information"), a list of devices paired before (hereinafter, "pairing list"), information about devices simultaneously pairable (hereinafter, "simultaneous pairing information"), transmission (tx) power, a detection area, information regarding the remaining battery (hereinafter, "battery state information"), button input information, or connection state information.

According to an embodiment, the electronic device 101 may set a descriptor for the stylus pen 220 in operation 2212. According to an embodiment, the stylus pen 220 may activate (or enable) the notification property of the second short-range communication controller (e.g., the second short-range communication controller 709 of FIG. 7) based on the set descriptor. The notification property may mean the notification property of the function of transmitting an event about at least one of the connection state information (e.g., the strength of wireless connection signal), battery state information, or button input information about the stylus pen 220 to the electronic device 101. The activating (or enabling) operation may be performed after a communication connection is established in operation 2210, but embodiments of the disclosure are not limited thereto.

Figure 23:
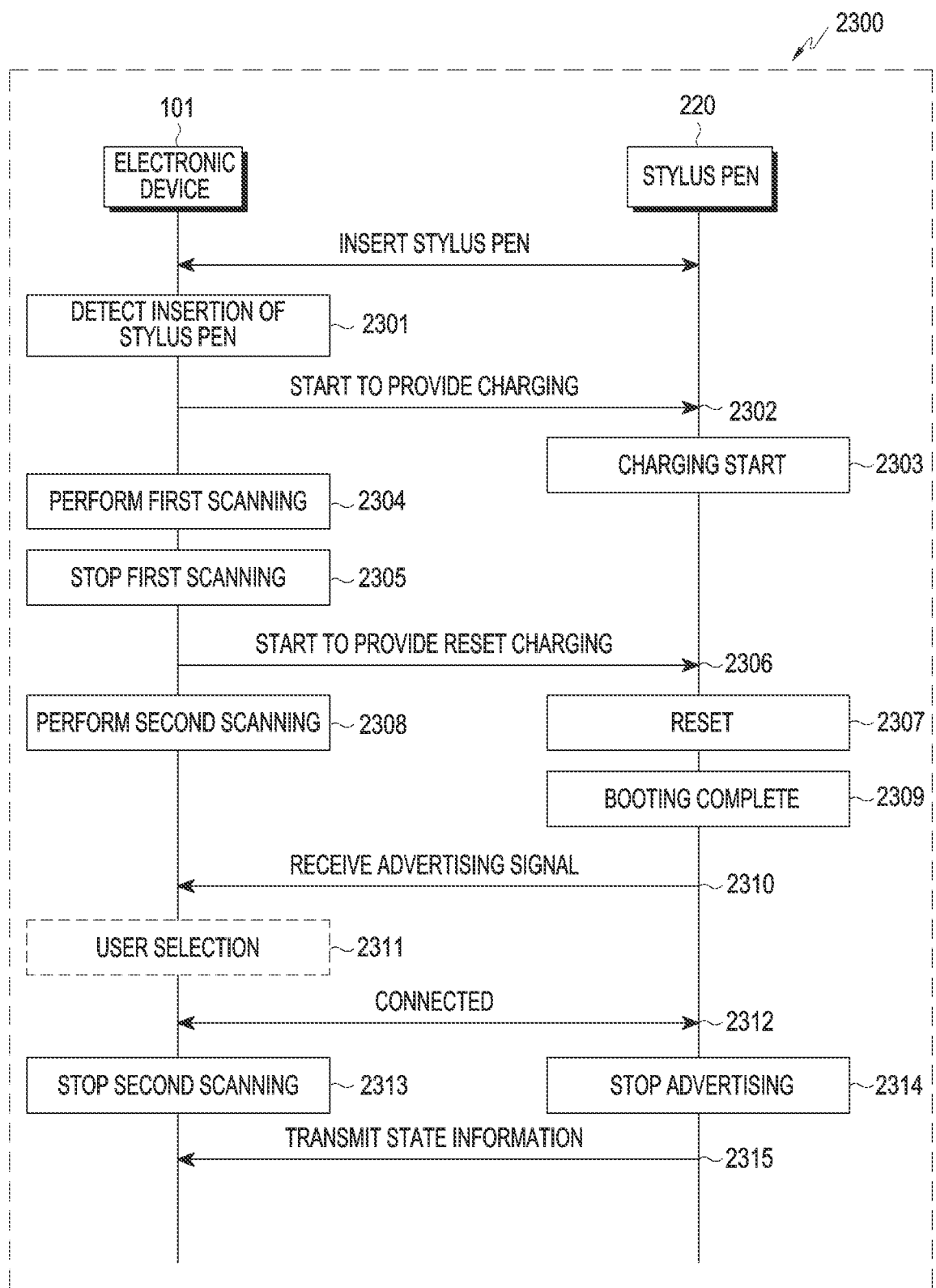
FIG. 23 is a flow diagram illustrating an example operation of establishing a communication connection between an electronic device and a stylus pen when the stylus pen is in a discharged state or low-power state according to an embodiment of the disclosure.

FIG. 23 is a flow diagram illustrating an example operation of establishing a communication connection between an electronic device and a stylus pen when the stylus pen is in a discharged state or low power state according to an embodiment of the disclosure. What has been described above in connection with FIG. 22 is not repeated below.

Referring to FIG. 23, in a view 2300, the electronic device (e.g., the processor 120 of FIG. 1 or the digitizer controller 603 of FIG. 6) may detect insertion of the stylus pen 220 into the inner space (e.g., the receiving space 112 of FIG. 2) in operation 2301.

According to an embodiment, the electronic device (e.g., the processor 120 of FIG. 1 or the digitizer controller 603 of FIG. 6) may provide charging to the stylus pen (e.g., the coil 523 of FIG. 5) in operation 2302. According to an embodiment, the operation of providing charging may be the operation of providing normal charging described above in connection with FIG. 22.

According to an embodiment, the stylus pen 220 may perform charging in operation 2303.

According to an embodiment, the electronic device (e.g., the processor 120 of FIG. 1 or the digitizer controller 603 of FIG. 6) may perform first scanning on an advertising signal from the stylus pen (e.g., the second short-range communication controller 709 of FIG. 7) using the first short-range communication controller (e.g., the first short-range communication controller 604 of FIG. 6) in operation 2304.

According to an embodiment, upon failing to receive, with a preset time, the advertising signal from the stylus pen (e.g., the second short-range communication controller 709), the electronic device (e.g., the processor 120 of FIG. 1 or the digitizer controller 603 of FIG. 6) may stop the first scanning operation 2304 in operation 2305.

According to an embodiment, the electronic device (e.g., the processor 120 of FIG. 1 or the digitizer controller 603 of FIG. 6) may start to provide reset charging to the stylus pen 220 using the first short-range communication controller (e.g., the first short-range communication controller 604 of FIG. 6) in operation 2306.

According to an embodiment, the stylus pen (e.g., the second short-range communication controller 709 of FIG. 7) may perform the reset operation in operation 2307. The reset operation may be the operation of the stylus pen 220 to initialize the settings of the second short-range communication controller (e.g., the second short-range communication controller 709 of FIG. 7) in the low power state. When the stylus pen 220 is in the discharged state, the reset operation may be omitted.

According to an embodiment, the electronic device (e.g., the processor 120 of FIG. 1 or the digitizer controller 603 of FIG. 6) may perform a second scanning operation to receive the advertising signal from the stylus pen (e.g., the second short-range communication controller 709 of FIG. 7) using the first short-range communication controller (e.g., the first short-range communication controller 604 of FIG. 6) in operation 2308.

According to an embodiment, the stylus pen 220 may be booted by power received to charge the battery (e.g., the battery 706 of FIG. 7) in the discharged state or low power state in operation 2309. Booting may include at least one of the operation of switching the stylus pen 220 from a power-off state to a power-on state or the operation of switching the stylus pen 220 from the low power state (e.g., a state in which the second short-range communication controller 709 of FIG. 7 is unable to supply energy necessary for performing the advertising operation) to a state in which the advertising operation may be performed.

According to an embodiment, the electronic device (e.g., the first short-range communication controller 604 of FIG. 6) may receive the advertising signal from the stylus pen (e.g., the second short-range communication controller 709 of FIG. 7) in operation 2310. The advertising signal may contain unique information (e.g., Bluetooth address or device information) about the stylus pen 220.

According to an embodiment, the electronic device (e.g., the processor 120 of FIG. 1 or the digitizer controller 603 of FIG. 6) may receive a selection for establishing a wireless communication connection with the stylus pen (e.g., the second short-range communication controller 709) from the user in operation 2311. According to an embodiment, the electronic device (e.g., the processor 120 of FIG. 1) may compare the unique information contained in the advertising signal with reference unique information stored in the memory (e.g., the memory 130 of FIG. 1). The reference unique information may contain unique information corresponding to at least one stylus pen which has established the previous pairing. According to an embodiment, when the comparison reveals that the unique information matches the reference unique information, the electronic device (e.g., the processor 120 of FIG. 1) may determine that the stylus pen 220 which has transmitted the advertising signal is one of the at least one stylus pen which has established the previous pairing. According to an embodiment, the electronic device (e.g., the processor 120 of FIG. 1 or the digitizer controller 603 of FIG. 6) may perform the operation of automatically establishing a wireless communication connection with the detected stylus pen 220 even without a user input in which case operation 2311 may be omitted.

According to an embodiment, the electronic device (e.g., the processor 120 of FIG. 1 or the digitizer controller 603 of FIG. 6) may establish a wireless communication connection with the stylus pen (e.g., the second short-range communication controller 709 of FIG. 7) using the first short-range communication controller (e.g., the first short-range communication controller 604 of FIG. 6) in operation 2312. For example, according to an embodiment, the operation of the electronic device 101 to establish a wireless communication connection may be performed while charging is provided to the stylus pen 220.

According to an embodiment, the electronic device (e.g., the processor 120 of FIG. 1 or the digitizer controller 603 of FIG. 6) may stop the second scanning operation in operation 2313.

According to an embodiment, the stylus pen (e.g., the second short-range communication controller 709 of FIG. 7) may stop the advertising operation in operation 2314.

According to an embodiment, the stylus pen (e.g., the second short-range communication controller 709 of FIG. 7) may transmit state information to the electronic device (e.g., the first short-range communication controller 604 of FIG. 6) in operation 2315. For example, the state information may include at least one of connection state information, button input information, or battery state information about the stylus pen 220.

Figure 24:
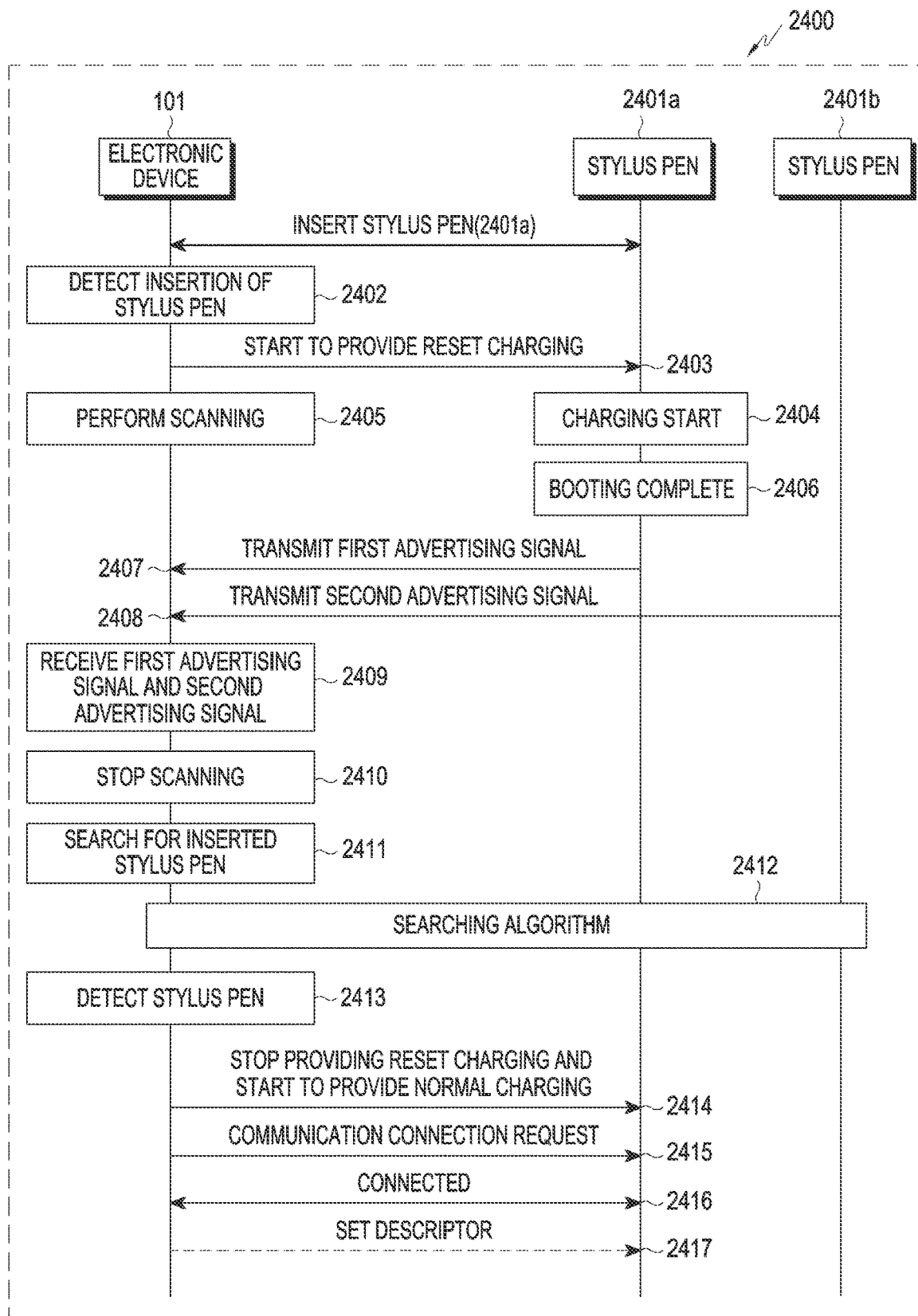
FIG. 24 is a flow diagram illustrating an example operation of establishing a communication connection between an electronic device and a stylus pen when a stylus pen to which the electronic device intends to establish a new connection is in a discharged state or low-power state according to an embodiment of the disclosure.

FIG. 24 is a flow diagram illustrating an example operation of establishing a communication connection between an electronic device and a stylus pen when the stylus pen to which the electronic device intends to establish a new connection is in a discharged state or low-power state according to an embodiment of the disclosure.

The same description given for operations 2201 to 2203 of FIG. 22 may apply to operations 2402 to 2404 of FIG. 24 and, thus, no description of operations 2402 to 2404 is presented below.

Referring to FIG. 24, in a view 2400, the electronic device (e.g., the processor 120 of FIG. 1 or the digitizer controller 603 of FIG. 6) may broadcast scan signals using the first short-range communication controller (e.g., the first short-range communication controller 604 of FIG. 6) in operation 2405. The broadcast scan signals may be transferred to a plurality of stylus pens 2401a and 2401b. The plurality of stylus pens may be two or more stylus pens as described in connection with FIG. 24 but the number of the plurality of stylus pens is not limited to two. In the following description, the plurality of stylus pens 2401a and 2401b have not been connected with the electronic device (e.g., the first short-range communication controller 604 of FIG. 6), the stylus pen 2401a is inserted in the inner space (e.g., the receiving space 112 of FIG. 2) of the electronic device (e.g., the electronic device 101 of FIG. 1), and the stylus pen 2401b is not inserted in the inner space (e.g., the receiving space 112 of FIG. 2) (or is inserted in another electronic device).

According to an embodiment, the stylus pen 2401a may start to be charged (2404) by the reset charging of operation 2403 and may then be completely booted in operation 2406. According to an embodiment, the stylus pen 2401a may be reset by reset charging.

According to an embodiment, the stylus pen 2401a may transmit a first advertising signal to the electronic device 101 in response to the scan signal broadcast from the electronic device 101 in operation 2407. The first advertising signal may contain first unique information (e.g., Bluetooth address or device information) about the stylus pen 2401a.

According to an embodiment, the stylus pen 2401b may transmit a second advertising signal to the electronic device 101 in response to the scan signal broadcast from the electronic device 101 in operation 2408. The second advertising signal may contain second unique information (e.g., Bluetooth address or device information) about the stylus pen 2401b.

According to an embodiment, the electronic device 101 may receive a plurality of advertising signals (e.g., a first advertising signal and a second advertising signal) from the plurality of stylus pens 2401a and 2401b in response to the broadcast scan signal in operation 2409. According to an embodiment, the electronic device (e.g., the processor 120 of FIG. 1) may compare reference unique information stored in the memory (e.g., the memory 130 of FIG. 1) with first unique information and second unique information. The reference unique information may contain unique information corresponding to at least one stylus pen (not shown) which has established the previous pairing. According to an embodiment, when the comparison reveals that the first unique information or second unique information does not include the reference unique information, the electronic device (e.g., the processor 120 of FIG. 1) may determine that the plurality of stylus pens 2401a and 2401b are stylus pens which have not been paired yet.

According to an embodiment, the electronic device 101 may stop the scanning operation (e.g., broadcasting the scan signal) in operation 2410. According to an embodiment, upon determining that all of the plurality of stylus pens 2401a and 2401b have not been paired yet (2409), the electronic device (e.g., the processor 120 of FIG. 1) may perform the scanning operation for a predesignated time (e.g., 40 seconds) and may then stop.

According to an embodiment, the electronic device 101 may search for the stylus pen 2401a inserted in the inner space (e.g., the receiving space 112 of FIG. 2) in operations 2411 and 2412. The searching algorithm 2412 of FIG. 24 is described below in greater detail.

According to an embodiment, the electronic device 101 may detect the stylus pen 2401a inserted in the inner space (e.g., the receiving space 112 of FIG. 2) among the plurality of stylus pens 2401a and 2401b which have transmitted advertising signals based on the searching algorithm 2412 in operation 2413.

Substantially the same description given for operations 2209 to 2212 of FIG. 22 may apply to operations 2414 to 2417 and, thus, no description of operations 2414 to 2417 is presented below.

The searching algorithm 2412 of FIG. 24 is described below. The internal components of the stylus pen 2401a inserted in the inner space (e.g., the receiving space 112 of FIG. 2) of FIG. 24 are described in connection with the components of the stylus pen 220 or digital pen 201 of FIGS. 5 and 7.

The following operations are described under the hypothesis that the plurality of stylus pens 2401a and 2401b have been determined to have not been paired yet according to operations 2409 and 2410 of FIG. 24.

According to an embodiment, the electronic device (e.g., the processor 120 of FIG. 1) may repeatedly control the digitizer controller (e.g., the digitizer controller 603 of FIG. 6) to periodically turn on or off According to an embodiment, the digitizer controller (e.g., the digitizer controller 603 of FIG. 6) may be on during a first designated time (e.g., 9 seconds) and off during a second designated time (e.g., one second).

According to an embodiment, upon turning on, the digitizer controller (e.g., the digitizer controller 603 of FIG. 6) may provide charging (power) to the stylus pen (e.g., the coil 523). The operation of the digitizer controller (e.g., the digitizer controller 603 of FIG. 6) to provide charging (power) may repeatedly be performed in response to the repeated turn-on or turn-off by the processor (e.g., the processor 120 of FIG. 1).

According to an embodiment, the stylus pen 2401a may receive the provided charging (power) and may, in response, broadcast an advertising signal to the electronic device 101. Broadcasting of the advertising signal may be performed within a predesignated time from the time of receiving the provided charging (power). According to an embodiment, when the digitizer controller (e.g., the digitizer controller 603 of FIG. 6) is turned off so that no charging (power) is received by the coil (e.g., the coil 523 of FIG. 5), the stylus pen 2401a may not broadcast the advertising signal. In this case, the stylus pen 2401b may broadcast an advertising signal at any time (e.g., a time including a period during which the digitizer controller 603 is off as shown in FIG. 6) regardless of whether charging (power) is provided to the stylus pen 2401a.

According to an embodiment, when a plurality of advertising signals (e.g., a first advertising signal and a second advertising signal) are received within a predesignated time from the time of starting to provide charging (power) to the stylus pen 2401a, the electronic device (e.g., the processor 120 of FIG. 1) may control the digitizer controller (e.g., the digitizer controller 603 of FIG. 6) to turn off and turn back on. According to an embodiment, the electronic device (e.g., the processor 120 of FIG. 1) may identify a first list based on advertising signals received when the digitizer controller (e.g., the digitizer controller 603 of FIG. 6) turns on and a second list based on advertising signals received when the digitizer controller (e.g., the digitizer controller 603 of FIG. 6) turns off. The first list and the second list each may include a list of stylus pens which have transmitted the advertising signals based on unique information contained in the received advertising signals. For example, when the first list includes the stylus pen 2401a and the stylus pen 2401b, and the second list includes the stylus pen 2401b, the electronic device (e.g., the processor 120 of FIG. 1) may compare the first and the second list and may detect the stylus pen 2401a which has transmitted the advertising signal in response to the turn-on of the digitizer controller (e.g., the digitizer controller 603 of FIG. 6) (i.e., which has transmitted the advertising signal only when the digitizer controller is on). Although two stylus pens 2401a and 2401b for the first list and the second list are described above, even when advertising signals are received from three or more stylus pens, the above-described operation of turning on/off the digitizer controller (e.g., the digitizer controller 603 of FIG. 6) may be repeated (e.g., five times), and the first list and the second list may be compared to thereby detect one stylus pen 2401a which transmits an advertising signal in response to the turn-on of the digitizer controller (e.g., the digitizer controller 603 of FIG. 6) (i.e., which is inserted in the inner space (e.g., the receiving space 112 of FIG. 2)). According to an embodiment, the electronic device (e.g., the processor 120 of FIG. 1) may detect the detected stylus pen 2401a as inserted in the inner space (e.g., the receiving space 112 of FIG. 2).

According to an embodiment, the electronic device (e.g., the processor 120 of FIG. 1) may establish a wireless communication connection between the detected stylus pen 2401a, the first short-range communication controller (e.g., the first short-range communication controller 604 of FIG. 6), and the second short-range communication controller (e.g., the second short-range communication controller 709 of FIG. 7) based on the unique information (e.g., the first unique information). The wireless communication connection may be a Bluetooth communication connection and may include a pairing operation.

Figure 25:
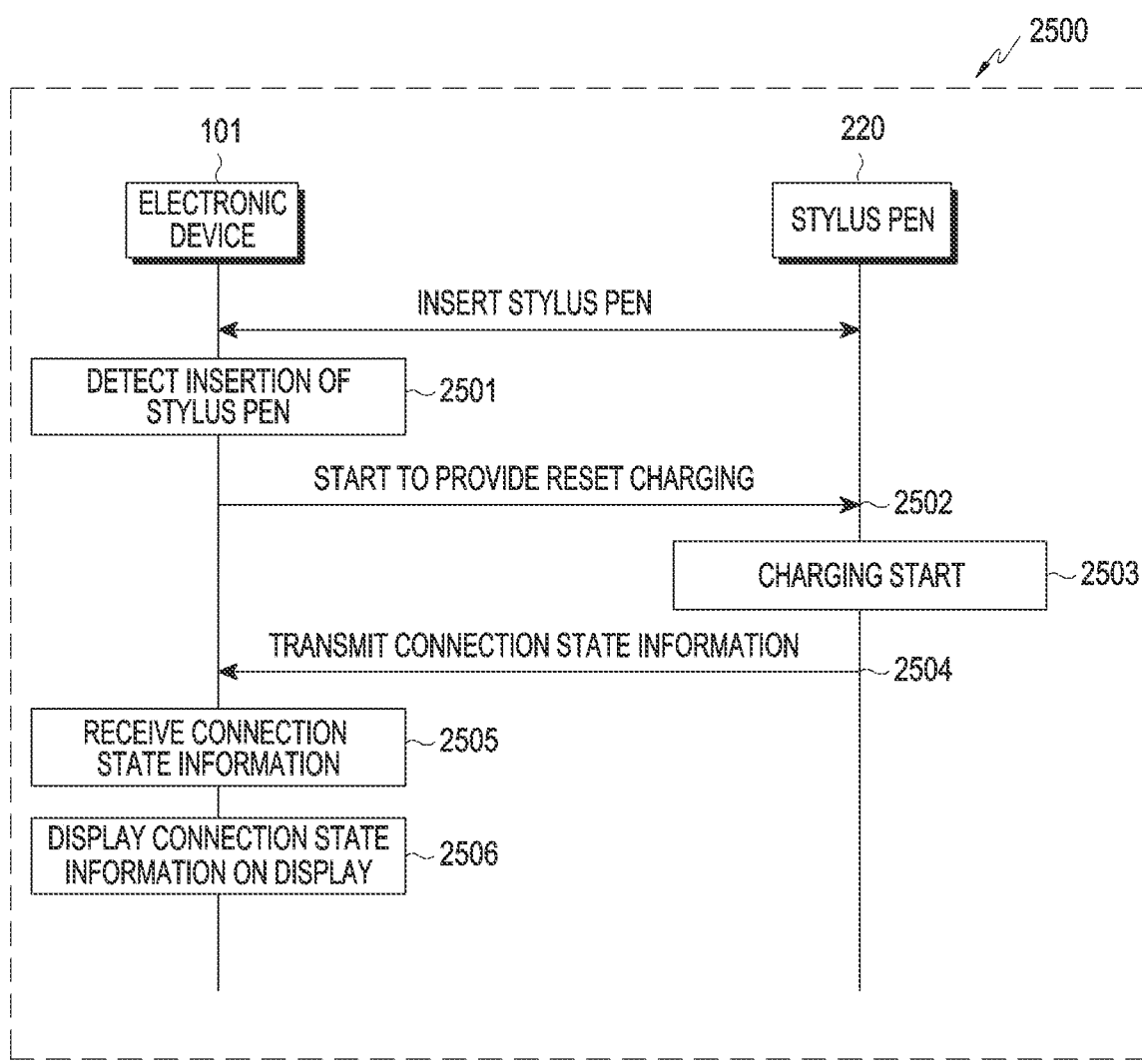
FIG. 25 is a flow diagram illustrating example operation between an electronic device and a stylus pen according to an embodiment of the disclosure.

FIG. 25 is a flow diagram illustrating example operations of an electronic device and a stylus pen according to an embodiment of the disclosure.

What overlaps the above description is omitted from the description or may be briefly described.

Referring to FIG. 25, in a view 2500, the electronic device (e.g., the processor 120 of FIG. 1 or the digitizer controller 603 of FIG. 6) may detect insertion of the stylus pen 220 in operation 2501. According to an embodiment, the electronic device (e.g., the processor 120 of FIG. 1 or the digitizer controller 603 of FIG. 6) may receive a response signal (e.g., the response signal of FIG. 12) using the detecting coil (e.g., the detecting coil 1101 of FIG. 11). According to an embodiment, when the strength of the received response signal is a preset value or more, the electronic device (e.g., the processor 120 of FIG. 1 or the digitizer controller 603 of FIG. 6) may detect that the stylus pen 220 is inserted into the inner space (e.g., the receiving space 112 of FIG. 2).

According to an embodiment, the electronic device (e.g., the processor 120 of FIG. 1 or the digitizer controller 603 of FIG. 6) may start to provide charging to the stylus pen 220 in operation 2502. According to an embodiment, the electronic device (e.g., the processor 120 of FIG. 1 or the digitizer controller 603 of FIG. 6) may provide charging by transferring current (e.g., induced current) to the stylus pen (e.g., the coil 523 of FIG. 5) in an electromagnetic induction scheme using the detecting coil (e.g., the detecting coil 1101 of FIG. 11).

According to an embodiment, the stylus pen (e.g., the second short-range communication controller 709 of FIG. 7) may start to charge the battery (e.g., the battery 706 of FIG. 7) based on power received via the charging in operation 2503.

According to an embodiment, the stylus pen (e.g., the second short-range communication controller 709 of FIG. 7) may transmit connection state information to the electronic device (e.g., the first short-range communication controller 604 of FIG. 6) in operation 2504. The connection state information may include at least one of the strength of the wireless communication connection, the color or kind of the stylus pen connected which is merely an example.

According to an embodiment, the electronic device (e.g., the processor 120 of FIG. 1 or the digitizer controller 603 of FIG. 6) may receive the connection state information from the stylus pen (e.g., the second short-range communication controller 709 of FIG. 7) in operation 2505.

According to an embodiment, the electronic device (e.g., the processor 120 of FIG. 1 or the digitizer controller 603 of FIG. 6) may display the received connection state information on the display (e.g., the display device 160 of FIG. 1) in operation 2506. The connection state information may be a graphical object indicating that a wireless communication connection between the electronic device 101 and the stylus pen 220 is established or a graphical object indicating that a wireless communication connection is established and maintained and may be displayed on the display.

According to an embodiment, the electronic device 101 may receive battery state information (e.g., information about the remaining battery (e.g., the battery 706 of FIG. 7)) from the stylus pen 220 and display the battery state information on the display. In this case, the battery state information may be displayed, as a graphical object indicating the remaining battery per threshold unit (e.g., 1%), on the display.

Figure 26:
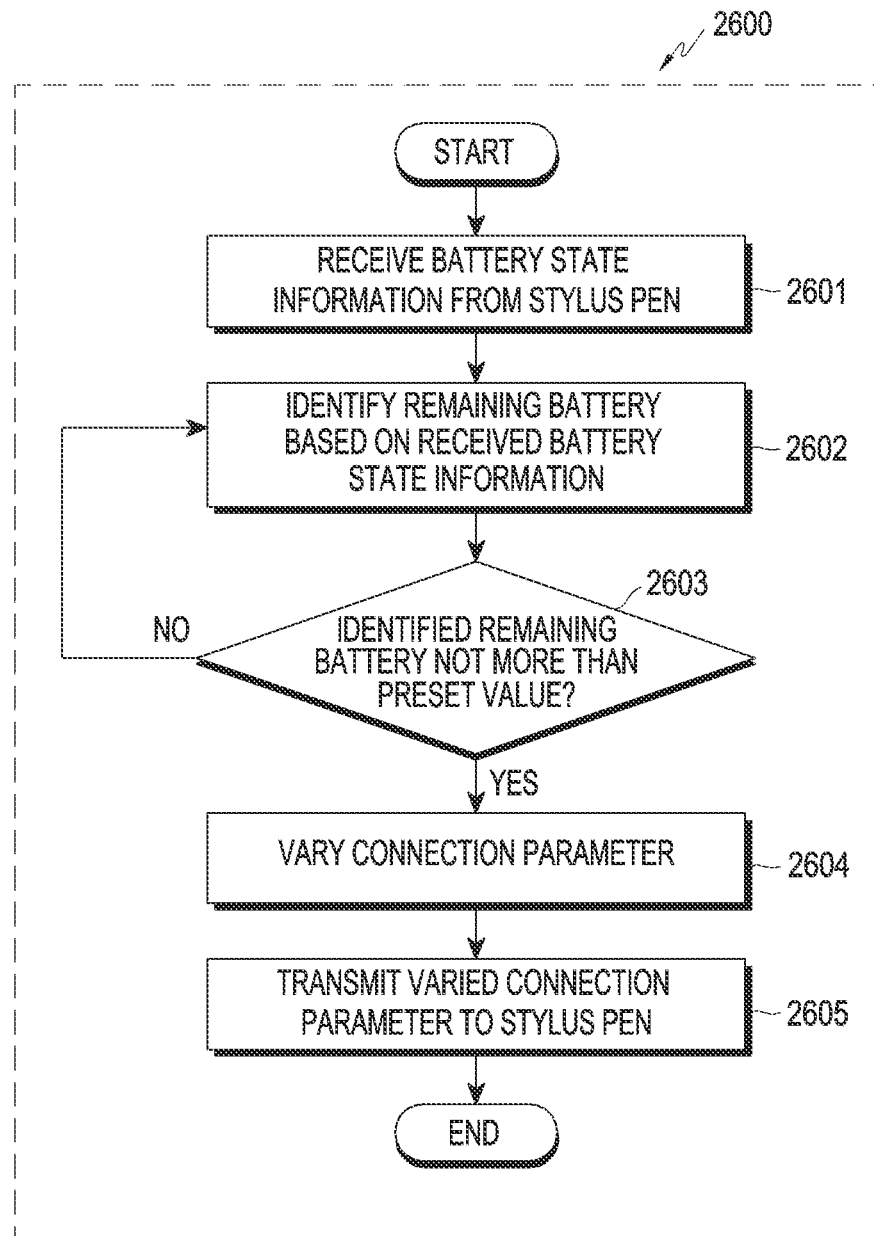
FIG. 26 is a flow diagram illustrating example operation between an electronic device and a stylus pen according to an embodiment of the disclosure.

FIG. 26 is a flow diagram illustrating operations between an electronic device and a stylus pen according to an embodiment of the disclosure.

Referring to FIG. 26, in a view 2600, the electronic device (e.g., the electronic device 101 of FIG. 1) may receive battery state information from the stylus pen (e.g., the second short-range communication controller 709 of FIG. 7) in operation 2601. According to an embodiment, the electronic device (e.g., the electronic device 101 of FIG. 1) may periodically receive battery state information (e.g., information about the remaining battery (e.g., the battery 706 of FIG. 7)) about the stylus pen (e.g., the stylus pen 220 of FIG. 4) from the stylus pen (e.g., the second short-range communication controller 709 of FIG. 7) using the first short-range communication controller (e.g., the first short-range communication controller 604 of FIG. 6).

According to an embodiment, the electronic device (e.g., the electronic device 101 of FIG. 1) may identify the remaining battery based on the received battery state information in operation 2602. According to an embodiment, the electronic device (e.g., the processor 120 of FIG. 1 or the digitizer controller 603 of FIG. 6) may identify the remaining battery information contained in the battery state information periodically received.

According to an embodiment, the electronic device (e.g., the processor 120 of FIG. 1 or the digitizer controller 603 of FIG. 6) may identify whether the identified remaining battery is a preset value or less in operation 2603. The preset value may be at least one of 10% and 20% both of which are merely examples. In operation 2603, when the identified remaining battery exceeds a preset value, operation 2602 may be repeated.

According to an embodiment, when the identified remaining battery is a preset value (e.g., a first preset value or a second preset value) or less, the electronic device (e.g., the processor 120 of FIG. 1 or the digitizer controller 603 of FIG. 6) may vary the connection parameter in operation 2604. The connection parameter may include a slave latency or a supervision timeout which is merely an example. For example, the slave latency may indicate the number of events in which the stylus pen (e.g., the second short-range communication controller 709 of FIG. 7) does not respond among events transmitted to the stylus pen (e.g., the second short-range communication controller 709 of FIG. 7) at each connection interval from the electronic device (e.g., the first short-range communication controller 604 of FIG. 6) to identify that Bluetooth low energy wireless communication connection is maintained according to the Bluetooth standard. For example, the initial value of the slave latency may be the number of events corresponding to 9 seconds. For example, the supervision timeout may indicate a predetermined time for determining that the wireless communication connection is released when the predetermined time elapses after transmission and reception of the last data between the electronic device (e.g., the first short-range communication controller 604 of FIG. 6) and the stylus pen (e.g., the second short-range communication controller 709 of FIG. 7) according to the Bluetooth low energy (BLE) standard. For example, the initial value of the supervision timeout may be 18 seconds. According to an embodiment, when the remaining battery is the first preset value (e.g., 20%) or more, the electronic device (e.g., the processor 120 of FIG. 1 or the digitizer controller 603 of FIG. 6) may set (or maintain) the slave latency and supervision timeout to the initial values.

According to an embodiment, upon determining that the remaining battery is the first preset value (e.g., 20%) or less, the electronic device (e.g., the processor 120 of FIG. 1 or the digitizer controller 603 of FIG. 6) may increase the slave latency or supervision timeout. According to an embodiment, upon determining that the remaining battery of the stylus pen (e.g., the stylus pen 220 of FIG. 4) is the second preset value (e.g., 10%) or less, the electronic device (e.g., the processor 120 of FIG. 1 or the digitizer controller 603 of FIG. 6) may reduce the slave latency or the supervision timeout.

According to an embodiment, the electronic device (e.g., the electronic device 101 of FIG. 1) may transmit the varied connection parameter to the stylus pen in operation 2605. According to an embodiment, the electronic device (e.g., the electronic device 101 of FIG. 1) may transmit the varied connection parameter to the stylus pen (e.g., the second short-range communication controller 709 of FIG. 7) using the first short-range communication controller (e.g., the first short-range communication controller 604 of FIG. 6). The stylus pen receiving the varied connection parameter may vary the operation properties of the wireless communication (e.g., Bluetooth low energy (BLE) communication) based on the varied connection parameter. For example, when the remaining battery is the first preset value (e.g., 20%) or less so that the slave latency increases, the stylus pen (e.g., the stylus pen 220 of FIG. 4) may increase the period of responding (i.e., decrease the responding frequency) to the event for connection maintaining identification received from the electronic device (e.g., the first short-range communication controller 604 of FIG. 6) at each predetermined connection interval, so that the power consumption of the battery (e.g., the battery 706 of FIG. 7) may be reduced. When the remaining battery is the second preset value (e.g., 10%) or less so that the slave latency reduces, the stylus pen (e.g., the stylus pen 220 of FIG. 4) may reduce the rx window opening time (i.e., the time of waiting to receive data from the electronic device 101 of FIG. 1). According to an embodiment, as the rx window opening time decreases, the amount of temporary voltage drop which occurs during the rx window opening time may decrease so that the stylus pen (e.g., the stylus pen 220 of FIG. 4) may be driven even at low battery power. Accordingly, the use time of the stylus pen (e.g., the stylus pen 220 of FIG. 4) may increase.

According to an embodiment, the electronic device (e.g., the processor 120 of FIG. 1 or the digitizer controller 603 of FIG. 6) may, in real-time, measure the strength (e.g., received signal strength indicator (RSSI)) or signal or the bit error rate (BER) of signal received from the stylus pen (e.g., the second short-range communication controller 709 of FIG. 7) and vary the connection parameter (e.g., slave latency or supervision timeout) based on a result of the measurement. The signal strength may indicate the strength of a wireless communication signal that the electronic device (e.g., the first short-range communication controller 604 of FIG. 6) receives from the stylus pen (e.g., the second short-range communication controller 709 of FIG. 7). According to an embodiment, the electronic device (e.g., the processor 120 of FIG. 1 or the digitizer controller 603 of FIG. 6) may determine the current wireless communication connection state between the electronic device (e.g., the first short-range communication controller 604 of FIG. 6) and the stylus pen (e.g., the second short-range communication controller 709 of FIG. 7) based on the BER value or the strength of wireless communication signal. For example, according to an embodiment, when the measured BER value increases or the measured wireless communication signal strength decreases, the electronic device (e.g., the electronic device 101 of FIG. 1) may determine that the current wireless communication connection is in poor state and is to be disconnected. According to an embodiment, upon determining that the wireless communication connection is to be disconnected, the electronic device (e.g., the processor 120 of FIG. 1 or the digitizer controller 603 of FIG. 6) may vary the slave latency to adjust the power consumption of the battery (e.g., the battery 706 of FIG. 7) of the stylus pen (e.g., the stylus pen 220 of FIG. 4) or immediacy (i.e., the response speed of the second short-range communication controller 709 in the wireless communication connection). For example, upon determining that the wireless communication connection is to be disconnected, the electronic device (e.g., the processor 120 of FIG. 1 or the digitizer controller 603 of FIG. 6) may reduce the slave latency. The reason why is when the wireless communication connection is not in good state, although the electronic device (e.g., the processor 120 of FIG. 1 or the digitizer controller 603 of FIG. 6) increases the slave latency, the transmission/reception accuracy of the connection maintaining identification event and its relevant response may decrease so that the number of attempts to transmit/receive the event and response may increase, thus consuming more battery power of the stylus pen (e.g., the stylus pen 220 of FIG. 4). Thus, when the wireless communication connection is in a poor state, the electronic device (e.g., the processor 120 of FIG. 1 or the digitizer controller 603 of FIG. 6) may increase immediacy for the wireless communication connection of the stylus pen (e.g., the second short-range communication controller 709 of FIG. 7) by reducing the slave latency based on at least one of the strength of wireless communication signal or the BER value.

Figure 27:
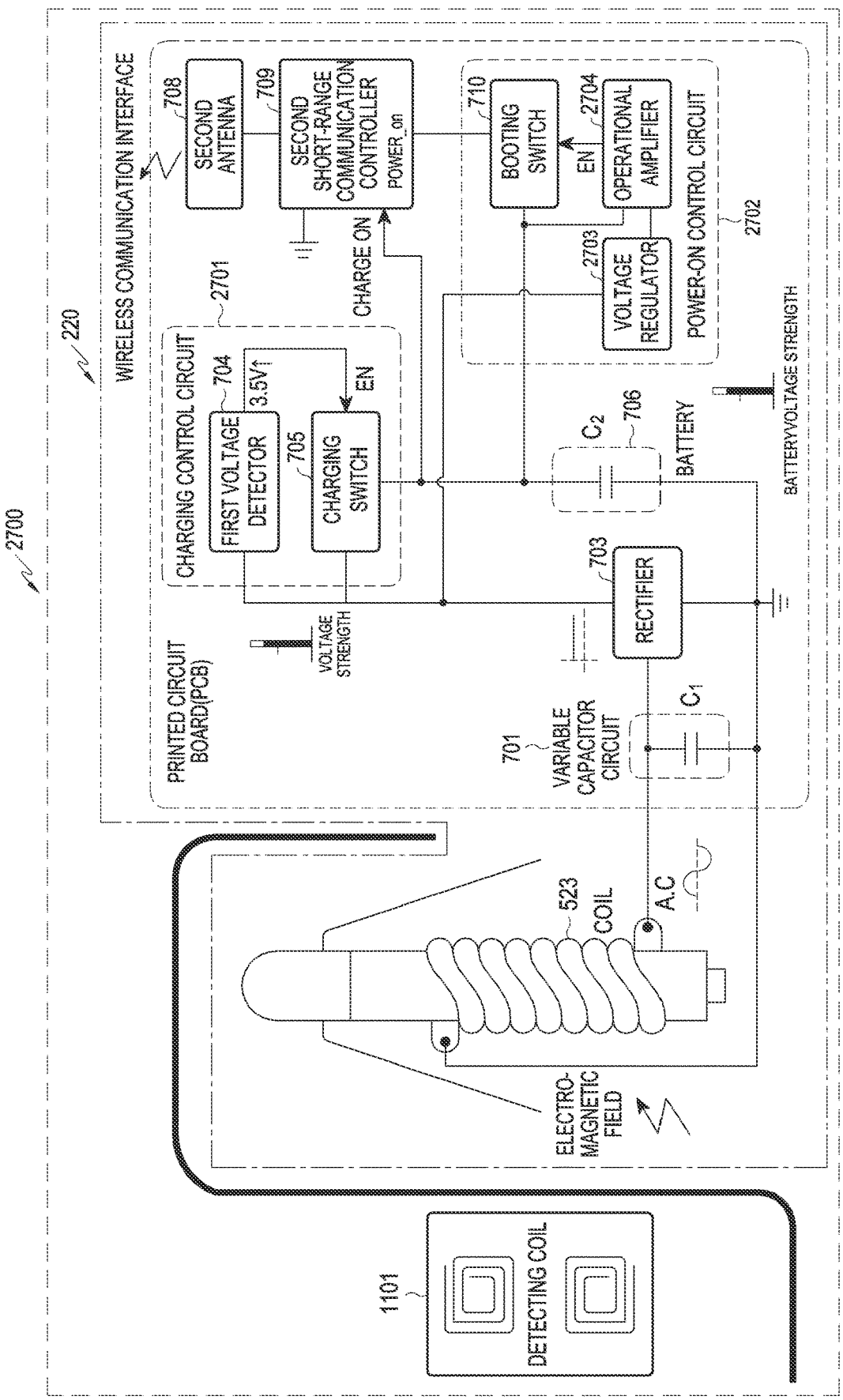
FIG. 27 is a view illustrating example operations between an electronic device and a stylus pen according to an embodiment of the disclosure.

FIG. 27 is a view illustrating operations between an electronic device and a stylus pen according to an embodiment of the disclosure.

Referring to FIG. 27, in a view 2700, the stylus pen 220 may include at least one of a coil 523, a variable capacitor circuit 701, a rectifier 703, a battery 706, a second antenna 708, a second short-range communication controller 709, a charging controller circuit 2701 (e.g., the charging circuit 388 of FIG. 3), or a power-on controller circuit 2702. What has been described above in connection with FIG. 5, 6, or 7 is briefly described or omitted from the description.

According to an embodiment, the charging control circuit 2701 may be connected to be able to operate with at least one of the rectifier 703, the battery 706, the second short-range communication controller 709, or the power-on controller circuit 2702. According to an embodiment, the charging control circuit 2701 may include a first voltage detector 704 (or a voltage supervisor) and a charging switch 705. According to an embodiment, the first voltage detector 704 may detect a voltage value of DC power (or charging signal) transferred from the rectifier 703. According to an embodiment, when the magnitude of the detected voltage value is a preset value (e.g., 3.5V) or more, the first voltage detector 704 may apply an enable signal to the charging switch 705, thereby controlling the charging switch 705 to turn on. According to an embodiment, when the charging switch 705 is turned on by the first voltage detector 704, the charging switch 705 may transfer DC power transferred from the first voltage detector 704 to the battery 706. According to an embodiment, when the magnitude of the detected voltage value is less than a preset value (e.g., 3.5V), the first voltage detector 704 may control the charging switch 705 to turn off or remain in the off state.

According to an embodiment, the power-on controller circuit 2702 may be connected to be able to operate with at least one of the rectifier 703, the battery (EDLC) 706, the second short-range communication controller 709, or the charging controller circuit 2701. According to an embodiment, the power-on controller circuit 2702 may include a voltage regulator 2703, a differential op-amp 2704, and a booting switch (or a power switch) 710. At least one of the voltage regulator 2703 or the differential op-amp 2704 may constitute the second voltage detector 707 of FIG. 7. According to an embodiment, the voltage regulator 2703 may determine a reference voltage from DC power transferred from the rectifier 703. According to an embodiment, the differential op-amp 2704 may detect the voltage output from the battery 706 and detect a voltage difference from a reference voltage determined by the voltage regulator 2703.

According to an embodiment, when the voltage difference is a power-on value (e.g., 2.4V) or more, the differential op-amp 2704 may apply an enable signal to the booting switch 710, controlling the booting switch 710 to turn on. In this case, the second short-range communication controller 709 may be booted using the power which is output from the battery 706 as a booting signal is applied from the booting switch 710. The booting may be performed while the stylus pen 220 receives charging (power) from the electronic device (e.g., the detecting coil 1101) (e.g., while the magnitude of the voltage detected by the first voltage detector 704 is a preset value (3.5V) or more). When the second short-range communication controller 709 is booted, the voltage output from the battery 706 may temporarily be reduced so that the voltage difference detected by the differential op-amp 2704 is smaller than the power-on value (e.g., 2.4V). Thus, a power-off value and a power-on value which are different from each other may previously be set to prevent the booting switch 710, which has turned on, from switching from on to off due to the temporary voltage drop (e.g., a voltage drop from a voltage not less than 2.4V to a voltage not more than 2.4V), i.e., to have the hysteresis characteristics. In other words, when the voltage difference detected by the differential op-amp 2704 is the power-on value or more while the stylus pen 220 is charged, the second short-range communication controller 709 may be booted, which may allow the booting switch 710 to remain on regardless of the temporary voltage drop although the detected voltage difference is lower than the power-on value.

According to an embodiment, although the voltage output from the battery 706 is lower than the power-off value (e.g., 2.4V or a smaller value than 2.4V) while not receiving charging (power) from the electronic device (e.g., the detecting coil 1101) (e.g., while the magnitude of voltage detected by the first voltage detector 704 is less than a preset value (3.5V)) after the second short-range communication controller 709 is booted, the differential op-amp 2704 may control the booting switch 710 to remain on (i.e., to prevent it from turning off).

According to an embodiment, when the detected voltage difference is less than the power-off value, the differential op-amp 2704 may control the booting switch 710 to turn off or remain off According to an embodiment, when the detected voltage difference is less than the power-off voltage while charging (power) is received from the detecting coil 1101, the differential op-amp 2704 may control the booting switch 710 to turn off According to an embodiment, while not receiving charging (power) from the detecting coil 1101, the differential op-amp 2704 may control the booting switch 710 to remain on as described above.

According to an embodiment, the processor (e.g., the processor 320 of FIG. 3) or the second short-range communication controller 709 may execute a power-on sequence corresponding to the output of the power-on controller circuit 2702 and connect an external device (e.g., the electronic device 101 of FIG. 1) with a wireless communication network. According to an embodiment, when a booting signal is applied from the booting switch 710 to the second short-range communication controller 709 so that the second short-range communication controller 709 is booted, the processor (e.g., the processor 320 of FIG. 3) may execute a pre-stored power sequence (e.g., a sequence for performing a pairing operation or connection operation). According to an embodiment, when a booting signal is applied from the booting switch 710 to the second short-range communication controller 709 so that the second short-range communication controller 709 is booted, the second short-range communication controller 709 may execute a pre-stored power sequence (e.g., a sequence for performing a pairing operation or connection maintaining operation).

According to an embodiment, an electronic device (e.g., the electronic device 101 of FIG. 1) may comprise a housing (e.g., the housing 210 of FIG. 2) including an inner space (e.g., the receiving space 112 of FIG. 2), a hole formed through the housing (e.g., the housing 210 of FIG. 2) to the inner space (e.g., the receiving space 112 of FIG. 2), a stylus pen (e.g., the stylus pen 220 of FIG. 4) insertable into the inner space (e.g., the receiving space 112 of FIG. 2) through the hole, wherein the stylus pen (e.g., the stylus pen 220 of FIG. 4) includes a first wireless communication circuit (e.g., the second short-range communication controller 709 of FIG. 7) and a wireless charging receiver circuit (e.g., the coil 523 of FIG. 5, the rectifier 703 of FIG. 7, or the first voltage detector 704 of FIG. 7), a wireless charging transmitter circuit (e.g., the detecting coil 1101 of FIG. 11 or the digitizer controller 603 of FIG. 6) positioned inside the housing and configured to provide charging to the wireless charging receiver circuit when the stylus pen is inserted into the inner space, a second wireless communication circuit (e.g., the first short-range communication controller 604 of FIG. 6) positioned inside the housing, at least one processor (e.g., the processor 120 of FIG. 1) operatively connected to the wireless charging transmitter circuit and the second wireless communication circuit, and at least one memory (e.g., the memory 130 of FIG. 1) operatively connected to the at least one processor, wherein the at least one memory may store instructions that, when executed, cause the at least one processor to detect whether the stylus pen is inserted into the inner space, start to provide charging for a first duration to the wireless charging receiver circuit using the wireless charging transmitter circuit after detecting that the stylus pen is inserted into the inner space, scan for a wireless signal from the first wireless communication circuit using the second wireless communication circuit after the starting to provide charging, receive the wireless signal from the first wireless communication circuit using the second wireless communication circuit, stop providing charging for the first duration to the wireless charging receiver circuit after receiving the wireless signal, and transmit a connection request using the second wireless communication circuit to the first wireless communication circuit.

According to an embodiment, the instructions, when executed, further cause the at least one processor to transmit a detection signal for a first time period using the wireless charging transmitter circuit, receive a response signal from the wireless charging receiver circuit in response to the transmitted detection signal, identify a strength of the received response signal, and when the identified strength of the response signal is a preset value or more, determine that the stylus pen is inserted into the inner space.

According to an embodiment, the strength of the transmitted detection signal may be smaller than a strength of a signal transmitted using the wireless charging transmitter circuit to provide charging to the stylus pen for the first duration.

According to an embodiment, the instructions, when executed, may cause the at least one processor to, when the wireless signal is not received from the wireless charging receiver circuit within a second time period, start to provide charging for the first duration.

According to an embodiment, the wireless signal may include at least one of device identification information, device color information, user account information, pairing information, a pairing list, simultaneous pairing information, transmission power, a detection area, battery state information, or button input information.

According to an embodiment, the instructions, when executed, may cause the at least one processor to provide charging to the wireless charging receiver circuit for the first duration using the wireless charging transmitter circuit to boot the stylus pen, and after the starting to provide charging for the first duration and when the stylus pen is completely booted, receive the wireless signal from the stylus pen.

According to an embodiment, the instructions may cause the at least one processor to provide charging to the wireless charging receiver circuit for the first duration using the wireless charging transmitter circuit to change a state of the stylus pen from a first state to a second state. The first state may include a sleep state, and the second state includes an active state.

According to an embodiment, the instructions, when executed, may cause the at least one processor to provide charging to the wireless charging receiver circuit for the first duration using the wireless charging transmitter circuit to reset the stylus pen, and after the starting to provide charging for the first duration and when the stylus pen is completely reset, receive the wireless signal from the stylus pen.

According to an embodiment, the instructions, when executed, may cause the at least one processor to, after stopping providing charging to for the first duration, provide charging for a second duration to the wireless charging receiver circuit. The second duration may be shorter than the first duration.

According to an embodiment, the instructions, when executed, may cause the at least one processor to, finish scanning for the wireless signal before receiving the wireless signal, search for the stylus pen using a pen searching algorithm, and receive a first wireless signal after searching for the stylus pen.

According to an embodiment, the at least one memory may be configured to store reference unique information. The instructions, when executed, may cause the at least one processor to, after the starting to provide charging for the first duration, receive the first wireless signal and a second wireless signal from the stylus pen and another stylus pen, respectively, using the second wireless communication circuit, determine whether first unique information and second unique information each include the reference unique information, and based on determining that the first unique information does not include the reference unique information and the second unique information does not include the reference unique information, finish scanning for the wireless signal. The other stylus pen may be a stylus pen not inserted into the inner space. The first wireless signal may include the first unique information about the stylus pen, and the second wireless signal includes the second unique information about the other stylus pen.

According to an embodiment, the pen searching algorithm may cause the at least one processor to, after finishing scanning for the wireless signal, repeat turning on and off of the wireless charging transmitter circuit, and perform first scanning to receive the first wireless signal transmitted from the stylus pen in response to the repeated turning on of the wireless charging transmitter circuit. The second wireless signal may be received from the other stylus pen while the wireless charging transmitter circuit is turned off.

According to an embodiment, a method of controlling an electronic device may comprise detecting whether a stylus pen is inserted into an inner space of the electronic device, starting to provide charging for a first duration to the stylus pen after detecting insertion of the stylus pen into the inner space, scanning for a wireless signal from the stylus pen after the starting to provide charging, receiving the wireless signal from the stylus pen, after receiving the wireless signal, stopping providing charging for the first duration to the stylus pen, and transmitting a connection request to the stylus pen.

According to an embodiment, the wireless signal may include at least one of device identification information, device color information, user account information, pairing information, a pairing list, simultaneous pairing information, transmission power, a detection area, battery state information, or button input information.

According to an embodiment, the starting to provide charging for the first duration to the stylus pen may comprise providing charging to the stylus pen for the first duration to boot the stylus pen, and after the starting to provide charging for the first duration and when the stylus pen is completely booted, receiving the wireless signal from the stylus pen.

According to an embodiment, the starting to provide charging for the first duration to the stylus pen may comprise providing charging to the stylus pen for the first duration to change a state of the stylus pen from a first state to a second state. The first state may be a sleep state, and the second state may be an active state.

According to an embodiment, the starting to provide charging for the first duration to the stylus pen may comprise providing charging to the stylus pen for the first duration to reset the stylus pen, and after the starting to provide charging for the first duration and when the stylus pen is completely reset, receiving the wireless signal from the stylus pen.

According to an embodiment, the method may further comprise, after stopping providing charging for the first duration, providing charging for a second duration to the stylus pen. The second duration may be shorter than the first duration.

According to an embodiment, the receiving of the wireless signal from the stylus pen may comprise finishing scanning for the wireless signal before receiving the wireless signal, searching for the stylus pen using a pen searching algorithm, and receiving a first wireless signal after searching for the stylus pen.

According to an embodiment, a stylus pen comprises a printed circuit board (PCB) electrically connected with a wireless charging coil (e.g., the coil 523 of FIG. 27) positioned in a pen tip inside a cylindrical housing. The printed circuit board may include a resonance circuit (e.g., the variable capacitor circuit 701 of FIG. 27) configured to, together with the wireless charging coil, receive a charging resonance frequency signal, a charging circuit (e.g., the rectifier 703 of FIG. 27) configured to convert the charging resonance frequency signal into a direct current (DC) charging signal corresponding to the charging resonance frequency signal, a charging control circuit (e.g., the charging control circuit 2701 of FIG. 27) configured to control a charge-on switch (e.g., the charging switch 705 of FIG. 27) to electrically connect the charging circuit with an electric double layered capacitor (EDLC) battery (e.g., the battery 706 of FIG. 27) corresponding to the charging signal exceeding a reference charging voltage and electrically disconnect the charging circuit and the EDLC battery from each other corresponding to the charging signal not more than the reference charging voltage, a power-on control circuit (e.g., the power-on controller circuit 2702 of FIG. 27) configured to control a power switch (e.g., the booting switch 710 of FIG. 27) in a first connection state when a voltage of the EDLC battery is not more than a power-off voltage and in a second connection state when the voltage of the EDLC battery is not less than a power-on voltage, corresponding to an output of the charging control circuit, and to maintain the second connection state regardless of the voltage of the EDLC battery corresponding to non-output from the charging control circuit, and a processor configured to perform a power-on sequence of the processor (e.g., the processor 320 of FIG. 3) corresponding to an output of the power-on control circuit and connect to an external device (e.g., the electronic device 101 of FIG. 1) with a wireless communication network.

According to an embodiment, a stylus pen comprises a housing, a coil (e.g., the coil 523 of FIG. 5) positioned in the housing and configured to receive a first signal when the stylus pen is inserted into an electronic device, a voltage detector (e.g., the first voltage detector 704 of FIG. 7) positioned in the housing and operatively connected to the coil, and a wireless communication circuit (e.g., the second short-range communication controller 709 of FIG. 7) positioned in the housing and operatively connected to the voltage detector, wherein the voltage detector may be configured to detect a strength of the received first signal, and when the detected strength of the first signal is not less than a predesignated strength, transmit a second signal to the wireless communication circuit, and wherein the wireless communication circuit is configured to transmit a wireless signal to the electronic device (e.g., the electronic device 101 of FIG. 1) based on the transmitted second signal.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the computer). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described subcomponents or its operation may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device capable of saving the battery power of the electronic device by performing scanning to receive an advertising message broadcast from a stylus pen at a pre-designated period.

According to various embodiments, there may be provided an electronic device capable of switching the state of a stylus pen which has a defect into a state in which the stylus pen may be normally operated (e.g., a state in which the stylus pen is able to broadcast advertising messages) by resetting the stylus pen using a charging signal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus comprising:
   a housing;
   a short-range communication circuit;
   a wireless power circuit including a coil;
   a touchscreen display; and
   a processor operatively coupled with the short-range communication circuit, the wireless power circuit and the touchscreen display, the processor being configured to:
   detect, via the coil, that an electronic pen is positioned in contact with a specified portion of the housing,
   based at least in part on the detecting, control the wireless power circuit to provide a wireless power to the electronic pen via the coil,
   based at least in part on the wireless power being provided to the electronic pen, receive an advertising message from the electronic pen via the short-range communication circuit, and
   based at least in part on the receiving of the advertising message, establish a short-range wireless communication connection between the apparatus and the electronic pen via the short-range communication circuit while the wireless power is provided to the electronic pen via the wireless power circuit.

2. The apparatus of claim 1, wherein the processor is further configured to:
prior to the establishing, determine whether the short-range wireless communication connection has been previously established between the apparatus and the electronic pen; and
based at least in part on a determination that the short-range wireless communication connection has not been previously established between the apparatus and the electronic pen, perform the establishing of the short-range wireless communication connection in response to a user input received via the touchscreen display while the wireless power is provided to the electronic pen via the wireless power circuit.

3. The apparatus of claim 1, wherein the processor is further configured to:
prior to the establishing, determine whether the short-range wireless communication connection has been previously established between the apparatus and the electronic pen; and
based at least in part on a determination that the short-range wireless communication connection has been previously established between the apparatus and the electronic pen, perform the establishing of the short-range wireless communication connection automatically without a user input.

4. The apparatus of claim 1, wherein the processor is further configured to:
receive, via the short-range wireless communication connection, information indicative of a power status of the electronic pen from the electronic pen; and
display the information indicative of the power status via the touchscreen display.

5. The apparatus of claim 1, wherein the processor is further configured to:
prior to the receiving of the advertising message, control the wireless power circuit to transmit a signal to the electronic pen via the coil, the signal indicating that the wireless power has been transmitted for a specified period of time.

6. The apparatus of claim 5, wherein the processor is further configured to:
perform a scanning operation after the transmitting of the signal and before the receiving of the advertising message.

7. The apparatus of claim 1, wherein the processor is further configured to:
prior to the receiving of the advertising message, control the wireless power circuit to transmit a signal to the electronic pen via the coil, the signal indicating that the wireless power has been transmitted a specified amount.

8. The apparatus of claim 1, wherein the advertising message is transmitted from the electronic pen using the wireless power received from the apparatus, based on a battery of the electronic pen being discharged or in a low-battery state.

9. A method for controlling an apparatus, the method comprising:
detecting, via a coil, that an electronic pen is positioned in contact with a specified portion of a housing;
based at least in part on the detecting, controlling a wireless power circuit to provide a wireless power to the electronic pen via the coil;
based at least in part on the wireless power being provided to the electronic pen, receiving an advertising message from the electronic pen via a short-range communication circuit; and
based at least in part on the receiving of the advertising message, establishing a short-range wireless communication connection between the apparatus and the electronic pen via the short-range communication circuit while the wireless power is provided to the electronic pen via the wireless power circuit.

10. The method of claim 9, further comprising:
prior to the establishing, determining whether the short-range wireless communication connection has been previously established between the apparatus and the electronic pen; and
based at least in part on a determination that the short-range wireless communication connection has not been previously established between the apparatus and the electronic pen, performing the establishing of the short-range wireless communication connection in response to a user input received via a touchscreen display while the wireless power is provided to the electronic pen via the wireless power circuit.

11. The method of claim 9, further comprising:
prior to the establishing, determining whether the short-range wireless communication connection has been previously established between the apparatus and the electronic pen; and
based at least in part on a determination that the short-range wireless communication connection has been previously established between the apparatus and the electronic pen, performing the establishing of the short-range wireless communication connection automatically without a user input.

12. The method of claim 9, further comprising:
receiving, via the short-range wireless communication connection, information indicative of a power status of the electronic pen from the electronic pen; and
displaying the information indicative of the power status via a touchscreen display.

13. The method of claim 9, further comprising:
prior to the receiving of the advertising message, controlling the wireless power circuit to transmit a signal to the electronic pen via the coil, the signal indicating that the wireless power has been transmitted for a specified period of time.

14. The method of claim 13, further comprising:
performing a scanning operation after the transmitting of the signal and before the receiving of the advertising message.

15. The method of claim 9, further comprising:
prior to the receiving of the advertising message, controlling the wireless power circuit to transmit a signal to the electronic pen via the coil, the signal indicating that the wireless power has been transmitted a specified amount.

16. The method of claim 9, wherein the advertising message is transmitted from the electronic pen using the wireless power received from the apparatus, based on a battery of the electronic pen being discharged or in a low-battery state.

* * * * *